United States Patent
Saylor et al.

(10) Patent No.: US 9,413,794 B1
(45) Date of Patent: Aug. 9, 2016

(54) TARGETED CONTENT DELIVERY

(71) Applicant: MicroStrategy Incorporated, Vienna, VA (US)

(72) Inventors: Michael J Saylor, Vienna, VA (US); Peter Jerome DiDomenico, III, Amissville, VA (US); Peng Xiao, Vienna, VA (US); Benjamin Z. Li, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 376 days.

(21) Appl. No.: 13/913,419

(22) Filed: Jun. 8, 2013

Related U.S. Application Data

(60) Provisional application No. 61/663,546, filed on Jun. 23, 2012.

(51) Int. Cl.
*G06F 15/16* (2006.01)
*H04L 29/06* (2006.01)

(52) U.S. Cl.
CPC .................................. *H04L 65/403* (2013.01)

(58) Field of Classification Search
None
See application file for complete search history.

(56) References Cited

U.S. PATENT DOCUMENTS

| | | | |
|---|---|---|---|
| 8,191,132 B1* | 5/2012 | Boscolo | H04L 63/0254 726/11 |
| 2007/0162432 A1* | 7/2007 | Armstrong | G06F 17/30867 |

\* cited by examiner

*Primary Examiner* — Brian P Whipple
(74) *Attorney, Agent, or Firm* — Fish & Richardson P.C.

(57) ABSTRACT

Data associated with user identities within an electronic social networking platform is extracted from the electronic social networking platform. A request is received to filter the user identities based on a specified value for a characteristic. Based on data associated with the user identities that was extracted from the electronic social networking platform, a subset of the user identities is identified who have the specified value for the characteristic. An indication of content to be delivered to the identified subset of user identities is received. As a consequence, the content is delivered to at least some of the user identities within the identified subset of user identities.

20 Claims, 23 Drawing Sheets

352

JAMES

354

| BASIC INFORMATION | Edit |
|---|---|

Gender: Male
Birthday: July 4, 1976
Current City: Washington, DC
Hometown: Chicago, Illinois
Relationship Status: Single
Interested In: Women
Primary Language: English

356

| WORK AND EDUCATION | Edit |
|---|---|

Employer(s): MicroStrategy (Software Developer)

Graduate School:

College/University: Massachusetts Institute of Technology (Electrical Engineering)

High School: Lincoln Park High School

358

| CONTACT INFORMATION | Edit |
|---|---|

Address: Washington, DC

E-mail Address: user2@email.com

Phone Number: +1 555 555 1212

360

| INTERESTS | Edit |
|---|---|

SPORTS
　U.S. Soccer, Boston Red Sox, FC Barcelona, Washington Capitals, and 9 more.

ARTS & ENTERTAINMENT
　Lady Gaga, Pink Floyd, Bob Marley, U2, and 37 more.

ACTIVITIES & ADDITIONAL INTERESTS
　MicroStrategy, Chipotle Mexican Grill, Jimmy John's, TED, and 93 more.

TARGETED CONTENT DELIVERY

CROSS-REFERENCE TO RELATED APPLICATION

This application claims priority from U.S. Provisional Patent Application Ser. No. 61/663,546, filed Jun. 23, 2012, and titled "TARGETED CONTENT DELIVERY," which is incorporated herein by reference in its entirety.

BACKGROUND

An electronic social networking platform may store data about or otherwise related to users of the electronic social networking platform.

BRIEF DESCRIPTION OF THE DRAWINGS

FIGS. 2A-2B and FIGS. 3A-3B are diagrams of examples of graphical user interfaces (GUIs) for an example of an electronic social networking platform.

FIGS. 5A-5H, 6A-6G, and 7A-7H are diagrams of examples of GUIs for an application.

DETAILED DESCRIPTION

An application may extract data from an electronic social networking platform on behalf of users of the application who also are represented by user identities within the electronic social networking platform. This data extracted from the electronic social networking platform may include data about or otherwise related to the users of the application. In addition, in some implementations, this data extracted from the electronic social networking platform may include data about or otherwise related to user identities within the electronic social networking platform who are members of the social networks of the users of the application.

The application may use the data extracted from the electronic social networking platform to glean intelligence about the user identities for whom the application extracted data from the electronic social networking platform. Additionally or alternatively, the application may use the data extracted from the electronic social networking platform to identify segments of the user identities for whom the application extracted data from the electronic social networking platform who share certain characteristics and/or satisfy certain criteria. After using data extracted from the electronic social networking platform to identify a particular segment of user identities who share one or more characteristics and/or satisfy one or more criteria, the application may deliver content that is specifically targeted to members of the particular segment to the user identities identified as belonging to the particular segment.

Figure 10:
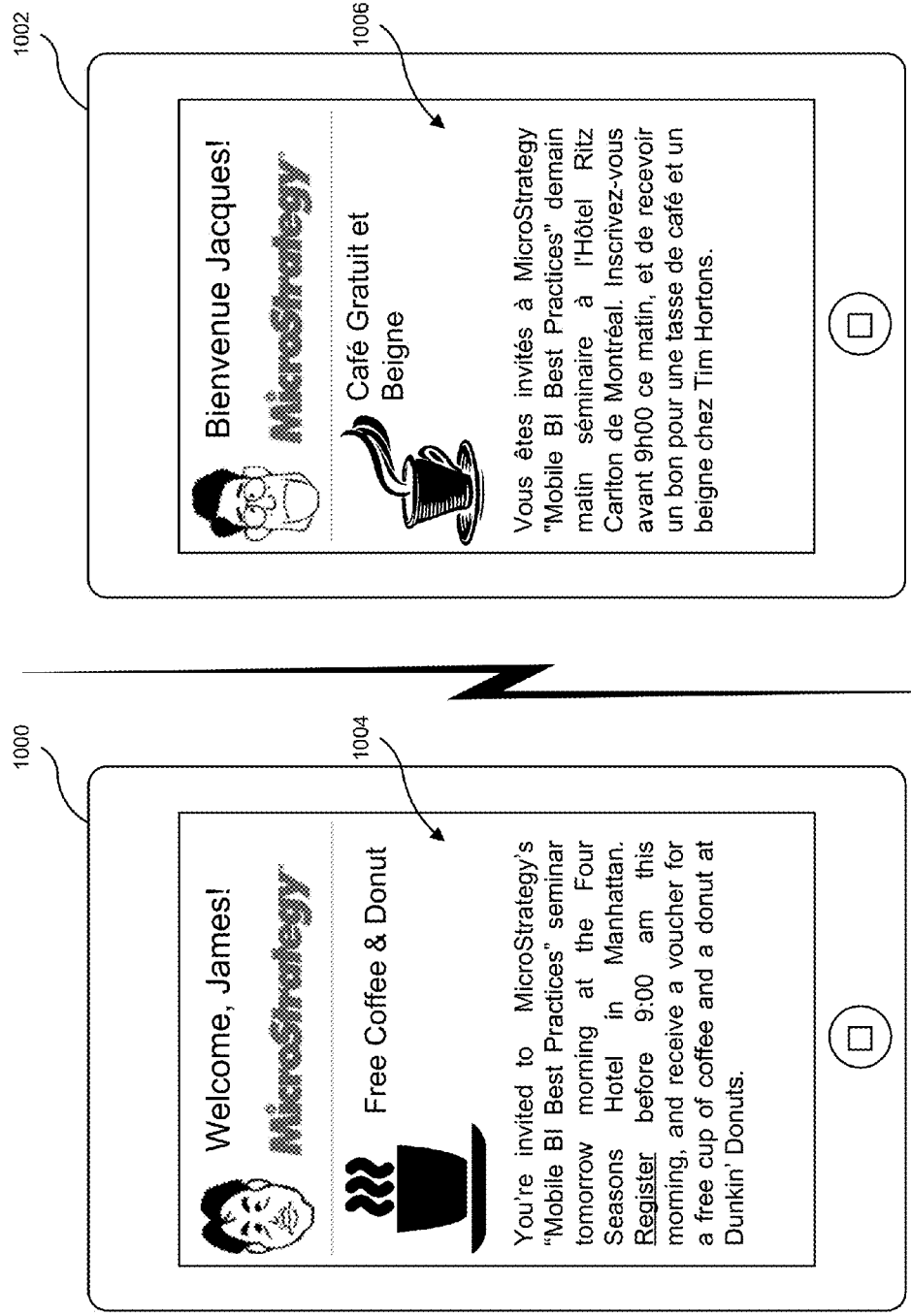
FIG. 10 is a schematic diagram that illustrates an example of targeted content delivery to mobile devices associated with targeted user identities.

Referring first to FIG. 10, FIG. 10 is a schematic diagram that illustrates an example of targeted content delivery to mobile devices 1000 and 1002 associated with targeted user identities. The targeted content delivered to mobile devices 1000 and 1002 was delivered by an application that targeted the user identities associated with mobile devices 1000 and 1002 based on characteristics of the user identities that the application gleaned from data extracted from an electronic social networking platform. As illustrated in FIG. 10, the targeted content 1004 delivered to mobile device 1000 is different from the targeted content 1006 delivered to mobile device 1002. This may be attributable to the fact that the user identity associated with mobile device 1000 has different characteristics than the user identity associated with mobile device 1002 and, therefore, was targeted with different content 1004 by the application than the user identity associated with mobile device 1002.

Mobile device 1000 is associated with a user identity identified as James. The underlying human user represented by the user identity James may be a user of both an electronic social networking platform and the application that delivered the content 1004 to mobile device 1000. The electronic social networking platform stores various different data about or otherwise associated with the user identity James as a consequence of James' use of the electronic social networking platform. For the purposes of the example illustrated in FIG. 10, assume that the user profile for the user identity identified as James reflects that James lives in New York City and speaks English as his primary language. Further assume that, based on information extracted from the electronic social networking platform, the application is able to infer that James is interested in business intelligence software.

Mobile device 1002 is associated with a user identity identified as Jacques. Like James, the underlying human user represented by the user identity Jacques may be a user of both the electronic social networking platform and the application that delivered the content 1006 to mobile device 1002. Furthermore, the electronic social networking platform also stores various different data about or otherwise associated with the user identity Jacques as a consequence of Jacques' use of the electronic social networking platform. For the purposes of the example illustrated in FIG. 10, assume that the user profile for the user identity identified as Jacques reflects that Jacques lives in Montreal and speaks French as his primary language. Further assume that, based on information extracted from the electronic social networking platform, the application is able to infer that Jacques is interested in business intelligence software.

By extracting data about or otherwise associated with the user identities James and Jacques from the electronic social networking platform, the application may be able to glean various different characteristics of the user identities James and Jacques. The application then may utilize the characteristics of the user identities James and Jacques gleaned from the data extracted from the electronic social networking platform to deliver specifically targeted content to the user identities James and Jacques. For example, the application may deliver content to the user identity James that is specifically targeted to user identities having one or more the characteristics possessed by the user identity James. Similarly, the application may deliver content to the user identity Jacques that is specifically targeted to user identities having one or more the characteristics possessed by the user identity Jacques.

In the specific example illustrated in FIG. 10, the application may target user identities who are interested in business intelligence software with invitations to seminars about mobile business intelligence being conducted by the company MicroStrategy. However, instead of sending the same general invitation to all user identities interested in business intelligence software, the application may utilize characteristics of the user identities gleaned from data extracted from the electronic social networking platform to deliver targeted and potentially more personalized invitations to the user identities. For example, because the application was able to glean that the user identity James lives in New York City and speaks English as his primary language, the application delivered an English-language invitation 1004 to James to attend the mobile business intelligence seminar being held in New York City. In addition, the invitation 1004 included an offer for a free cup of coffee and a donut at Dunkin' Donuts, a coffee and donut shop found throughout New York City. Similarly, because the application was able to glean that the user identity Jacques lives in Montreal and speaks French as his primary language, the application delivered a French-language invitation 1006 to Jacques to attend the mobile business intelligence seminar being held in Montreal. In addition, the invitation 1006 included an offer for a free cup of coffee and a donut at Tim Hortons, a coffee and donut shop found throughout Montreal.

There are many different examples of electronic social networking platforms. Facebook, Twitter, LinkedIn, Google+, MySpace, and Orkut are just a few examples. But, there are many others, and it is reasonable to expect many more to be developed in the future. Techniques are described herein for extracting, analyzing, and/or acting upon data from an electronic social networking platform. These techniques are widely applicable and may be employed in connection with any of the above electronic social networking platforms or any other electronic social networking platforms.

Electronic social networking platforms often enable an individual user identity to create a user profile that reflects various different types of information about or otherwise related to the user identity. Such a profile for a particular user identity may be helpful to other user identities of the electronic social networking platform who are interested in learning more about the particular user identity. Similarly, the profile for the particular user identity may be helpful to the user identities of the electronic social networking platform who are interested in confirming that the particular user identity represents a particular human user within the electronic social networking platform.

For example, an electronic social networking platform may maintain a user profile for a user identity that reflects the user identity's name, gender, age, relationship status, education history (e.g., schools attended and/or degrees awarded), employment history (e.g., employers and/or positions held), contact information (e.g., e-mail address(es), telephone number(s), other electronic addresses, physical addresses, etc.), current residence information (e.g., city, state/territory, and/or country), hometown information (e.g., city, state/territory, and/or country), primary language, and/or sexual orientation.

Additionally or alternatively, the user identity's profile also may reflect various different interests of the user identity and/or indications of various different locations that the user identity (or another user identity, such as, for example, a member of the user identity's social network) has registered with the electronic social networking platform as locations that the user identity has visited. Such locations may include a wide variety of different types of locations, including, for example, geographic locations, such as cities, states, or countries, as well as commercial venues, businesses, or other places, such as restaurants, retail stores, parks, train or bus stations, airports, etc. For ease of reference, indications of locations registered with an electronic social networking platform as locations that a user identity has visited may be referred to herein as "check-ins," and information stored in a user identity's profile that reflects such indications of locations registered with the electronic social networking platform as locations that the user identity has visited may be referred to herein as "check-in information."

Electronic social networking platforms also typically enable an individual user identity (e.g., representing a human user who has registered with the electronic social networking platform and/or a human user who has been assigned a unique or otherwise identifying identifier by the electronic social networking platform) to establish connections with other user identities. These connections between user identities may reflect relationships between the underlying human users of the electronic social networking platform who are represented by the user identities. For example, a connection between two user identities within an electronic social networking platform may reflect a social friendship (e.g., developed through physical interaction in the real-world and/or through on-line interaction in the cyber-world) or a professional relationship between the underlying human users represented by the user identities.

In some electronic social networking platforms, user identities may be able to form connections with other user identities unilaterally. For example, an electronic social networking platform may enable a first user identity to form a connection to a second user identity simply by requesting to form a connection to the second user identity (without requiring authorization of the connection by the second user identity). Alternatively, in other electronic social networking platforms, the formation of connections between two user identities may involve bilateral participation by both user identities. For example, in such electronic social networking platforms, when a first user identity requests to form a connection to a second user identity, the electronic social networking platform may establish the connection between the first and second user identities only after receiving authorization to form the connection from the second user identity.

A user identity's social network within an electronic social networking platform may be defined based on the connections between the user identity and other user identities of the electronic social networking platform. In some cases, the social network of a particular user identity of an electronic social networking platform may be defined as the group of other user identities to whom the particular user identity is directly connected. Alternatively, in other cases, the social network of a particular user identity of an electronic social networking platform may be defined to extend beyond the group of other user identities to whom the particular user identity is directly connected to include other user identities who are within a threshold level of proximity to the particular user identity within the electronic social networking platform. For example, social proximity between two user identities of an electronic social networking platform may be measured in terms of the number of degrees of separation (or the number of other intermediate, interconnected user identities required to form a connection) between the two user identities within the electronic social networking platform, and the social network of a particular user identity within the electronic social networking platform may be defined to include a group of other user identities who are within a threshold number of degrees of separation of the particular user identity.

Commonly, an electronic social networking platform may provide a particular user identity with certain increased functionality in connection with other user identities who are members of the particular user identity's social network within the electronic social networking platform that the electronic social networking platform may not provide to the particular user identity in connection with user identities who are not members of the particular user identity's social network within the electronic social networking platform. For example, an electronic social networking platform may provide a particular user identity with one or more different mechanisms for electronically communicating or otherwise sharing content with other user identities who are members of the particular user identity's social network within the electronic social networking platform. Furthermore, an electronic social networking platform may allow a particular user identity to access more detailed profile information about other user identities who are members of the particular user identity's social network within the electronic social networking platform than the electronic social networking platform allows the particular user identity to access about user identities who are not members of the particular user identity's social network. Additionally or alternatively, an electronic social networking platform may enable a particular user identity to access "check-ins" registered with the electronic social networking platform by members of the particular user identity's social network within the electronic social networking platform, while not enabling the particular user identity to access "check-ins" registered with the electronic social networking platform by user identities who are not members of the particular user identity's social network within the electronic social networking platform.

The connections between individual user identities within an electronic social networking platform may be represented in the form of a graph, where user identities are represented by nodes and connections between user identities are represented by edges connecting the nodes. As new user identities join and other user identities stop using the electronic social networking platform and/or as new connections between user identities are formed and old connections between user identities are dissolved, this graph of interconnected user identities may change dynamically in time to represent the current state of connections between user identities within the electronic social networking platform.

Figure 1A:
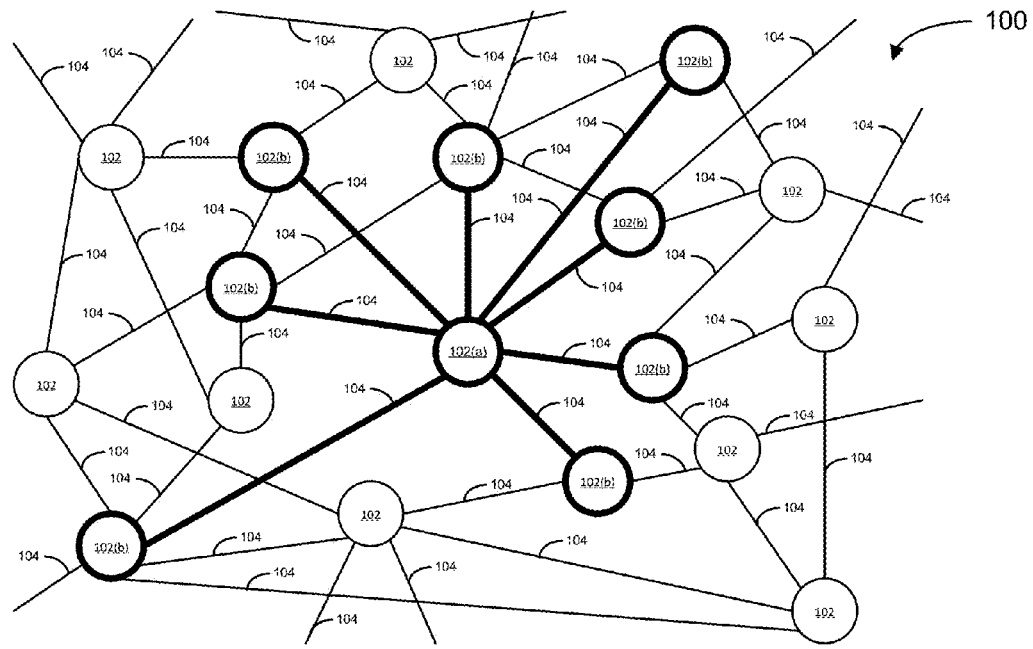
FIGS. 1A and 1B are schematic diagrams of examples of electronic social networking platforms.

FIG. 1A is a schematic diagram of an example of an electronic social networking platform. As illustrated in FIG. 1A, the electronic social networking platform is represented as a graph 100 of nodes 102 connected by edges 104. In some implementations, each node 102 of graph 100 may represent an individual user identity of the electronic social networking platform. In such implementations, an edge 104 that connects two nodes 102 represents a connection between the two user identities that are represented by the connected nodes 102. For example, the edges 104 that connect node 102(a) to nodes 102(b) represent connections between the user identity represented by node 102(a) and the other user identities represented by nodes 102(b). As discussed above, in some cases, an electronic social networking platform may define a particular user identity's social network as the group of other user identities to whom the user identity is directly connected. If this definition is applied within the electronic social networking platform illustrated in FIG. 1A, the social network for the user identity represented by node 102(a) would be defined as the group of other user identities represented by nodes 102(b).

As further discussed above, an electronic social networking platform may facilitate the sharing of information and the exchange of electronic communications between a particular user identity and other user identities who are members of the particular user identity's social network within the electronic social networking platform. For example, referring to the electronic social networking platform represented in FIG. 1A, the electronic social networking platform may provide mechanisms that facilitate the exchange of electronic communications between the user identity represented by node 102(a) and the user identities represented by nodes 102(b) who are members of the social network of the user identity represented by node 102(a). In some implementations, the electronic social networking platform may provide a mechanism that enables the user identity represented by node 102(a) to send private electronic messages to any one or more of the user identities represented by nodes 102(b). Furthermore, the electronic social networking platform also may provide a mechanism that enables the user identity represented by node 102(a) to publish an electronic message (e.g., a "status post") that is broadcast to all (or some defined subset of all) of the user identities represented by nodes 102(b). Additionally or alternatively, the electronic social networking platform may provide a mechanism that enables the user identity represented by node 102(a) to send a directed electronic message to a user identity who is represented by a particular one of nodes 102(b). In such cases, the recipient user identity of the directed message may define whether this directed message is shared publicly with other user identities of the electronic social networking platform.

In addition to enabling user identities to establish connections to other user identities, an electronic social networking platform also may enable user identities to establish connections with other types of objects. Among other examples, such other types of objects may include interest objects, location objects, event objects, and application objects.

Interest objects may represent a variety of different types of interests, including, for example, local businesses or places (e.g., restaurants, retail stores, parks, train or bus stations, airports, etc.); companies, organizations, or institutions; brands or products; artists, bands, or public figures; media or other forms of entertainment (e.g., books, music albums, movies, etc.); and causes or communities. As described in greater detail below in connection with FIG. 3A, interest objects may be manifested within an electronic social networking platform as so-called "pages" that provide information about the interests that the interest objects represent. These "pages" may be maintained by one or more representatives of the interests that the interest objects represent.

An electronic social networking platform that supports interest objects may enable an individual user identity to record various different interests within the electronic social networking platform by registering endorsements of the interest objects that represent the user identity's interests with the electronic social networking platform. The electronic social networking platform may represent the individual user identity's endorsement of different interest objects within the electronic social networking platform as connections between the user identity and the interest objects that the user identity has endorsed. Furthermore, the electronic social networking platform may provide various different mechanisms that enable the one or more representatives of a particular interest object to share electronic communications or otherwise interact with those user identities who have endorsed the particular interest object. For example, the electronic social networking platform may enable the one or more representatives of the particular interest object to publish status posts, including, for example, text, images, and/or videos, that are broadcast publicly to user identities who have endorsed the particular interest object.

Location objects may represent a variety of different types of locations, including, for example, geographic locations, such as cities, states, or countries, as well as commercial venues, businesses, or other places, such as restaurants, retail stores, parks, train or bus stations, airports, etc. An electronic social networking platform that supports location objects may enable an individual user identity to form various different types of connections to different location objects. For example, an electronic social networking platform may enable a user identity to record information about the user identity's hometown by establishing a "hometown" connection with a location object that represents the user identity's hometown. Similarly, an electronic social networking platform may enable a user identity to record information about the user identity's current place of residence by establishing a "current city" connection with a location object that represents the user identity's current place of residence. Additionally or alternatively, an electronic social networking platform may enable a user identity to register locations that the user identity has visited by establishing "check-in" connections with location objects that represent locations that the user identity has visited.

In some cases, an electronic social networking platform may provide mechanisms that enable a user identity to manually "check-in" at a location. For example, a social networking platform may provide mechanisms that enable a user identity to manually define and/or search for a location object that corresponds to a location that the user identity is visiting (or has visited or plans to visit) and create a connection to the location object that corresponds to the location in order to "check-in" at the location. Additionally or alternatively, an electronic social networking platform may provide mechanisms that enable a user identity to "check-in" at a location in a more intelligent or automated fashion. For instance, a social networking platform may provide mechanisms that enable a user identity to "check-in" at a location using a mobile computing device (e.g., a smartphone or tablet computer) using global positioning system (GPS), map, and/or other location-identifying data available to the mobile computing device.

Event objects may represent events hosted by user identities of an electronic social networking platform and/or events hosted by representatives of interest objects. Furthermore, event objects may include mechanisms that enable the hosts of the events represented by the event objects to invite user identities to the events. In some electronic social networking platforms, event objects may be manifested within the electronic social networking platforms as "event pages" that provide information about the events the event objects represent (e.g., date, time, and location information for the events), and the electronic social networking platforms may enable one or more designated representatives associated with the event (e.g., the hosts) to share information and exchange electronic communications with user identities who have been invited to the event via the "event page."

An electronic social networking platform that supports event objects may establish a connection between an event object and the user identity or interest object responsible for hosting the event represented by the event object. In addition, the electronic social networking platform also may establish a connection between an event object and user identities who have been invited to the event represented by the event object and/or user identities who register with the electronic social networking platform that they will be attending the event represented by the event object.

As described in greater detail below, electronic social networking platforms may enable independent applications to leverage the electronic social networking platforms, for example, to provide more compelling user experiences for the users of the independent applications by accessing and/or extracting data from the electronic social networking platforms, generally on behalf of user identities who have granted the independent applications authorization to access and/or extract data from the electronic social networking platforms on their behalf. Application objects in an electronic social networking platform, thus, may represent different applications that leverage the electronic social networking platform.

A wide variety of different types of applications may leverage electronic social networking platforms. Among other examples, gaming applications are one common example of applications that leverage electronic social networking platforms. Such gaming applications may allow user identities to engage in interactive or multiplayer games that involve other user identities of the electronic social networking platforms that they leverage. Other examples of types of applications that may leverage electronic social networking platforms include social electronic marketplace applications, social event management applications, content delivery and sharing applications, collaboration applications, and social recommendation applications.

An electronic social networking platform that supports application objects may establish connections between an individual application that leverages the electronic social networking platform and user identities who are users of the application represented by the application object and/or who are users who have granted the application represented by the application object authorization to access or extract data from the electronic social networking platform on their behalf. Furthermore, the electronic social networking platform may provide various different mechanisms that enable an application that leverages the social networking platform to share electronic communications or otherwise interact with those user identities for whom connections have been established with the application object that represents the application within the electronic social networking platform. For example, the electronic social networking platform may enable an application that leverages the electronic social networking platform (and/or users of the application that leverages the electronic social networking platform) to transmit communications within the electronic social networking platform to user identities for whom connections have been established with the application object that represents the application within the electronic social networking platform.

Figure 1B:
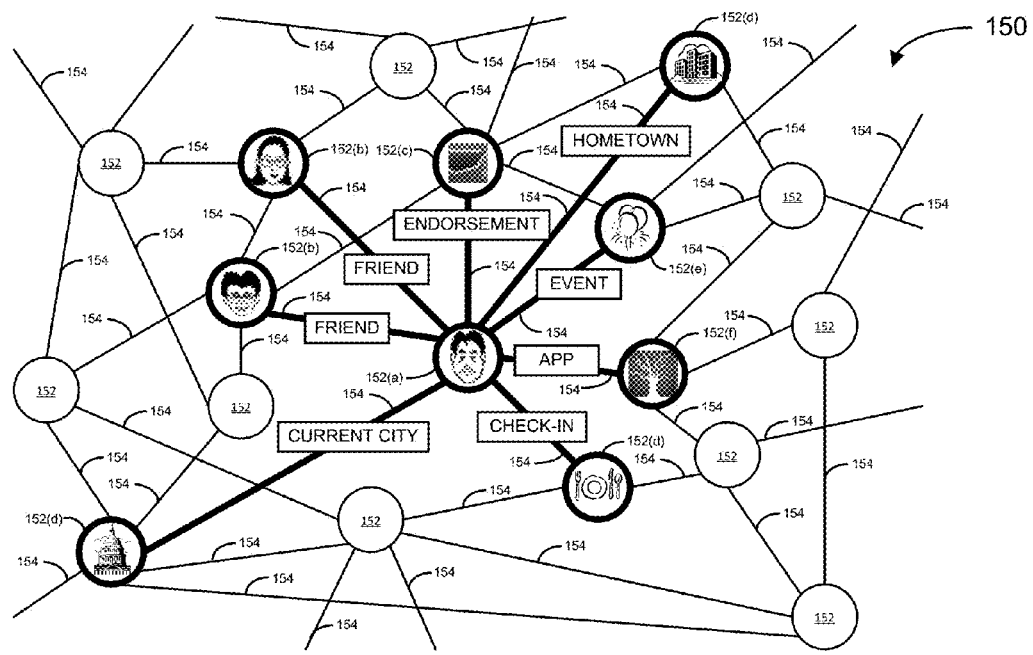

FIG. 1B is a schematic diagram of an example of an electronic social networking platform that enables user identities to form connections with multiple different types of objects including, for example, other user identity objects, interest objects, location objects, event objects, and application objects. As illustrated in FIG. 1B, the electronic social networking platform is represented as a graph 150 of nodes 152 connected by edges. Each node 152 in the graph 150 represents a particular type of object in the electronic social networking platform. For example, nodes 152(a) and 152(b) represent user identity objects, while node 152(c) represents an interest object, nodes 152(d) represent location objects, node 152(e) represents an event object, and node 154(f) represents an application object.

As illustrated in FIG. 1B, an edge 154 that connects two nodes 152 represents a connection between the two objects that are represented by the connected nodes 152. For example, the edges 154 that connect node 152(a) to nodes 152(b) represent connections between the user identity represented by node 152(a) and the user identities represented by nodes 152(b). (For ease of reference, such a connection between two user identity objects in an electronic social networking platform may be referred to herein as a "friend" connection.)

Similarly, the edge 154 that connects node 152(a) to node 152(c) represents a connection between the user identity represented by node 152(a) and the interest object represented by node 152(c). (As discussed above, a user of an electronic social networking platform may form a connection to such an interest object by endorsing the interest object. Therefore, for ease of reference, connections between a user identity object and an interest object in an electronic social networking platform may be referred to herein as an "endorsement" connection.)

Furthermore, the edges 154 that connect node 152(a) to nodes 152(d) represent connections between the user identity represented by node 152(a) and the location objects represented by nodes 152(d). Depending on the electronic social networking platform, a user identity may be able to establish various different types of connections to location objects. For example, in order to store a record of the user identity's hometown, the user identity may establish what may be referred to herein as a "hometown" connection to a location object that represents the user identity's hometown. Additionally or alternatively, in order to store a record of the user identity's current residence, the user identity may establish what may be referred to herein as a "current city" or "current residence" connection to a location object that represents the user identity's current residence. Furthermore, in order to store a record of a location the user identity visited, the user identity may establish what may be referred to herein as a "check-in" connection to a location object that represents a location that the user identity visited.

The edge 154 that connects node 152(a) to node 152(e) represents a connection between the user identity represented by node 152(a) and the event represented by event object 152(e). (For ease of reference, such a connection between a user identity object and an event object may be referred to herein as an "event" connection.) There may be various different types of event connections between user identities and event objects in an electronic social networking platform. For example, one type of an event connection between a user identity and an event object in an electronic social networking platform may signify that the user identity is the host of the event. Another type of an event connection between a user identity and an event object in an electronic social networking platform may signify that the user identity has been invited to the event. Still another type of event connection between a user identity and an event object in an electronic social networking platform may signify that the user identity has registered with the electronic social networking platform that the user identity will be attending the event. Yet another type of event connection between a user identity and an event object in an electronic social networking platform may signify that the user identity has registered with the electronic social networking platform that the user identity will not be attending the event. Still one more type of event connection between a user identity and an event object in an electronic social networking platform may signify that the user identity has registered with the electronic social networking platform that the user identity tentatively will be attending the event.

Finally, the edge 154 that connects node 152(a) to node 152(f) represents a connection between the user identity represented by node 152(a) and the application represented by application object 152(f). (For ease of reference, such a connection between a user identity object and an application objected may be referred to here as an "application" connection.)

Electronic social networking platforms may provide various different types of user interfaces for interacting with the electronic social networking platforms. For example, for each user of an electronic social networking platform, the electronic social networking platform may provide a first GUI that generally presents a feed of content shared by or otherwise related to other user identities who are members of the user identity's social network as well as content shared by or otherwise related to other objects (e.g., interest, location, event, and/or application objects) to which the user identity is connected within the electronic social networking platform. In some electronic social networking platforms, this feed may be referred to as the user identity's "news feed." In addition, the electronic social networking platform also may provide a second GUI for each user identity of the electronic social networking platform that presents a feed that generally records the activity of the user identity within the electronic social networking platform as well as content shared with the user identity directly by other user identities who are members of the user identity's social network and/or by other objects to which the user identity is connected within the electronic social networking platform (e.g., interest, location, event, and/or application objects). In some electronic social networking platforms, this feed may be referred to as the user identity's "wall" or "timeline."

An electronic social networking platform may include a variety of different content in a user identity's "news feed." For example, among other types of content, a particular user identity's "news feed" may include: (i) electronic messages, such as, for example, "status posts," and other content, such as, for example, images, videos, and/or links, that have been published generally by other user identities who are members of the particular user identity's social network; (ii) electronic messages and other content, such as, for example, images, videos, and/or links, that have been published publicly by other types of objects (e.g., interest, location, event, and application objects) to which the particular user identity is connected within the electronic social networking platform; (iii) electronic messages, such as, for example, "walls posts" or "timeline posts," and other content, such as, for example, images, videos, and/or links, that have been shared directly with recipient user identities who are members of the particular user identity's social network and who have configured their privacy settings to share such directed electronic messages and other content with the particular user identity; and/or (iv) information about activities engaged in within the context of the electronic social networking platform by other user identities who are members of the user identity's social network, such as, for example, "check-ins," events hosted and/or attended, and application usage (e.g., participation in a gaming application).

Similarly, an electronic social networking platform may include a variety of different content in a user identity's "wall" or "timeline." For example, among other types of content, a particular user identity's "wall" or "timeline" may include: (i) electronic messages, such as, for example, status posts," and other content, such as, for example, images, videos, and/or links, that the particular user identity published generally to other user identities who are members of the particular user identity's social network; (ii) electronic messages, such as, for example, "wall posts" or "timeline posts," and other content, such as, for example, images, videos, and/ or links, that the particular user identity shared directly with specific members of the particular user identity's social network; (iii) electronic messages, such as, for example, "wall posts" or "timeline posts," and other content, such as, for example, images, videos, and/or links, that user identities who are members of the particular user identity's social network shared directly with the particular user identity; (iv) electronic messages, such as, for example, "wall posts" or "timeline posts," and other content, such as, for example, images, videos, and/or links, that applications to which the particular user identity is connected within the electronic social networking platform shared directly with the particular user identity; and/or (v) information about activities engaged in within the context of the electronic social networking platform by the user identity such as, for example, "check-ins," events hosted and/or attended, and application usage (e.g., participation in a gaming application).

Figure 2A:
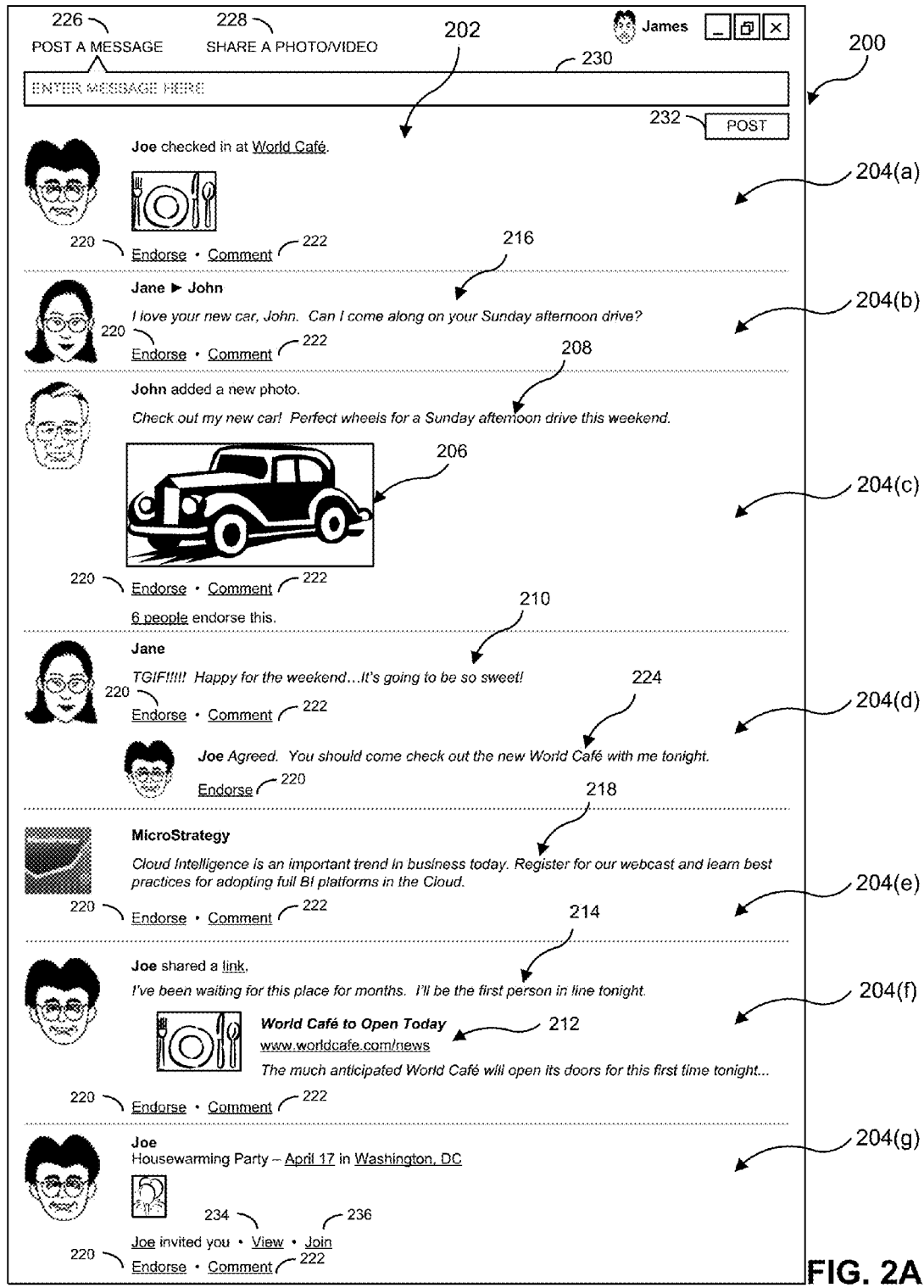
Figure 2B:
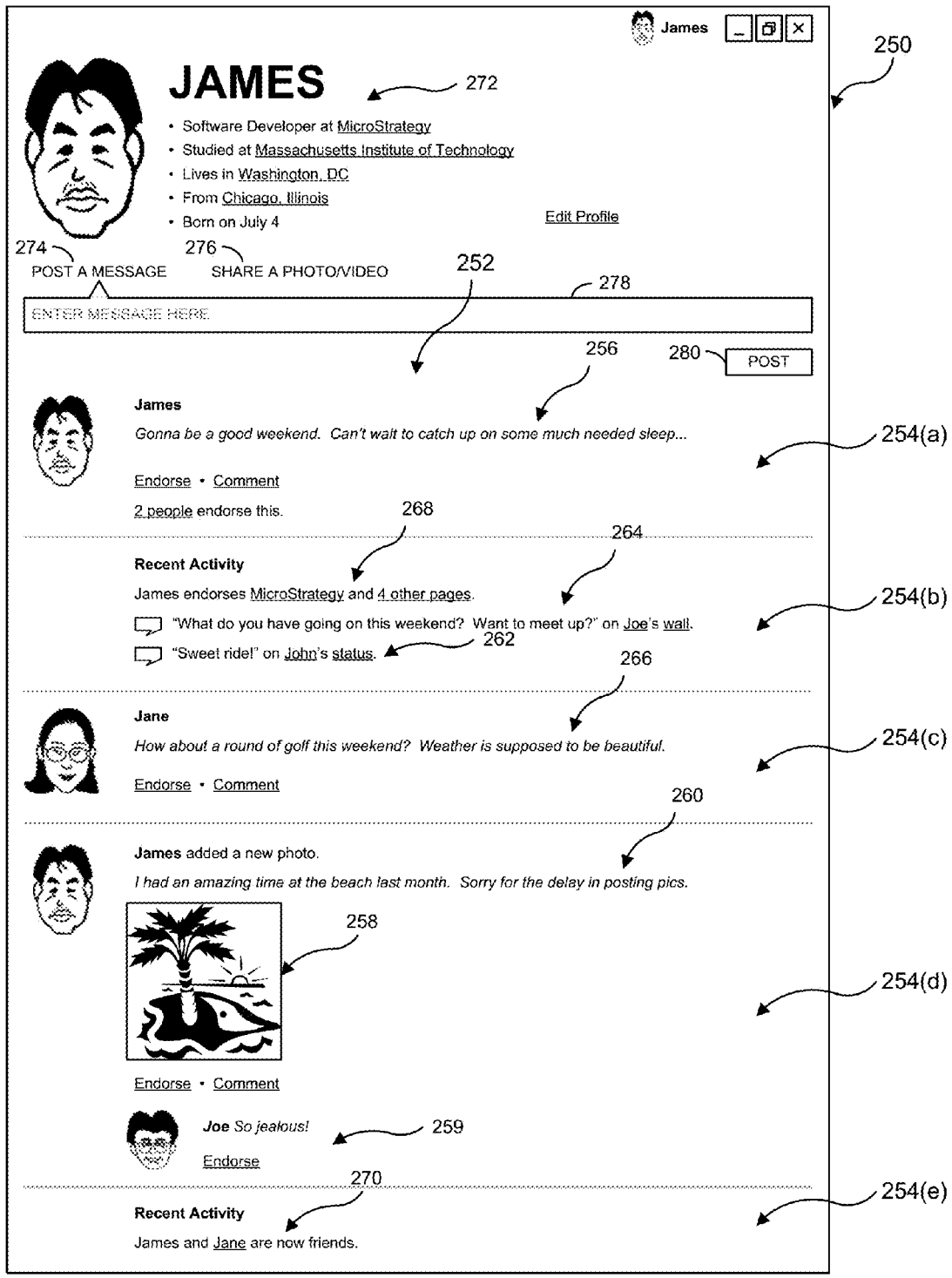

FIGS. 2A and 2B are diagrams of examples of two different GUIs 200 and 250 provided by an example of an electronic social networking platform to a user identity identified as James. The GUI 200 of FIG. 2A illustrates an example of a GUI that presents a "news feed" 202 for the user identity identified as James, while the GUI 250 of FIG. 2B illustrates an example of a GUI that presents a "wall" or "timeline" 252 for the user identity identified as James.

Referring first to FIG. 2A, GUI 200 includes a "news feed" 202 that includes different feed items 204. The items 204 included within "news feed" 202 include content and/or electronic messages that have been shared with James by other user identities who are members of James' social network as well as by other types of objects (e.g., interest, location, event, and application objects) to which James is connected within the electronic social networking platform.

For example, item 204(c) includes an image 206 and a corresponding message 208 shared with James by a member of James' social network identified as John. Similarly, item 204(d) includes a message 210 (e.g., a "status post") shared with James by a member of James' social network identified as Jane, and item 204(f) includes a hyperlink 212 to a web page and a corresponding message 214 shared with James by a member of James' social network identified as Joe. Although not illustrated in FIG. 2A, in addition to enabling user identities to share images and hyperlinks with members of their social networks (e.g., as illustrated by items 204(c) and 204(f), respectively), the electronic social networking platform also may enable user identities to share other types of content with members of their social networks including, for example, videos. Items 204(c), 204(d), and 204(f) may represent content and/or messages that the particular user identities who shared these items (i.e., John, Jane, and Joe, respectively) published generally to user identities who are members of their own social networks.

In addition to enabling user identities to publish electronic messages and other content generally to other user identities who are members of their social networks, the electronic social networking platform also may enable user identities to send directed messages and other content to individual user identities who are members of their social networks. Such directed messages and other content may be presented within the "walls" or "timelines" of the user identities to whom they are targeted. Therefore, these directed messages and other content may be referred to as "wall posts" or "timeline posts." The electronic social networking platform may provide user identities with controls for configuring whether such directed messages and other content posted to their "walls" or "timelines" also are shared with members of their own social networks. In the event that a targeted user identity selects configuration settings that provide for directed messages and other content posted to the targeted user's "wall" or "timeline" to be shared with other members of the targeted user identity's social network, such "wall posts" or "timeline posts" may be presented to the other members of the targeted user identity's social network in their "news feeds."

Item 204(b) in the "news feed" 202 of the GUI 200 is an example of a "wall post" or "timeline post" 216 that was directed to a targeted user identity who is a member of James' social network and who selected configuration settings that provide for the "wall post" or "timeline post" to be shared with other members of the targeted user identity's own social network. More particularly, message 216 was posted to the "wall" or "timeline" of a member of James' social network identified as John by another user identity identified as Jane. Because the user identity identified as John is a member of James' social network, and, because the user identity identified as John selected configuration settings that provide for "wall posts" or "timeline posts" to be shared with other members of his social network, the "wall post" or "timeline post" 216 from the user identity identified as Jane is presented in James' "news feed" 202. The user identity identified as Jane may or may not be a member of James' own social network.

"News feed" 202 also includes information about activities engaged in within the context of the electronic social networking platform by other user identities who are members of James' social network. For example, item 204(a) indicates that a user identity identified as Joe checked-in at a location identified as World Café. The location World Café may be represented as a location object within the electronic social networking platform and may correspond to, for example, a local restaurant.

The items 204 included within "news feed" 202 also include content and/or electronic messages that have been shared with James by other types of objects (e.g., interest, location, event, and application objects) to which James is connected within the electronic social networking platform. For example, item 204(e) includes a message 218 shared with James by an interest object manifested as a "page" within the electronic social networking platform that represents MicroStrategy Incorporated, a software and technology company.

Invitations to events that a user identity receives within the electronic social networking platform also may be presented in the user identity's "news feed." For example, item 204(g) in "news feed" 202 represents an invitation to an event named "Housewarming Party" being held on April 17 in Washington, DC that was sent to James by a user identity who is a member of James' social network identified as Joe. As illustrated in FIG. 2A, item 204(g) includes a selectable "View" control 234 that, when invoked, may provide James with more information about the "Housewarming Party" event. In addition, item 204(g) also includes a selectable "Join" control 236 that enables James to register with the electronic social networking platform that he will be attending the "Housewarming Party" event. As discussed above, the "Housewarming Party" event may be represented as an event object within the electronic social networking platform.

The items 204 presented in "news feed" 202 provide mechanisms that enable James to react to the content included within the items 204 presented in "news feed" 202. For example, as illustrated in FIG. 2A, each of the items 204 presented in "news feed" 202 includes a selectable "Endorse" control 220 and a selectable "Comment" control 222.

A selectable "Endorse" control 220 in an item 204 enables James to register an endorsement of the content (e.g., message, image, video, link, activity, etc.) included in the item 204. The electronic social networking platform records such endorsements and may present the number of endorsements registered in connection with the content presented in an item 204 in connection with the presentation of the item 204 itself. For example, item 204(c) includes an indication that six different user identities have registered endorsements of the picture and message included in item 204(c).

A selectable "Comment" control 222 in an item 204 enables the particular user identity to enter a responsive comment to the content included in the item 204. The electronic social networking platform records such responsive comments and associates them with the content included in the item 204 so that the electronic social networking platform may present any such responsive comments in connection with the presentation of the item 204 itself. For example, item 204(d) includes a message 224 by a user identity identified as Joe that was entered in response to the message 210 originally posted by the user identity identified as Jane.

In addition to "news feed" 202, GUI 200 also includes a selectable "Post A Message" control 226, a selectable "Share A Photo/Video" control 228, and an associated text entry field 230 and selectable "Post" control 232. Selectable "Post A Message" control 226 enables James to compose and publish a "status post" by entering text in associated text entry field 230 and invoking selectable "Post" control 232. Similarly, selectable "Share A Photo/Video" control 228 enables James to share a picture or a video and to compose and publish a corresponding status post by entering text in associated text entry field 230 and invoking selectable "Post" control 232.

Referring now to FIG. 2B, GUI 250 includes a "wall" or "timeline" feed 252 that includes different feed items 254. The items 254 included within the "wall" or "timeline" feed 252 include content and/or electronic messages that the user identity identified as James shared with other members of his social network. Such content and/or electronic messages may include status posts that James published generally to members of his social network, responsive comments that James entered in response to content and/or messages shared by other user identities who are members of James' social network, and "wall" or "timeline" posts that James posted to the "walls" or "timelines" of specific user identities who are members of his social network.

For example, item 254(a) includes a "status post" 256 that James published generally to user identities who are members of his social network. Similarly, item 254(d) includes an image 258 and a corresponding message 260 that James published generally to user identities who are members of his social network. In the event that user identities who are members James' social network enter responsive comments to and/or endorse "status posts" that James published generally to user identities who are members of his social network, any such responsive comments or endorsements also may be presented within "wall" or "timeline" feed 254. For example, item 254(a) includes an indication that two user identities have endorsed message 256. Similarly, item 254(d) includes a message 259 that was entered by a user identity who is a member of James' social network identified as Joe in response to the picture 258 and corresponding message 260 originally posted by James.

Meanwhile, item 254(b) includes a responsive comment 262 that James posted in response to content and/or a message shared by a user identity who is a member of James' social network identified as John. Item 254(b) also includes a "wall post" or "timeline post" 264 that James posted on the "wall" or "timeline" of a specifically-targeted user identity who is a member of James' social network identified as Joe.

The items 254 included in "wall feed" or "timeline feed" 252 also include content and/or messages that were posted directly on James' "wall" or "timeline" by user identities who are members of James' social network. For example, item 254(c) includes a message 266 that was posted directly on James' "wall" or "timeline" by a user identity who is a member James' social network identified as Jane.

In addition, the items 254 in "wall" or "timeline" feed 252 also include information about activities that James has engaged in within the context of the electronic social networking platform. For example, item 254(b) includes an indication 268 that James has endorsed the MicroStrategy Incorporated interest object as well as four additional interest objects, all of which, as described in greater detail below in connection with FIG. 3A, may be manifested within the electronic social networking platform in the form of individual "pages." Meanwhile, item 254(e) includes an indication 270 that James has established a connection within the electronic social networking platform to the user identity identified as Jane.

Although not illustrated in FIG. 2B, a user identity's "wall" or "timeline" feed also may include content and/or messages that were shared with the user identity as a consequence of the user identity's interaction with an application that leverages the electronic social networking platform. For example, in some cases, an application that leverages the electronic social networking application may post messages to the user identity's "wall" or "timeline." Additionally or alternatively, another user identity may originate a message to the user identity within an application that leverages the electronic social networking platform, and the application then may cause the message from the other user identity that originated within the application to be posted to the user identity's "wall" or "timeline."

In addition to "wall" or "timeline" feed 252, GUI 250 also includes a profile section 272 that presents a snapshot of profile information for the user identity identified as James. As illustrated in FIG. 2B, profile section 272 includes information about James' employment history (software developer at MicroStrategy), education history (Massachusetts Institute of Technology), current residence (Washington, DC), hometown (Chicago), and birthday (July 4).

As with GUI 200, GUI 250 also includes a selectable "Post A Message" control 274, a selectable "Share A Photo/Video" control 276, and an associated text entry field 278 and selectable "Post" control 280. Selectable "Post A Message" control 274 enables James to compose and publish a "status post" by entering text in associated text entry field 278 and invoking selectable "Post" control 280. Similarly, selectable "Share A Photo/Video" control 276 enables James to share a picture or a video and to compose and publish a corresponding "status post" by entering text in associated text entry field 278 and invoking selectable "Post" control 280.

Figure 3A:
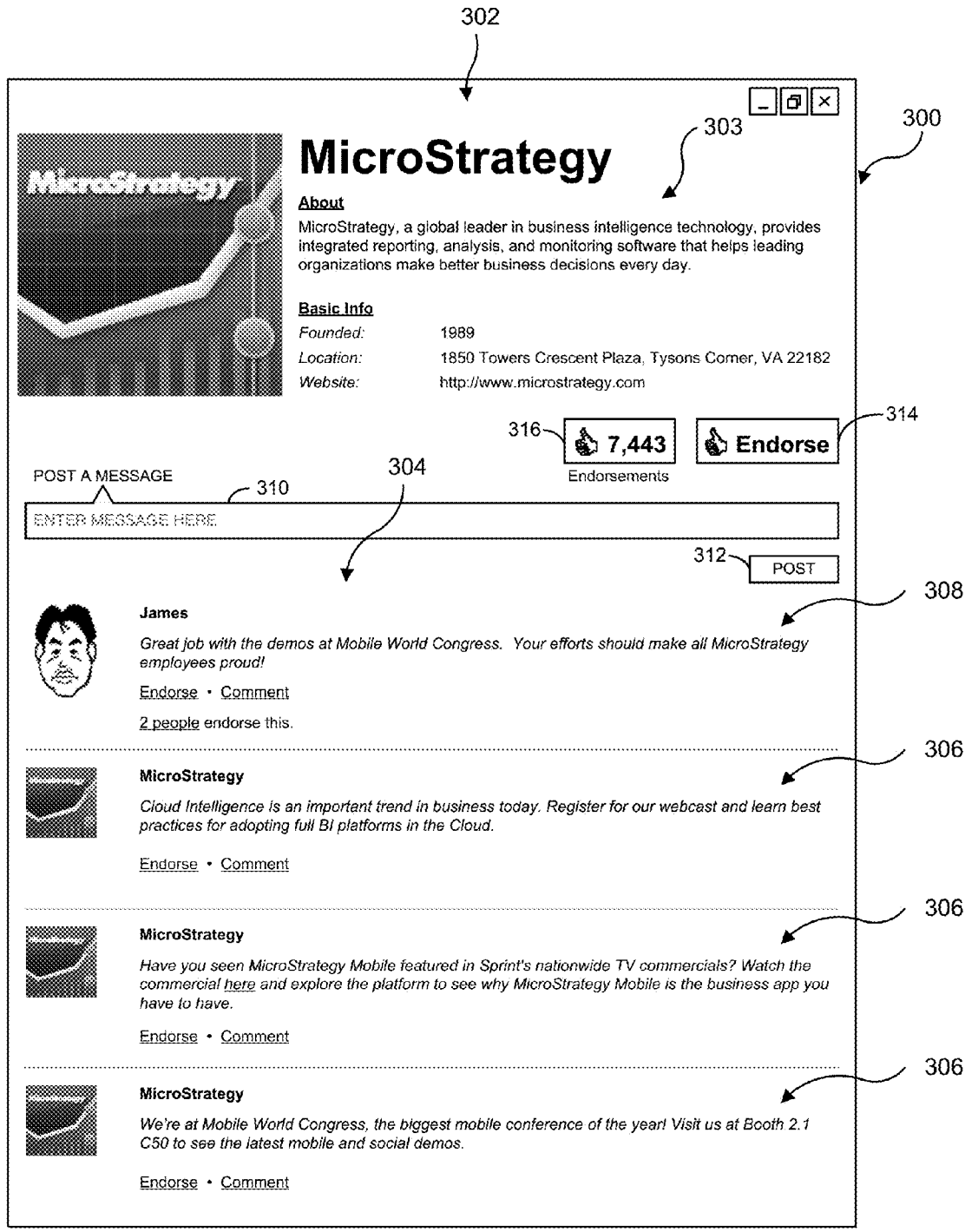

As discussed above, in some electronic social networking platforms, interests may be represented as interest objects that are manifested within the electronic social networking platform as "pages." FIG. 3A is a diagram of an example of a GUI 300 for an example of an electronic social networking platform within which interests are represented as interest objects that are manifested within the electronic social networking platform as "pages." More particularly, GUI 300 displays the MicroStrategy "page" 302 corresponding to the MicroStrategy interest object that represents the software and technology company, MicroStrategy, within the electronic social networking platform.

As illustrated in FIG. 3A, the MicroStrategy "page" 302 includes a description section 303 that provides background information about MicroStrategy. The MicroStrategy "page" 302 also includes a feed 304 that includes, among other content, messages 306 generated by the MicroStrategy "page" 302 and published to user identities of the electronic social networking platform who have endorsed the MicroStrategy "page" 302 or otherwise established a connection to the MicroStrategy "page" 302 within the electronic social networking platform. In addition, as further illustrated in FIG. 3A, the feed 304 also includes messages 308 posted directly to the MicroStrategy "page" 302 by user identities of the electronic social networking platform. The electronic social networking platform may provide a variety of different mechanisms that enable user identities of the electronic social networking platform to post messages directly to a "page," such as, for example, the MicroStrategy "page" 302. In one example, the electronic social networking platform may enable a user identity to post a message directly to the MicroStrategy "page" 302 by entering text in text entry field 310 and invoking selectable "Post" control 312. Although not illustrated as such in FIG. 3A, feed 304 also may include various additional or alternative types of content.

The MicroStrategy "page" 302 also includes a selectable "Endorse" control 314 that enables user identities who view the MicroStrategy "page" 302 and who have not already endorsed MicroStrategy to record an endorsement of MicroStrategy as one of their interests. In response to invocation of selectable "Endorse" control 314 by a particular user identity, the electronic social networking platform records that the particular user identity has endorsed MicroStrategy as an interest, for example, by establishing a connection between the user identity and the interest object that represents MicroStrategy within the electronic social networking platform. As illustrated in FIG. 3A, the MicroStrategy "page" 302 also includes an indication 316 reporting that 7,443 user identities already have endorsed MicroStrategy within the electronic social networking platform.

In some electronic social networking platforms, interests endorsed by a particular user identity may be shared with or otherwise made available to other user identities of the electronic social networking platform. In particular, in some electronic social networking platforms, interests endorsed by a particular user identity may be shared with other user identities who are members of the particular user identity's social network. For example, an electronic social networking platform may provide user identities who are members of a particular user identity's social network with access to a detailed user identity profile "page" that includes, among other information, indications of interests that the particular user identity has endorsed within the electronic social networking platform.

FIG. 3B is a diagram of an example of a GUI 350 for an example of an electronic social networking platform that displays a profile page 352 for a user identity of the electronic social networking platform identified as James. As illustrated in FIG. 3B, the profile "page" 352 for the user identity identified as James includes a basic information section 354 that records certain biographic information about James including James' gender (male), birthday (Jul. 4, 1976), current city (Washington, DC), hometown (Chicago, Ill.), relationship status (single), sexual orientation (interested in women), and primary language (English). The profile "page" 352 for the user identity identified as James also includes a work and education section 356 that records certain information about James' employment and education history including James' employer and role (MicroStrategy (Software Developer)), college/university and degree (Massachusetts Institute of Technology (Electrical Engineering)), and high school (Lincoln Park High School). In addition, the profile "page" 352 for the user identity identified as James also includes a contact information section 358 that records certain contact information for James including James' mailing address (Washington, DC), e-mail address (user2@email.com), and phone number (+1 555 555 1212). Finally, the profile page "352" for the user identity identified as James includes an interests section 360 that lists various different interests that James has endorsed or otherwise recorded within the electronic social networking platform. As illustrated in FIG. 3B, one of the interests that James has endorsed within the electronic social networking platform is MicroStrategy. As described above, James may have recorded his endorsement of MicroStrategy by invoking the "Endorse" control 314 included in the MicroStrategy "page" 302 illustrated in FIG. 3A.

As described above, an electronic social networking platform may enable independent applications to leverage the electronic social networking platform, for example, to provide more compelling user experiences for the users of the independent applications by accessing and/or extracting data from the electronic social networking platforms.

Figure 4A:
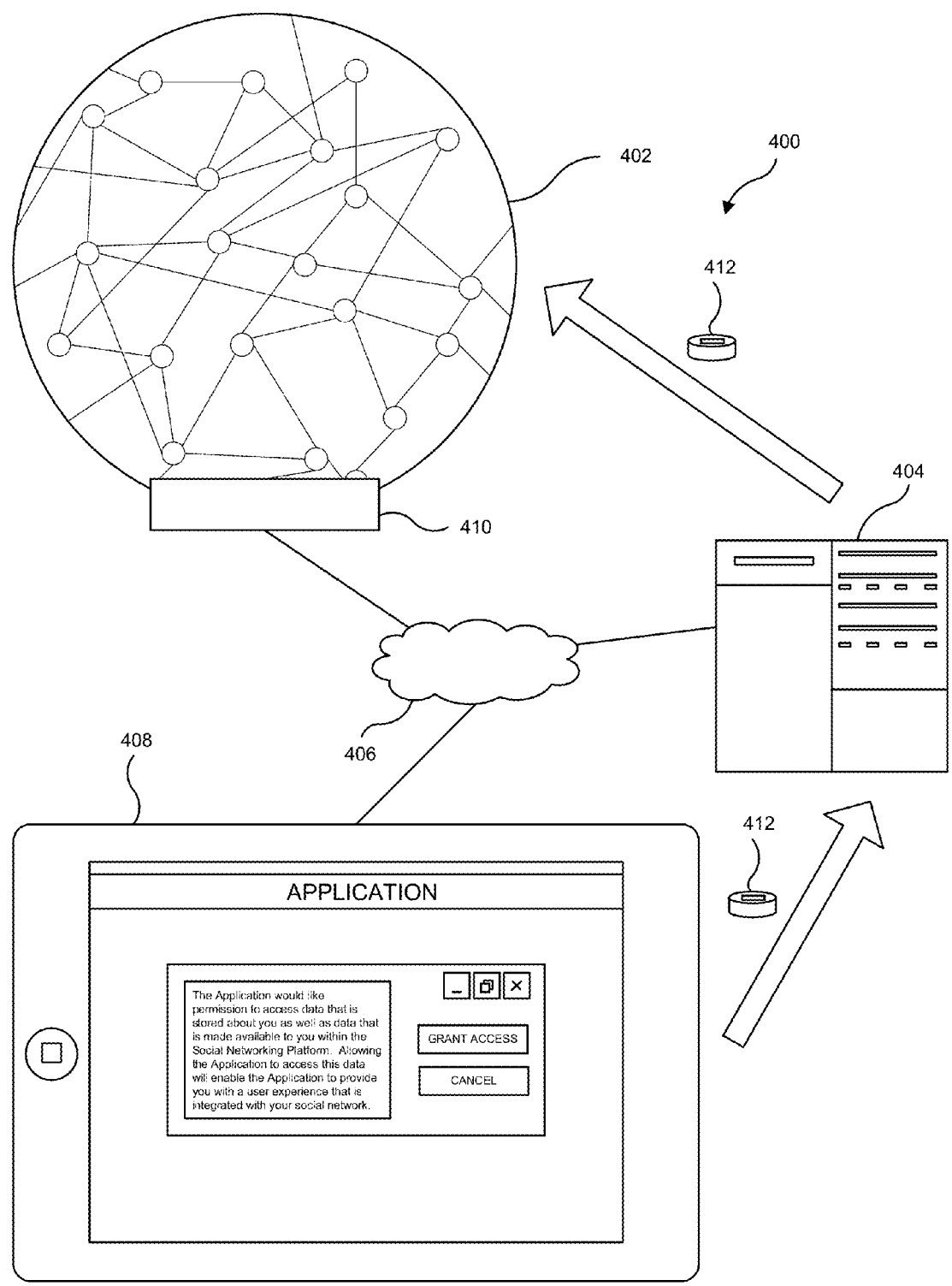
FIGS. 4A-4C are block diagrams of an example of a network computing environment.
Figure 4B:
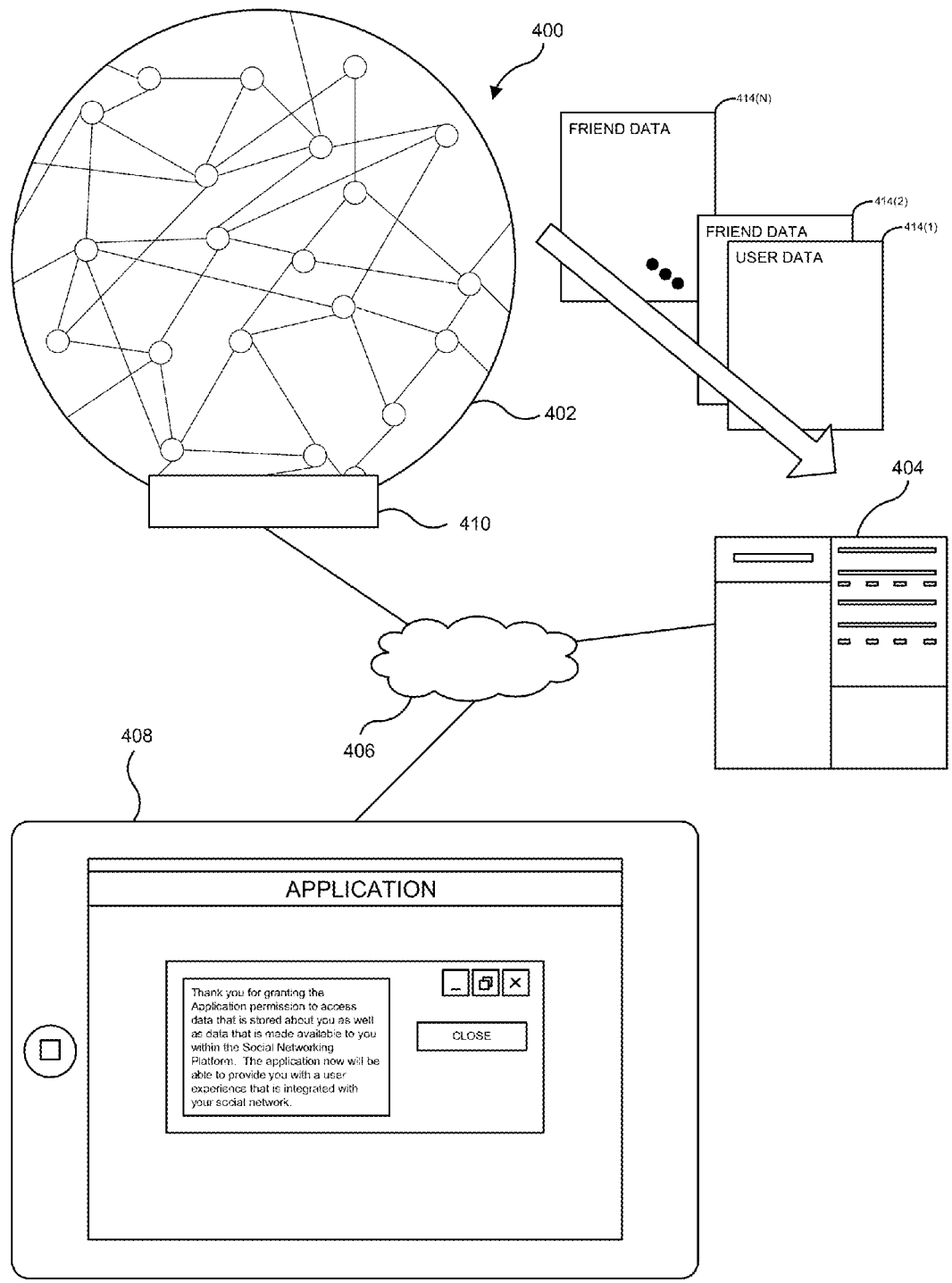
Figure 4C:
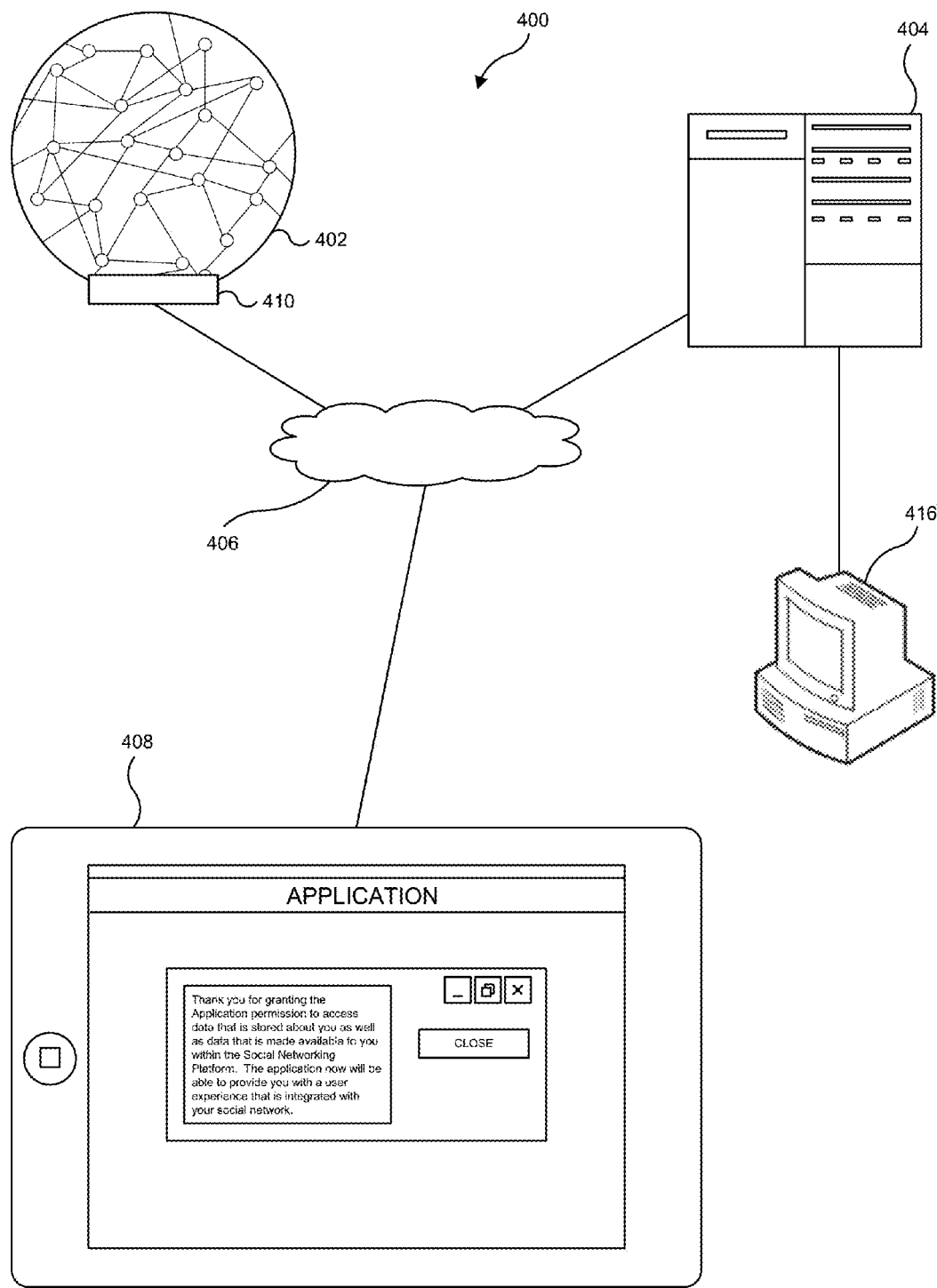

FIGS. 4A-4C are block diagrams of an example of a network computing environment 400 that includes, among other elements, an electronic social networking platform 402 and a computing system 404 that is external to the electronic social networking platform 402 that hosts an application that leverages the electronic social networking platform 402. Electronic social networking platform 402 is accessible to computing system 404 over a network 406. As illustrated in FIGS. 4A-4C, network computing environment 400 also includes a computing device 408. Both electronic social networking platform 402 and computing system 404 may be accessible to computing device 408 over network 406. For illustrative purposes, several elements illustrated in FIGS. 4A-4C and described below are represented as monolithic entities. However, these elements each may include and/or be implemented on numerous interconnected computing devices and other components that are designed to perform a set of specified operations.

Electronic social networking platform 402 may be implemented using one or more computing devices (e.g., servers) configured to provide a service to one or more client devices (e.g., computing device 408) connected to electronic social networking platform 402 over network 406. The one or more computing devices on which electronic social networking platform 402 is implemented may have internal or external storage components storing data and programs such as an operating system and one or more application programs. The one or more application programs may be implemented as instructions that are stored in the storage components and that, when executed, cause the one or more computing devices to provide the features of an electronic social networking platform 402. Furthermore, the one or more computing devices on which electronic social networking platform 402 is implemented each may include one or more processors for executing instructions stored in storage and/or received from one or more other electronic devices, for example over network 406. In addition, these computing devices also typically may include network interfaces and communication devices for sending and receiving data. Electronic social networking platform 402 also may provide an application programming interface (API) 410 that enables other applications to interact with and extract data from the electronic social networking platform 402.

Computing system 404 also may be implemented using one or more computing devices (e.g., servers). The one or more computing devices on which computing system 404 is implemented may have internal or external storage components storing data and programs such as an operating system and one or more application programs. The one or more application programs may be implemented as instructions that are stored in the storage components and that, when executed, cause the one or more computing devices to provide the functionality ascribed herein to the computing system 404. Furthermore, the one or more computing devices on which computing system 404 is implemented each may include one or more processors for executing instructions stored in storage and/or received from one or more other electronic devices, for example, over network 406. In addition, these computing devices also typically may include network interfaces and communication devices for sending and receiving data.

As described in greater detail below, computing system 404 hosts an independent application that leverages electronic social networking platform 402 to provide a service to one or more client devices (e.g., computing device 408). As such, computing system 404 is configured to extract and store data from electronic social networking platform 402. For example, computing system 404 may be configured to exploit API 410 to extract data from electronic social networking platform 402.

Network 406 may provide direct or indirect communication links between electronic social networking platform 402, computing system 404, and computing device 408. Examples of network 406 include the Internet, the World Wide Web, wide area networks (WANs), local area networks (LANs) including wireless LANs (WLANs), analog or digital wired and wireless telephone networks, radio, television, cable, satellite, and/or any other delivery mechanisms for carrying data.

Computing device 408 may be any of a number of different types of computing devices including, for example, a tablet computer as illustrated in FIGS. 4A-4C, or a mobile phone, a smartphone, a personal digital assistant, a laptop or netbook computer, or a desktop computer. Furthermore, computing device 408 typically may have internal or external storage components for storing data and programs such as an operating system and one or more application programs. In particular, the internal or external storage components for computing device 408 may store a client application for interfacing with electronic social networking platform 402 and/or a client application for interfacing with computing system 404. Additionally or alternatively, computing device 408 may be configured to interface with electronic social networking platform 402 or computing system 404 without a specific client application, using, for example, a web browser. As such, one or more user identities of electronic social networking platform 402 may be able to use computing device 408 to access electronic social networking platform 402. Similarly, one or more users of the independent application that leverages electronic social networking platform 402 hosted by computing system 404 may be able to use computing device 408 to access the independent application.

Computing device 408 also typically may include a central processing unit (CPU) for executing instructions stored in storage and/or received from one or more other electronic devices, for example over network 406. Computing device 408 also usually may include one or more communication devices for sending and receiving data. One example of such communications devices is a modem. Other examples include antennas, transceivers, communications cards, and other network adapters capable of transmitting and receiving data over a network (e.g., network 406) through a wired or wireless data pathway.

As illustrated in FIGS. 4A-4C, the electronic social networking platform 402 may be represented in the form of a graph, where user identities are represented by nodes and connections between user identities are represented by edges connecting the nodes. The electronic social networking platform 402 may enable individual user identities to construct social networks within the electronic social networking platform 402 by establishing connections with other user identities. Electronic social networking platform 402 enables user identities who are members of a social network within electronic social networking platform 402 to share various different types of data and other content (e.g., including electronic messages) with each other within the context of the electronic social networking platform 402.

Furthermore, in addition to the service(s) that electronic social networking platform 402 itself provides to user identities, electronic social networking platform 402 also provides mechanisms (e.g., API 410) that enable independent applications to leverage electronic social networking platform 402 to provide services to user identities of the electronic social networking platform 402. For example, among other features, electronic social networking platform 402 enables user identities of electronic social networking platform 402 to grant access tokens (or some other form of access mechanism or access right (e.g., a password or PIN)) to such independent applications that authorize the independent applications to which the tokens are granted to extract data from electronic social networking platform 402 on behalf of the user identities.

In some implementations, the token (or other form of access mechanism or access right (e.g., a password or PIN)) that a particular user identity grants to an independent application may enable the independent application to access and/or extract the particular user identity's user profile data as well as the user profile data for any other user identities of the electronic social networking platform 402 who are members of the particular user identity's social network within the electronic social networking platform 402. Additionally or alternatively, the token (or other form of access mechanism or access right (e.g., a password or PIN)) that the particular user identity grants to the independent application may enable the independent application to access and/or extract data shared or received by the particular user identity within the electronic social networking platform 402 as well as data shared or received by any other user identities who are members of the particular user identity's social network within the electronic social networking platform 402.

As discussed above, computing system 404 hosts an independent application that leverages electronic social networking platform 402. The electronic social networking platform 402 is accessible to the application hosted by computing system 404 over network 406 and, for example, via API 410. In addition, the application hosted by computing system 404 is accessible to client devices (e.g., computing device 408) also over network 406.

As illustrated in FIG. 4A, in order for the application hosted by computing system 404 to extract data about or otherwise related to a particular user identity and/or other user identities who are members of the particular user identity's social network from electronic social networking platform 402, the particular user identity first may grant the application hosted by computing system 404 a token 412 (or some other form of access mechanism or right (e.g., a password or PIN)) that authorizes the application to extract such data from the electronic social networking platform 402 on behalf of the particular user identity. Upon acquiring a token 412 (or other form of access mechanism or right (e.g., a password or PIN)) for the particular user identity, the application thereafter may transmit the token 412 (or other form of access mechanism or right (e.g., a password or PIN)) to electronic social networking platform 402 along with requests to extract data from the electronic social networking platform 402 on behalf of the particular user identity. (Although FIG. 4A schematically illustrates token 412 (or other form of access mechanism or right (e.g., a password or PIN)) as being transmitted to the application hosted by computing system 404 from the computing device of the particular user identity (e.g., computing device 408), it will be understood that token 412 (or other form of access mechanism or right (e.g., a password or PIN)) actually may be transmitted to the application by the electronic social networking platform 402 (e.g., after being authorized to do so by the particular user identity).)

Referring now to FIG. 4B, when electronic social networking platform 402 receives a request from the application hosted by computing system 404 on behalf of the particular user identity to extract data about or otherwise related to the particular user identity and/or other user identities who are members of the particular user identity's social network from electronic social networking platform 402 that is accompanied by the appropriate token 412 authorizing the application to extract data from the electronic social networking platform 402 on behalf of the particular user identity, the electronic social networking platform 402 locates and returns the requested data 414 about or otherwise related to the particular user identity and/or other user identities who are members of the particular user identity's social network to the application hosted by computing system 404.

In some implementations, the application hosted by computing system 404 may extract the following data 414(1) about or otherwise related to the particular user identity from the electronic social networking platform 402: name; gender; birthday (and/or age); current city; hometown; relationship status; sexual orientation; primary language; employment history; education history; contact information (e.g., mailing address(es), e-mail address(es), phone number(s), etc.); interests recorded with the electronic social networking platform 402 (e.g., by endorsing interest objects manifested as "pages" within the electronic social networking platform 402); "check-ins" registered with the electronic social networking platform 402; event information for events to which the particular user identity has been invited within the context of the electronic social networking platform 402; "status posts" published by the particular user identity to other user identities who are members of the particular user identity's social network and any related responsive comments and/or endorsements; and "wall posts" or "timeline posts" received by the particular user identity.

Additionally or alternatively, the application hosted by computing system 404 also may extract the following data 414(2)-414(N) about or otherwise related to each other user identity who is a member of the particular user identity's social network from the electronic social networking platform: name; gender; birthday (and/or age); current city; hometown; relationship status; sexual orientation; primary language; employment history; education history; contact information (e.g., mailing address(es), e-mail address(es), phone number(s), etc.); interests recorded with the electronic social networking platform 402 (e.g., by endorsing interest objects manifested as "pages" within the electronic social networking platform 402); "check-ins" registered with the electronic social networking platform 402; event information for events to which the user identity has been invited within the context of the electronic social networking platform 402; "status posts" published by the user identity to other user identities who are members of the user identity's social network and any related responsive comments and/or endorsements; and "wall posts" or "timeline posts" received by the user identity.

The application hosted by computing system 404 may extract from the electronic social networking platform 402 data about or otherwise related to each user identity for whom the application hosted by computing system 404 has received a token (or other form of access mechanism or right (e.g., a password or PIN)). Additionally or alternatively, the application hosted by computing system 404 may extract from the electronic social networking platform 402 data about or otherwise related to the other user identities of the electronic social networking platform 402 who are members of the social networks of each user identity for whom the application hosted by computing system 404 has received a token (or other form of access mechanism or right (e.g., a password or PIN)). In this manner, in some implementations, the application hosted by computing system 404 may extract from the electronic social networking platform 402 data about or otherwise related to user identities of the electronic social networking platform who are not also users of the application hosted by computing system 404.

After extracting data from the electronic social networking platform 402, the application hosted by computing system 404 may store the extracted data (e.g., in the storage components accessible to computing system 404). More particularly, in some implementations, the application hosted by computing system 404 may store the extracted data in one or more databases. For example, the application hosted by computing system 404 may store the extracted data in one or more on-line transaction processing (OLTP) databases. Such OLTP databases may be implemented as relational or other forms of databases.

As described in greater detail below, the application hosted by computing system 404 may process the data extracted from the electronic social networking platform 402 to glean intelligence about the users of the application and/or the other user identities of the electronic social networking platform 402 who are members of the social networks of the users of the application. In some such implementations, the application hosted by computing system 404 may process the extracted data stored in the database(s) and load the processed data into a data warehouse (e.g., an on-line analytical processing (OLAP) data warehouse) that may facilitate analyzing and/or acting upon the processed data.

In order to keep the data that is available to the application hosted by computing system 404 generally synchronized with the data in the electronic social networking platform 402, the application hosted by computing system 404 occasionally may repeat the extraction from the electronic social networking platform 402 of data about or otherwise related to each user identity for whom the application hosted by computing system 404 has received a token (or other form of access mechanism or right (e.g., a password or PIN)) as well as data about or otherwise related to other user identities of the electronic social networking platform 402 who are members of the social networks of each user identity for whom the application hosted by computing system 404 has received a token (or other form of access mechanism or right (e.g., a password or PIN)).

The application hosted by computing system 404 may use the data extracted from the electronic social networking platform 402 for a variety of different purposes. For example, the application hosted by computing system 404 may use the data extracted from the electronic social networking platform 402 to provide a compelling user experience for users of the application that is tied into the users' social networks.

Additionally or alternatively, as suggested above, the application hosted by computing system 404 may process the data extracted from the electronic social networking platform 402 to glean intelligence about the users of the application and/or the other user identities of the electronic social networking platform 402 who are members of the social networks of the users of the application. The application then may utilize this intelligence to transmit targeted content to user identities, for example, by identifying segments of user identities who share one or more characteristics and transmitting content perceived as relevant, attractive, or appealing to these segments to the user identities identified as belonging to the segments.

Referring now to FIG. 4C, the application hosted by computing system 404 may enable an administrator or other representative associated with the application to access the data that the application extracts from the electronic social networking platform and to otherwise interact with the application hosted by computing system 404, for example, via a computing device 416. Computing system 404 may be accessible to computing device 416 over a network connection (e.g., network 406) or any other form of communication mechanism capable of carrying data. Computing device 416 may be any of a number of different types of computing devices including, for example, a desktop computer, a laptop or netbook computer, a tablet computer, a mobile phone, a smartphone, or a personal digital assistant. Furthermore, computing device 416 typically may have internal or external storage components for storing data and programs such as an operating system and one or more application programs. In particular, the internal or external storage components for computing device 416 may store a client application for interfacing with computing system 404. Additionally or alternatively, computing device 416 may be configured to interface with computing system 404 without a specific client application, using, for example, a web browser.

In some implementations, the application hosted by computing system 404 may provide a representative of the application with various tools for manipulating and analyzing the data extracted from the electronic social networking platform. Additionally or alternatively, the application hosted by computing system 404 may provide a representative of the application with tools that enable the representative of the application to define one or more segments of user identities who share one or more characteristics or who otherwise satisfy one or more criteria and to target these segments for delivery of content perceived as being highly relevant, attractive, or appealing to these segments. Such tools may reside on or otherwise be provided by computing system 404. Additionally or alternatively, such tools may be provided within a client application that is resident on computing device 416 and that is configured to enable the client application to access the application hosted by computing system 404.

FIGS. 5A-5H are diagrams of examples of GUIs 500, 524, 534, 552, 568, 574, 578, and 582 provided by an example of an application that leverages an electronic social networking platform that may enable analysis and segmentation of users of the application and/or other user identities of the electronic social networking platform who are members of the social networks of the users of the application based on information extracted from the electronic social networking platform by the application. The electronic social networking platform may correspond to the electronic social networking platform 402 illustrated and described above in connection with FIGS. 4A-4C, the application that leverages the electronic social networking platform may correspond to the application hosted by computing system 404 illustrated and described above in connection with FIGS. 4A-4C, and the GUIs 500, 524, 534, 552, 568, 574, 578, and 582 may be accessible via a computing device that corresponds to computing device 416 illustrated in FIG. 4C.

Depending upon the application and the scope of the information that the application extracts from the electronic social networking platform, in some implementations, the analysis and segmentation of user identities of the electronic social networking platform enabled by the application may be limited to analysis of user identities who also are users of the application. In other implementations, the application may enable analysis and segmentation of user identities of the electronic social networking platform who are users of the application as well as user identities of the electronic social networking platform who are members of the social networks of the user identities who are users of the application. The discussion of the analysis and segmentation of user identities of the electronic social networking platform enabled by the application that follows will not generally distinguish user identities of the electronic social networking platform who also are users of the application from user identities of the electronic social networking platform who are not also users of the application. Instead, the following discussion generally will focus on the analysis and segmentation enabled by the application of user identities of the electronic social networking platform for whom the application extracts data from the electronic social networking platform irrespective of whether the user identities are users of the application or are members of the social networks of users of the application.

As discussed above, the application may extract a wide variety of different types of information from the electronic social networking platform for each user identity for whom the application extracts information from the electronic social networking platform. For example, for each user identity for whom the application extracts information from the electronic social networking platform, the application may extract (or attempt to extract) the following information: name; gender; birthday (and/or age); current city; hometown; relationship status; sexual orientation; primary language; employment history; education history; contact information (e.g., mailing address(es), e-mail address(es), phone number(s), etc.); interests recorded with the electronic social networking platform (e.g., by endorsing interest objects manifested as "pages"); "check-ins" registered with the electronic social networking platform; event information for events to which the user identity has been invited within the context of the electronic social networking platform; "status posts" published by the user identity to other user identities who are members of the user identity's social network and any related responsive comments and/or endorsements; and "wall posts" or "timeline posts" received by the user identity.

In some situations, the application may be unable to extract certain types of information from the electronic social networking platform for a particular user identity. In some cases, this may be due to the fact that the particular user identity has not supplied the desired type(s) of information to the electronic social networking platform. Alternatively, the particular user identity may have supplied the desired type(s) of information to the electronic social networking platform, but the application may not be authorized to extract the desired type(s) of information from the electronic social networking platform for the particular user identity (e.g., based on the particular user identity's privacy settings).

Figures 5A, 5B:
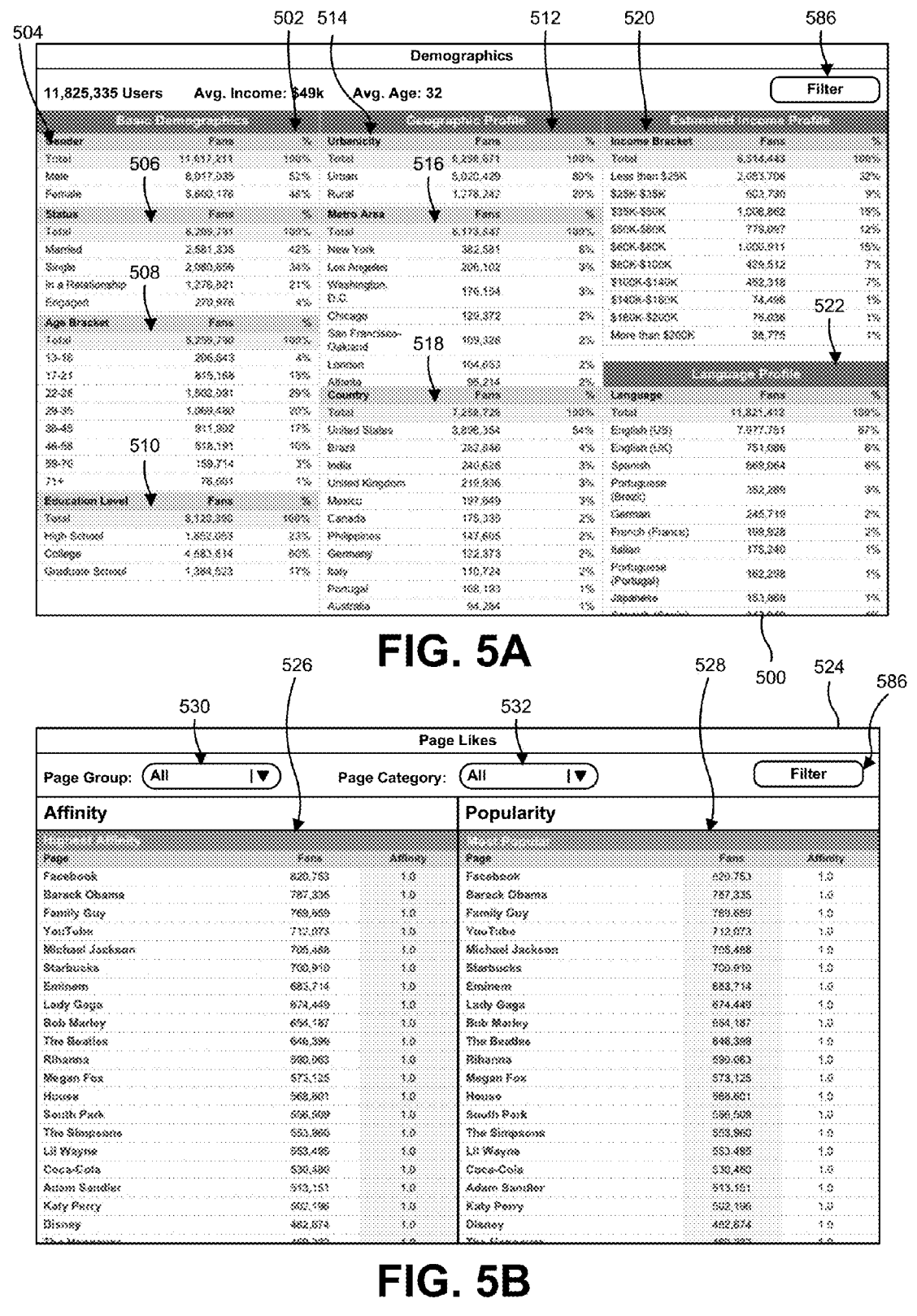

Referring first to FIG. 5A, GUI 500 displays aggregated statistics about various different demographic characteristics of 11,825,335 user identities of the electronic social networking platform based on information extracted from the electronic social networking platform by the application for the 11,825,335 user identities.

For example, GUI 500 includes a "Basic Demographics" panel 502 that presents aggregated statistics about the gender, relationship status, age, and education level of the users identities for whom the application extracted information from the electronic social networking platform. More particularly, the "Basic Demographics" panel 502 includes a gender subpanel 504 that indicates that the application extracted gender information from the electronic social networking platform for 11,617,221 user identities and that 52% of these user identities were male while 48% were female.

The "Basic Demographics" panel 502 also includes a relationship status sub-panel 506 that indicates that the application extracted relationship status information from the electronic social networking platform for 6,209,791 user identities and that 42% of these user identities were married, 34% were single, 21% were in a relationship, and 4% were engaged.

In addition, the "Basic Demographics" panel 502 includes an age sub-panel 508 that indicates that the application extracted birthday (or age) information from the electronic social networking platform for 5,259,790 user identities and that provides a breakdown by age bracket of these 5,259,790 user identities. It will be understood that the age brackets illustrated in age sub-panel 508 may be arbitrary, and that the application may use other age brackets instead. Moreover, the application actually may enable a user to configure the age brackets to be used within age sub-panel 508.

Finally, the "Basic Demographics" panel 502 includes an education level sub-panel 510 that indicates that the application extracted education history information for 8,120,390 user identities and that the highest level of education attended was high school for 23% of these user identities, college for 60% of these user identities, and graduate school for 17% of these user identities. The application may determine the highest level of education attended for an individual user identity based on the highest level of education for which the user identity specified a school that the user identity attended in the user identity's profile. For example, if a user identity specified a high school that the user identity attended but no college or graduate school, the application may determine that high school was the highest level of education that the user identity attended. Similarly, if a user identity specifies a graduate school that the user identity attended but no high school or college, the application may determine that graduate school was the highest level of education that the user identity attended.

GUI 500 also includes a "Geographic Profile" panel 512 that presents aggregated statistics about the current locations of residence of the user identities for whom the application extracted information from the electronic social networking platform. More particularly, the "Geographic Profile" panel 512 includes an urbanicity sub-panel 514 that indicates that the application was able to map the current locations of residence of 6,298,671 user identities for whom current residence information was extracted from the electronic social networking platform to either urban or rural areas and that, of these user identities, 80% currently reside in urban areas while 20% currently reside in rural areas. As described in greater detail below, the current residence information for user identities extracted from the electronic social networking platform may not actually indicate whether the locations of current residence of the user identities are in urban or rural areas. Instead, the current residence information for user identities extracted from the electronic social networking platform may simply identify the current cities (and perhaps states/territories and/or countries) of residence of the user identities. As such, the application may employ intelligent mapping techniques to the current cities (and perhaps states/ territories and/or countries) of residence of the user identities extracted from the electronic social networking platform to determine whether the current locations of residence of the user identities are in urban or rural areas. In some cases, the application may not be able to determine whether a particular user identity's location of current residence is located in an urban or rural area based on the current residence information extracted from the electronic social networking platform for the particular user identity. In such cases, the application may not include data for the particular user identity in the statistics presented in the urbanicity sub-panel 514.

The "Geographic Profile" panel 512 also includes a metro area sub-panel 516 that indicates that the application was able to map the current locations of residence of 6,173,847 user identities for whom current residence information was extracted from the electronic social networking platform to different metro areas and that provides a breakdown of current residence by metro area for these 6,173,847 user identities. As illustrated in FIG. 5A, the view of metro area sub-panel 516 displayed within GUI 500 includes only seven different metro areas accounting for only 20% of the user identities for whom the application was able to map the current residence information extracted from the electronic social networking platform to different metro areas. Therefore, GUI 500 is configured to enable a user to scroll the view of metro area sub-panel 516 to display metro area information for additional user identities.

As described in greater detail below, the current residence information for user identities extracted from the electronic social networking platform may not actually indicate metro areas to which the locations of current residence of the user identities belong. Instead, the current residence information for user identities extracted from the electronic social networking platform may simply identify the current cities (and perhaps states/territories and/or countries) of residence of the user identities. As such, the application may employ intelligent mapping techniques to the current cities (and perhaps states/territories and/or countries) of residence of the user identities extracted from the electronic social networking platform to determine whether the current locations of residence of the user identities belong to different metro areas. In some cases, the application may determine that a particular user identity's location of current residence does not belong to any metro area based on the current residence information extracted from the electronic social networking platform for the particular user identity. In such cases, the application may not include data for the particular user identity in the statistics presented in the metro area sub-panel 516.

The "Geographic Profile" panel 512 also includes a country sub-panel 518 that indicates that the application was able to identify the country of current residence of 7,258,729 user identities for whom current residence information was extracted from the electronic social networking platform and that provides a breakdown of current residence by country for these 7,258,729 user identities. As illustrated in FIG. 5A, the view of country sub-panel 518 displayed within GUI 500 includes only eleven different countries accounting for only 77% of the user identities for whom the application was able to identify the country of current residence based on the current residence information extracted from the electronic social networking platform. Therefore, GUI 500 is configured to enable a user to scroll the view of country sub-panel 518 to display country information for additional user identities.

As described in greater detail below, the current residence information for user identities extracted from the electronic social networking platform may not actually indicate the countries of current residence of the user identities. Instead, the current residence information for user identities extracted from the electronic social networking platform may simply identify the current cities (and perhaps states/territories) of residence of the user identities. As such, the application may employ intelligent mapping techniques to the current cities (and perhaps states/territories) of residence of the user identities extracted from the electronic social networking platform to determine the countries of current residence of the user identities. In some cases, the application may be unable to identify a country of current residence for a particular user identity based on the current residence information extracted from the electronic social networking platform for the particular user identity. In such cases, the application may not include data for the particular user identity in the statistics presented in the country sub-panel 518.

GUI 500 also includes an "Estimated Income Profile" panel 520 that presents aggregated statistics about the estimated incomes of user identities for whom the application extracted information from the electronic social networking platform. More particularly, the "Estimated Income Profile" panel 520 indicates that the application was able to generate income estimates for 6,514,443 user identities based on information extracted from the electronic social networking platform for the user identities and presents a breakdown by income bracket for these 6,514,443 user identities. It will be understood that the income brackets illustrated in "Estimated Income Profile" panel 520 may be arbitrary, and that the application may use other income brackets instead. Moreover, the application actually may enable a user to configure the income brackets to be used within "Estimated Income Profile" panel 520.

As described in greater detail below, the electronic social networking platform may not actually maintain estimated income information for user identities of the electronic social networking platform. As such, the application may employ intelligent techniques to other data extracted from the electronic social networking platform for user identities, such as, for example, the user identities' age, employment history, education history, and current residence to estimate the user identities' income. In some cases, the application may be unable to estimate a particular user identity's income based on the information extracted from the electronic social networking platform for the particular user identity. In such cases, the application may not include data for the particular user identity in the statistics presented in the "Estimated Income Profile" panel 520.

GUI 500 also includes a "Language Profile" panel 522 that presents aggregated statistics about the primary languages of user identities for whom the application extracted information from the electronic social networking platform. More particularly, the "Language Profile" panel 522 indicates that the application was able to identify primary languages for 11,821,412 of the user identities for whom data was extracted from the electronic social networking platform and presents a breakdown of these 11,821,412 user identities by primary language. As illustrated in FIG. 5A, the view of "Language Profile" panel 522 displayed within GUI 500 includes only ten different languages accounting for only 90% of the user identities for whom the application was able to identify primary languages based on information extracted from the electronic social networking platform. Therefore, GUI 500 is configured to enable a user to scroll the view of "Language Profile" panel 522 to display primary language information for additional user identities.

Referring now to FIG. 5B, GUI 524 displays aggregated statistics about various different interests of the 11,825,335 user identities of the electronic social networking platform for whom the application extracted information from the electronic social networking platform based on interests that the user identities recorded with the electronic social networking platform, for example, by endorsing interest objects manifested as "pages" within the electronic social networking platform.

As illustrated in FIG. 5B, GUI 524 includes an "Affinity" panel 526 and a "Popularity" panel 528. "Affinity" panel 526 is described in greater detail below in connection with FIG. 7B. "Popularity" panel 528, meanwhile, presents a list of the interests determined to be most popular among the user identities for whom the application extracted information from the electronic social networking platform. More particularly, "Popularity" panel presents a list of the "pages" in the electronic social networking platform that were endorsed by the greatest number of user identities for whom the application extracted information from the electronic social networking platform. As illustrated in FIG. 5B, the "Facebook" "page" is the most popular "page" among user identities for whom the application extracted information from the electronic social networking platform, having been endorsed by 820,753 user identities. The remaining "pages" presented in "Popularity" panel 528 following the "Facebook" "page" are listed in descending order of popularity. The view of "Popularity" panel 528 displayed within GUI 524 includes only twenty-one different "pages." Therefore, GUI 524 may be configured to enable a user to scroll the view of "Popularity" panel 528 to display additional "pages" determined to be popular among the user identities for whom the application extracted information from the electronic social networking platform.

As illustrated in FIG. 5B, GUI 524 also includes a page group filter control 530 and a page category filter control 532. Individually or in combination, the page group filter control 530 and the page category filter control 532 enable a user to specify that the collection of "pages" from which "pages" to be presented within GUI 524 are drawn should be filtered to include only some subset of all of the "pages" endorsed by user identities for whom the application extracted information from the electronic social networking platform. More particularly, the page group filter control 530 and the page category filter control 532 enable a user to specify that the collection of "pages" from which "pages" to be presented within GUI 524 are drawn should be filtered according to the types or categories of "pages."

Some electronic social networking platforms may maintain their own taxonomies for categorizing "pages" (or, more generally, interests). In some implementations, the application may retain the categories assigned to "pages" (or interests) by the electronic social networking platform. In such implementations, the application may enable a user to use "page" category filter control 532 to specify that the collection of "pages" from which "pages" to be presented within GUI 524 are drawn should be filtered to include only "pages" categorized by the electronic social networking platform as belonging to one or more categories designated by the user.

Additionally or alternatively, the application may group the various different categories assigned to "pages" (or interests) by the electronic social networking platform into supersets of "page" (or interest) types. For example, an electronic social networking platform's taxonomy for categorizing "pages" (or interests) may include the categories concert venue, musician/band, record label, playlist, radio station, album, musical instrument, concert tour, song, music, musical genre, music chart, and music video, which the application may group all together into a superset identified as being related to music. In such implementations, the application may enable a user to use "page" group filter control 530 to specify that the collection of "pages" from which "pages" to be presented within GUI 524 are drawn should be filtered to include only "pages" belonging to one or more designated supersets of "page" types identified by the application.

Figure 5C:
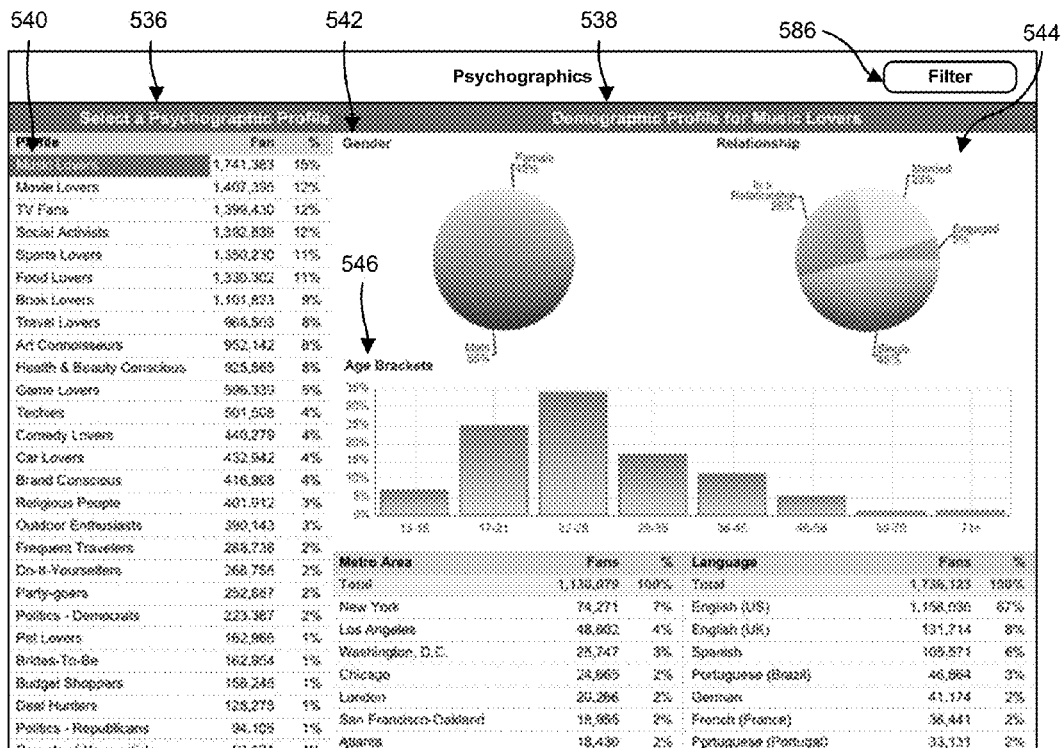

Referring now to FIG. 5C, GUI 534 displays aggregated statistics about subsets of the 11,825,335 user identities for whom the application extracted information from the electronic social networking platform classified as belonging to different psychographic profiles. Generally speaking, psychographic profiles may represent one or more particular interests, lifestyles, values, attitudes, behaviors, and/or personality types.

As illustrated in FIG. 5C, GUI 534 includes a "Psychographic Profile" panel 536 listing a number of different selectable psychographic profiles, including: music lovers, movie lovers, TV fans, social activists, sports lovers, food lovers, book lovers, travel lovers, art connoisseurs, health and beauty conscious, game lovers, techies, comedy lovers, car lovers, brand conscious, religious people, outdoor enthusiasts, frequent travelers, do-it-yourselfers, party-goers, politics—Democrats, pet lovers, brides-to-be, budget shoppers, deal hunters, politics—Republicans, and parents of young kids.

In addition, for each psychographic profile listed, "Psychographic Profile" panel 536 includes a number of the user identities from among the 11,825,335 user identities for whom the application extracted information from the electronic social networking platform that the application identified as belonging to the psychographic profile. The "Psychographic Profile" panel 536 also includes an indication of the percentage of the user identities from among the 11,825,335 user identities for whom the application extracted information from the electronic social networking platform that the application has identified as belonging to each psychographic profile. For example, the "Psychographic Profile" panel 536 indicates that the application identified 1,741,363 user identities from among the 11,825,335 user identities for whom the application extracted information from the electronic social networking platform as belonging to the music lovers psychographic profile and that this number represents 15% of the 11,825,335 user identities for whom the application extracted information from the electronic social networking platform. As illustrated in FIG. 5C, the psychographic profiles included in "Psychographic Profile" panel 536 are listed in descending order of the number of user identities the application identified as belonging to each psychographic profile.

Given screen real estate constraints, the view of "Psychographic Profile" panel 536 displayed within GUI 534 may not include all of the psychographic profiles to which the application has identified user identities as belonging. Therefore, GUI 534 may be configured to enable a user to scroll the view of "Psychographic Profile" panel 536 to display additional selectable psychographic profiles, including, for example, environmentally aware, charity minded, shopping lovers, beverage lovers, and on-line shoppers.

As described in greater detail below, the electronic social networking platform may not actually classify user identities as belonging to different psychographic profiles. As such, the application may employ intelligent techniques to identify user identities as belonging to different psychographic profiles based on data extracted from the electronic social networking platform for the user identities, including, for example, interest objects endorsed by the user identities, "check-ins" registered by the user identities, and/or various different demographic characteristics of the user identities.

GUI 534 also includes a "Demographic Panel" 538 configured to display aggregated statistics about various different demographic characteristics of the user identities who the application identified as belonging to a psychographic profile selected from the list of psychographic profiles presented in "Psychographic Profile" panel 536. As illustrated in FIG. 5C, the music lovers psychographic profile 540 presently is selected within the "Psychographic Profile" panel 536. Consequently, "Demographic Profile" panel 538 is displaying aggregated statistics about the 1,741,363 user identities that the application identified as belonging to the music lovers psychographic profile 540.

More particularly, "Demographic Panel" 538 includes a gender sub-panel 542 that provides a breakdown by gender of the user identities that the application identified as music lovers for whom gender data is available, indicating that 55% of the music lovers for whom gender data is available are male while 45% of the music lovers for whom gender data is available are female.

"Demographic Panel" 538 also includes a relationship status sub-panel 544 that provides a breakdown by relationship status of the user identities that the application identified as music lovers for whom relationship status data is available.

In addition, "Demographic Panel" 538 includes an age sub-panel 546 that presents a histogram reflecting the distribution of the ages of the user identities that the application identified as music lovers for whom age data is available.

"Demographic Panel" 538 also includes a metro area sub-panel 548 that indicates that the application was able to map the current locations of residence of 1,130,079 of the user identities that the application identified as music lovers to different metro areas and that provides a breakdown of current residence by metro area for these 1,130,079 user identities. As illustrated in FIG. 5C, the view of metro area sub-panel 548 displayed within GUI 534 includes only seven different metro areas accounting for only 22% of the music lovers for whom the application was able to map the current residence information extracted from the electronic social networking platform to different metro areas. Therefore, GUI 548 is configured to enable a user to scroll the view of metro area sub-panel 548 to display metro area information for additional music lovers.

Finally, "Demographic Panel" 538 includes a language profile sub-panel 550 that presents aggregated statistics about the primary languages of music lovers for whom the application extracted primary language information from the electronic social networking platform. More particularly, the language profile sub-panel 550 indicates that the application was able to identify primary languages for 1,736,123 of the music lovers for whom data was extracted from the electronic social networking platform and presents a breakdown of these 1,736,123 music lovers by primary language. As illustrated in FIG. 5C, the view of language profile sub-panel 550 displayed within GUI 534 includes only seven different countries accounting for only 90% of the music lovers for whom the application was able to identify primary languages based on information extracted from the electronic social networking platform. Therefore, GUI 534 is configured to enable a user to scroll the view of language profile sub-panel 550 to display primary language information for additional music lovers.

Responsive to selection of a different one of the psychographic profiles included in "Psychographic Profile" panel 536, GUI 534 updates "Demographic Profile" panel 538 to present aggregated statistics about the various different demographic characteristics of the user identities whom the application identified as belonging to the newly selected psychographic profile.

Figure 5D:
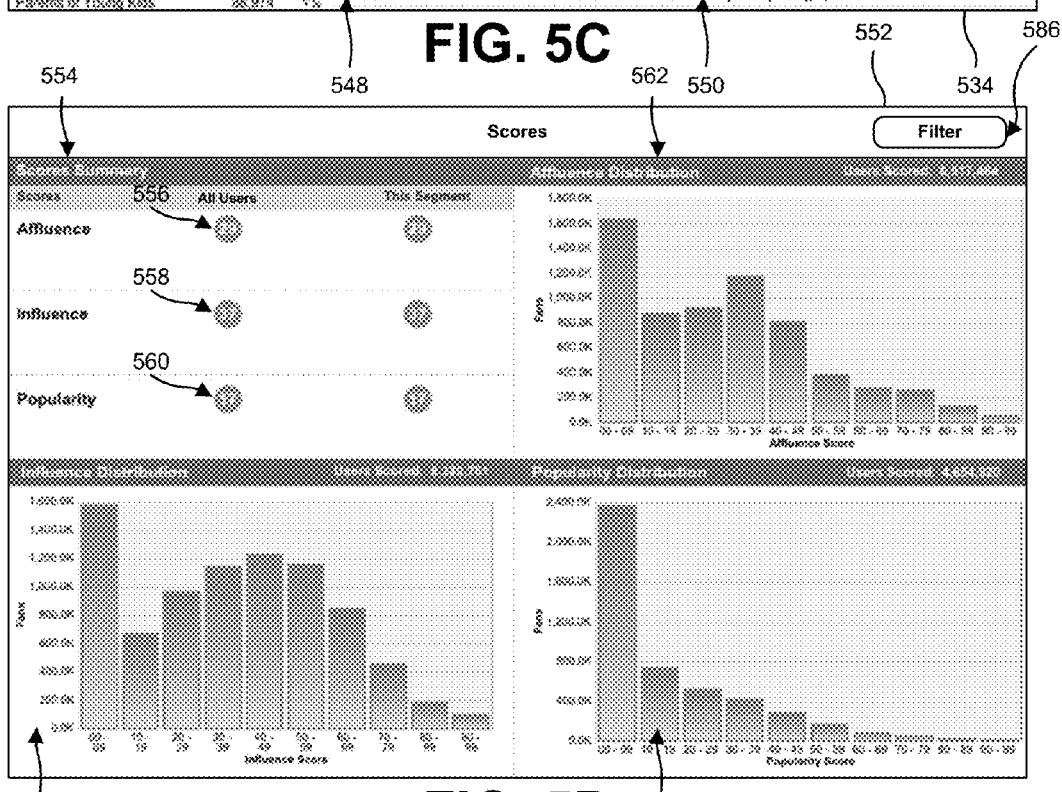

Referring now to FIG. 5D, GUI 552 displays aggregated statistics about measures (e.g., scores) of the affluence, influence, and popularity of the 11,825,335 user identities for whom the application extracted information from the electronic social networking platform derived from various different types of data that the application extracted from the electronic social networking platform. As described in greater detail below, the electronic social networking platform may not actually calculate measures of the affluence, influence, and/or popularity of user identities. As such, the application may employ intelligent techniques to calculate measures of the affluence, influence, and/or popularity of user identities based on data extracted from the electronic social networking platform for the user identities. Depending upon the data available from the electronic social networking platform for individual user identities, the application may be unable to calculate measures of the affluence, influence, and/or popularity of some of the 11,825,335 user identities for whom the application extracted information from the electronic social networking platform.

As illustrated in FIG. 5D, GUI 552 includes a "Scores Summary" Panel 554 that presents an average affluence score 556 of the user identities for whom the application was able to calculate affluence scores, an average influence score 558 of the user identities for whom the application was able to calculate influence scores, and an average popularity score 560 of the user identities for whom the application was able to calculate popularity scores.

GUI 552 also includes an "Affluence Distribution" panel 562 that indicates that the application was able to calculate affluence scores for 6,517,464 of the 11,825,335 user identities for whom the application extracted information from the electronic social networking platform and that presents a histogram reflecting the distribution of the affluence scores of the user identities for whom the application was able to calculate affluence scores.

In addition, GUI 552 includes an "Influence Distribution" panel 564 that indicates that the application was able to calculate influence scores for 8,320,761 of the 11,825,335 user identities for whom the application extracted information from the electronic social networking platform and that presents a histogram reflecting the distribution of the influence scores of the user identities for whom the application was able to calculate influence scores.

Finally, GUI 552 includes a "Popularity Distribution" panel 566 that indicates that the application was able to calculate popularity scores for 4,654,920 of the 11,825,335 user identities for whom the application extracted information from the electronic social networking platform and that presents a histogram reflecting the distribution of the popularity scores of the user identities for whom the application was able to calculate popularity scores.

Values for various different characteristics of the user identities for whom the application extracted information from the electronic social networking platform may be plotted as a function of the geographic locations of the user identities using bubble charts overlaying maps.

Figure 5E:

For example, referring now to FIG. 5E, GUI 568 presents a bubble chart 570 overlaying a map 572 that plots the number of user identities for whom the application extracted current residence information from the electronic social networking platform who currently reside at various different geographic locations. As illustrated in FIG. 5E, the sizes of the bubbles plotted over geographic locations represent the number of user identities for whom the application extracted current residence information from the electronic social networking platform who currently reside at the locations, where larger bubbles represent greater numbers of user identities.

Figure 5F:

Referring now to FIG. 5F, GUI 574 presents a bubble chart 576 overlaying a map 572 that plots the average affluence of user identities for whom the application extracted current residence information from the electronic social networking platform and for whom the application was able to calculate measures of affluence as a function of the geographic location of the user identities' current residences. As illustrated in FIG. 5F, the sizes of the bubbles plotted over geographic locations represent the average affluence of user identities for whom the application extracted current residence information from the electronic social networking platform and for whom the application was able to calculate measures of affluence who currently reside at the locations, where larger bubbles represent higher levels of average affluence.

Figure 5G:

Referring now to FIG. 5G, GUI 578 presents a bubble chart 580 overlaying a map 572 that plots the average influence of user identities for whom the application extracted current residence information from the electronic social networking platform and for whom the application was able to calculate measures of influence as a function of the geographic location of the user identities' current residences. As illustrated in FIG. 5G, the sizes of the bubbles plotted over geographic locations represent the average influence of user identities for whom the application extracted current residence information from the electronic social networking platform and for whom the application was able to calculate measures of influence who currently reside at the locations, where larger bubbles represent higher levels of average influence.

Figure 5H:
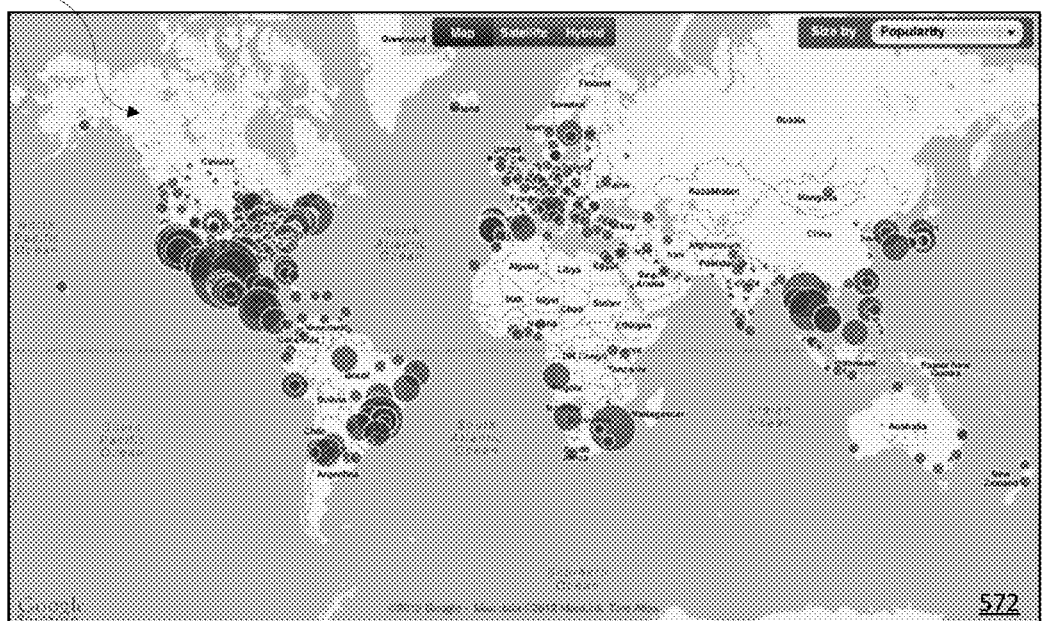

Referring now to FIG. 5H, GUI 582 presents a bubble chart 584 overlaying a map 572 that plots the average popularity of user identities for whom the application extracted current residence information from the electronic social networking platform and for whom the application was able to calculate measures of popularity as a function of the geographic location of the user identities' current residences. As illustrated in FIG. 5H, the size of the bubbles plotted over geographic locations represents the average popularity of user identities for whom the application extracted current residence information from the electronic social networking platform and for whom the application was able to calculate measures of popularity who currently reside at the locations, where larger bubbles represent higher levels of average popularity.

As discussed above in connection with the GUIs 500, 524, 534, 552, 568, 574, 578, and 582 illustrated in FIGS. 5A-5H, various different characteristics or estimates of various different characteristics of the user identities for whom the application extracted data from the electronic social networking platform may be derived from the data extracted from the electronic social networking platform for the user identities even if the electronic social networking platform itself does not record or make available data about such characteristics. For example, the hometown and/or current residence information for a user identity returned by the electronic social networking platform may be incomplete, providing only an indication of a city but not the state/territory and/or country in which the city is located, and the application may identify the state/territory and/or country in which the city is located. Additionally or alternatively, the application may determine if a user identity's current residence is urban or rural. The application also may determine if a user identity's current residence belongs to a particular metro area. In addition, the application may estimate a user identity's income, affluence, influence, and/or popularity based on data extracted from the electronic social networking platform for the user identity. Furthermore, the application may determine if the user identity belongs to any one of a number of different psychographic profiles based on data extracted from the electronic social networking platform for the user identity.

Various different techniques may be employed to determine the state/territory and/or country in which a user identity's hometown or current residence is located when the hometown or current residence information for the user identity returned by the electronic social networking platform provides an indication of a city but not the state/territory and/or country in which the city is located. In some implementations, the hometown or current residence information for the user identity returned by the electronic social networking platform may include geographic coordinates corresponding to the user identity's hometown or current residence city. In such implementations, the geographic coordinates may be used to identify the location of the city, from which the state/territory and/or country in which the city is located then can be determined. In other implementations, the city returned by the electronic social networking platform may be compared to hometown or current residence cities already extracted from the electronic social networking platform for other user identities, and, if the city matches one of the cities already extracted from the electronic social networking platform for one or more other user identities, the state/territory and/or country information associated with the matched city may be assumed to be the same. In the event that the city returned by the electronic social networking platform matches multiple cities already extracted from the electronic social networking platform located in different states/territories and/or countries, the state/territory and/or country information associated with the matching city corresponding to the greatest number of other user identities may be assumed to be the state/territory and/or country to associate with the city.

Various different techniques may be employed to determine if a user identity's current residence is urban or rural. For example, a database of geographic locations (e.g., identified by one or more of city, state/territory, and/or country name; latitude/longitude or other geographic coordinates; etc.) known to be urban locations may be maintained. When a user identity's current residence location is extracted from the electronic social networking platform, the user identity's current residence location may be compared to the geographic locations known to be urban locations. If the user identity's current residence location matches one of the geographic locations known to be an urban location, then the user identity's current residence may be determined to be urban. If the user identity's current residence location does not match any of the geographic locations known to be urban locations, one or more databases that store population data for different locations may be accessed. If the population for the user identity's current residence location can be determined by accessing the database(s) storing population data, and the population for the user identity's current residence location is greater than or equal to a defined threshold value (e.g., 15,000), then the user identity's current residence may be determined to be urban. If the population for the user identity's current residence location can be determined by accessing the database(s) storing population data, and the population for the user identity's current residence location is less than a defined threshold value (e.g., 15,000), then the user identity's current residence may be determined to be rural. If the population for the user identity's current residence location cannot be determined by accessing the database(s) storing population data, the application may be unable to determine if the user identity's current residence location is urban or rural.

Various different techniques may be employed to determine if a user identity's current residence belongs to a particular metro area. For example, a database of known metro areas may be maintained. This database may store geographic coordinates for each of the known metro areas. In some implementations, these coordinates may correspond to the primary city around which the metro area is centered (e.g., the coordinates may be the coordinates for the center of the city around which the metro area is centered). In other implementations, these coordinates may correspond to the geographic center of the metro area. In still other implementations, these coordinates may correspond to boundaries of the metro area. When a user identity's current residence location is extracted from the electronic social networking platform, geographic coordinates for the user identity's current residence may be determined. In some implementations, geographic coordinates for the user identity's current residence may be provided by the electronic social networking platform. In other implementations, the electronic social networking platform may return the city, state/territory, and/or country name of the user identity's current residence. In such implementations, a query may be run against the city, state/territory, and/or country name of the user identity's current residence to determine geographic coordinates for the user identity's current residence. Once geographic coordinates for the user identity's current residence have been determined, distances between the geographic coordinates for the user identity's current residence and any one or more of the geographic coordinates for the known metro areas may be calculated. If the distance between the geographic coordinates for the user identity's current residence and the geographic coordinates for any known metro area is determined to be less than or equal to a defined threshold distance (e.g., 60 miles), the user identity's current residence may be determined to be a part of that metro area. In the event that the distances between the geographic coordinates for the user identity's current residence and the geographic coordinates for multiple metro areas are less than or equal to the defined threshold distance, the user identity's current residence may be determined to be a part of the metro area to which it is closest. If the distance between the geographic coordinates for the user identity's current residence and the geographic coordinates for all of the known metro areas is determined to exceed a defined threshold distance (e.g., 60 miles), the user identity's current residence may be determined to not be a part of any metro area.

Various different techniques may be employed to estimate a user identity's income based on information extracted from the electronic social networking platform. One particular example is described below.

First, a determination may be made as to whether the user identity likely has an income. This determination may be made based upon one or more of the user identity's age, employment history, and education history. If the user identity has a current employer specified in his/her employment history, the user identity may be determined to have an income irrespective of the user identity's age and/or education history. If the user identity is less than 18 years old and does not have a current employer specified in his/her employment history, the user identity may be determined not to have an income. If the user identity is between 18 years old and 21 years old, does not have a current employer specified in his/her employment history, and does not have a college/university or a graduate school specified in his/her employment history, the user identity may be determined to have an income. In contrast, if the user identity is between 18 years old and 21 years old, does not have a current employer specified in his/her employment history, and does have a college/university or a graduate school specified in his/her employment history, the user identity may be determined not to have an income. If the user identity is between 22 years old and 25 years old, does not have a current employer specified in his/her employment history, and does not have a graduate school specified in his/her employment history, the user identity may be determined to have an income. In contrast, if the user identity is between 22 years old and 25 years old, does not have a current employer specified in his/her employment history, and does have a graduate school specified in his/her employment history, the user identity may be determined to not have an income. If the user identity is between 25 years old and 65 years old and does not have a current employer specified in his/her employment history, the user identity still may be determined to have an income. If the user identity is more than 65 years old and does not have a current employer specified in his/her employment history, the user identity may be determined not to have an income. Finally, if no age information is returned from the electronic social networking platform for the user identity, the application may not be able to estimate the user identity's income.

If the user identity is determined to have an income, a base income then is determined for the user identity. Different techniques may be employed to determine a base income for the user identity. For example, one or more databases may be maintained that store base incomes to be used for user identities based on the current residence locations of the user identities. In some implementations, the same base income may be used for all user identities within a single country. In such implementations, the base income to be used for user identities from each country may be the mean or median income for the country. In other implementations, different base incomes may be used for user identities from a single country. In such implementations, the base incomes to be used may vary at the regional, state, or even city level and may be based on the mean or median incomes for the corresponding regions, states, or cities. For example, the base incomes to be used for user identities residing in one country may be determined based on the cities in the country where the user identities currently reside. More particularly, the base income to be used for a user identity may be the mean income for individuals in the user identity's current residence city. Alternatively, the base income to be used for a user identity may be the median income for individuals in the user identity's current residence city.

After determining the base income for the user identity, age and education level multipliers then are determined for the user identity. The age multiplier for the user identity may be calculated according to Equation 1 below:

$$\left(\frac{0.72}{1+e^{-0.345(age-24.3)}}+0.344\right)\cdot(1+0.00481(age-24.3)) \quad \text{(Eq. 1)}$$

where "age" represents the user identity's age in years.

Meanwhile, the education level multiplier for the user identity depends on the user identity's education history. If the user identity's age is less than 22 years old, the user identity's education level multiplier may be calculated according to Equation 2 below. Similarly, if the user identity's education history specifies a high school but no college/university or graduate school, the user identity's education level multiplier may be calculated according to Equation 2 below:

$$\frac{0.250}{1+e^{(7.0\times10^{-5})(base\ income-75,000)}}+0.350 \quad \text{(Eq. 2)}$$

where "base income" represents the base income determined for the user identity as discussed above.

If the user identity's education history specifies a college/university but no graduate school, and the user identity is at least 22 years old or no age is specified for the user identity, the user identity's education multiplier may be calculated according to Equation 3 below. Similarly, if the user identity's education history specifies a graduate school and the user identity is less than 25 years old, the user identity's education level multiplier may be calculated according to Equation 3 below:

$$\frac{0.400}{1+e^{(7.0\times10^{-5})(base\ income-75,000)}}+0.950 \quad \text{(Eq. 3)}$$

where "base income" represents the base income determined for the user identity as discussed above.

If the user identity's education history specifies a graduate school and the user identity is at least 25 years old, the user identity's education level multiplier may be calculated according to Equation 4 below:

$$\frac{0.600}{1+e^{(7.0\times10^{-5})(base\ income-90,000)}}+1.8 \quad \text{(Eq. 4)}$$

where "base income" represents the base income determined for the user identity as discussed above.

The education level multiplier for a user identity who does not satisfy any of the above conditions is "1."

After the age and education level multipliers for the user identity have been determined, the user's estimated income is determined according to Equation 5 below:

est. income=(base income)×(age multipler)×(education level multiplier) (Eq. 5)

Various different techniques may be employed to estimate a user identity's affluence based on information extracted from the electronic social networking platform. In one example, an affluence score for a user identity may be determined for the user identity based on the income estimated for the user identity, for example, as described above. More particularly, the affluence score for the user identity may be calculated by dividing the estimated income for the user identity by the highest estimated income for all user identities for which the application is able to calculate an estimated income and then multiplying the result by 100.

Various different techniques may be employed to estimate a user identity's influence based on information extracted from the electronic social networking platform. One particular example is described below.

In this example, an influence score may be calculated for a user identity based on the user identity's activity within the electronic social networking platform over a defined period of time (e.g., the previous 30 days, the previous 60 days, the previous 90 days, the previous year, etc.). First, the number of "status posts," M, that the user identity has published within the electronic social networking platform during the defined period of time is determined. In addition, the number of distinct users who endorsed each of the M posts is determined, and the number of distinct users who commented on each of the M posts is determined. A raw influence score for the user identity then may be calculated according to Equation 6 below:

raw influence=$\sqrt{M}\cdot(\Sigma_{i=1}^{M}$# distinct users endorsing post$_i$)$\cdot 3(\Sigma_{i=2}^{M}$# distinct users commenting on post$_i$) (Eq. 6)

A final influence score for the user identity then is calculated for the user identity by converting the user identity's raw influence score to a logarithmic scale and dividing by a maximum "cut-off" value so that the user identity's final influence score is within the range 0-99 according to Equation 7 below:

$$\text{influence} = 99 \times \frac{\log_{10}(1 + \text{raw influence})}{\log_{10}(1 + \text{Max(raw influence)})} \quad \text{(Eq. 7)}$$

Various different techniques may be employed to estimate a user identity's popularity based on information extracted from the electronic social networking platform. One particular example is described below.

In this example, a popularity score may be calculated for a user identity based on targeted "wall" or "timeline" posts from other user identities, "wall" or "timeline" posts from gaming applications, and/or event invitations that the user identity received within the electronic social networking platform over a defined period of time (e.g., the previous 30 days, the previous 60 days, the previous 90 days, the previous year, etc.).

First, the "wall" or "timelines posts from other user identities, the "wall" or "timelines" posts from gaming applications, and the event invitations that the user received within the electronic social networking platform during the defined time period are identified. In addition, the sources of each of the identified "wall" or "timeline" posts from other user identities, the "wall" or "timeline" posts from gaming applications, and the event invitations are identified. Then, for each identified source, i, of "wall" or "timelines posts from other user identities, "wall" or "timeline" posts from gaming applications, and event invitations, a weighted score is calculated according to Equation 8 below:

$$n_{source_i} = (\text{\# posts posted}) + 0.1(\text{\# of gaming posts}) + 2(\text{\# quality event invites sent}) \quad \text{(Eq. 8)}$$

where "# of posts posted" represents the number of "wall" or "timeline" posts from a user identity that originated from the source, i, "# of gaming posts" represents the number of "wall" or "timeline" posts from gaming applications that originated from the source, i, and "# quality event invites sent" represents the number of event invitations for which more than a defined threshold of invitees have accepted an invitation that originated from the source, i.

After the score $n_{source_i}$ has been calculated for each source, i, a sum of the scores $n_{source_i}$ for all M sources may be calculated according to Equation 9 below:

$$n_{total} = \sum_{i=1}^{M} n_{source_i} \quad \text{(Eq. 9)}$$

Then, a raw popularity score for the user identity may be calculated according to Equation 10 below:

$$\text{raw popularity} = \sum_{i=1}^{M} n_{source_i} \cdot \left(\log_{10}\left(\frac{n_{total}}{n_{source_i}}\right)\right) \quad \text{(Eq. 10)}$$

A final popularity score for the user identity then is calculated for the user identity by converting the user identity's raw popularity score to a logarithmic scale and dividing by a maximum "cut-off" value so that the user identity's final popularity score is within the range 0-99 according to Equation 11 below:

$$\text{popularity} = 99 \times \frac{\log_{10}(1 + \text{raw popularity})}{\log_{10}(1 + \text{Max(raw popularity)})} \quad \text{(Eq. 11)}$$

As discussed above, the application may determine if user identities for whom the application extracted data from the electronic social networking platform belong to one or more different psychographic profiles based on the data for the user identities that the application extracted for the user identities from the electronic social networking platform. A variety of different techniques may be used to determine if a user identity belongs to a particular psychographic profile, and the application may consider a variety of different types of data extracted for the user identity from the electronic social networking platform in determining if the user identity belongs to the particular psychographic profile. For example, the application may consider the user identity's "page" endorsements, "check-ins," and/or demographic characteristics when determining if the user identity belongs to a particular psychographic profile.

Each psychographic profile may be defined as corresponding to a collection of certain "pages" within the electronic social networking platform. The collection of "pages" corresponding to any particular psychographic profile may be identified based on "pages" that have been specifically designated within the application (e.g., "pages" that have been hardcoded within the application) as belonging to the psychographic profile, "pages" that have been assigned one or more category designations within the electronic social networking platform, and/or "pages" that include one or more specified keywords within the text of their "page" descriptions within the electronic social networking platform.

The application may determine if a user identity belongs to a particular psychographic profile based on the extent to which the user identity has endorsed "pages" that the application identifies as corresponding to the particular psychographic profile. The application may consider any user identity who has endorsed at least one "page" that corresponds to the particular psychographic profile as a candidate for the psychographic profile. For a user identity that the application has identified as a candidate for a particular psychographic profile, the application then may calculate a psychographic profile page score for the user identity according to Equation 12 below:

$$\text{psychographic profile page score} = A^2 \cdot B \quad \text{(Eq. 12)}$$

where A represents the number of "pages" that the user identity has endorsed that correspond to the particular psychographic profile and B represents the total number of "pages" that the user identity has endorsed within the electronic social networking platform. As described in greater detail below, the application then may use the psychographic profile page score calculated for the user identity in determining if the user identity belongs to the particular psychographic profile.

Another factor the application may consider in determining whether a user identity belongs to a particular psychographic profile is the user identity's "check-ins" that the application extracted from the electronic social networking platform. Each psychographic profile may be defined as corresponding to a collection of certain "check-in" locations. The collection of "check-in" locations corresponding to any particular psychographic profile may be identified based on "check-in" locations that have been assigned one or more category designations within the electronic social networking platform and/or "check-in" locations that have been assigned one or more category designations by the application (e.g., specific "check-in" locations that have been hardcoded as belonging to one or more different categories by the application itself). The application may determine if a user identity belongs to a particular psychographic profile based on the extent to which the user identity has "checked-in" at locations that the application identifies as corresponding to the particular psychographic profile.

Examples of techniques for determining if a user identity belongs to the different psychographic profiles introduced above are now described.

Various different techniques may be employed to determine if a user identity belongs to the music lovers psychographic profile. One particular example is described below. The music lovers psychographic profile may be defined as corresponding to "pages" categorized within the electronic social networking platform as musician/band, musical genre, song, music video, and music. If a user identity has endorsed any "page" within the electronic social networking platform categorized as belonging to any one of these categories, the application may consider the user identity to be a candidate for the music lovers psychographic profile and calculate a psychographic profile page score for the user identity. If the psychographic profile page score for the user identity is within a predefined top percentile (e.g., the top 20%) of psychographic profile page scores for all user identities identified as candidates for the music lovers psychographic profile, then the application may determine that the user identity belongs to the music lovers psychographic profile. Even if the application determines that the user identity's "page" endorsements do not qualify the user identity for membership in the music lovers psychographic profile, the application still may determine that the user identity belongs to the music lovers psychographic profile based on the user identity's "check-in" activity. For example, the application may determine that the user identity belongs to the music lovers psychographic profile if the user identity has "checked-in" to locations classified by the electronic social networking platform and/or the application as concert/music venues or music stores more than six times within the previous six months.

Various different techniques may be employed to determine if a user identity belongs to the movie lovers psychographic profile. One particular example is described below. The movie lovers psychographic profile may be defined as corresponding to "pages" categorized within the electronic social networking platform as movie, actor/director, movie genre, movie theater, and movie general. If a user identity has endorsed any "page" within the electronic social networking platform categorized as belonging to any one of these categories, the application may consider the user identity to be a candidate for the movie lovers psychographic profile and calculate a psychographic profile page score for the user identity. If the psychographic profile page score for the user identity is within a predefined top percentile (e.g., the top 20%) of psychographic profile page scores for all user identities identified as candidates for the movie lovers psychographic profile, then the application may determine that the user identity belongs to the movie lovers psychographic profile. Even if the application determines that the user identity's "page" endorsements do not qualify the user identity for membership in the movie lovers psychographic profile, the application still may determine that the user identity belongs to the movie lovers psychographic profile based on the user identity's "check-in" activity. For example, the application may determine that the user identity belongs to the movie lovers psychographic profile if the user identity has "checked-in" to locations classified by the electronic social networking platform and/or the application as movie theaters at least once a week every week for the previous six months.

Various different techniques may be employed to determine if a user identity belongs to the TV fans psychographic profile. One particular example is described below. The TV fans psychographic profile may be defined as corresponding to "pages" categorized within the electronic social networking platform as TV show, TV network, TV channel, TV, and TV genre. If a user identity has endorsed any "page" within the electronic social networking platform categorized as belonging to any one of these categories, the application may consider the user identity to be a candidate for the TV fans psychographic profile and calculate a psychographic profile page score for the user identity. If the psychographic profile page score for the user identity is within a predefined top percentile (e.g., the top 20%) of psychographic profile page scores for all user identities identified as candidates for the TV fans psychographic profile, then the application may determine that the user identity belongs to the TV fans psychographic profile.

Various different techniques may be employed to determine if a user identity belongs to the social activists psychographic profile. One particular example is described below. The social activists psychographic profile may be defined as corresponding to "pages" categorized within the electronic social networking platform as non-profit organization and cause. If a user identity has endorsed any "page" within the electronic social networking platform categorized as belonging to any one of these categories, the application may consider the user identity to be a candidate for the social activist psychographic profile and calculate a psychographic profile page score for the user identity. If the psychographic profile page score for the user identity is within a predefined top percentile (e.g., the top 20%) of psychographic profile page scores for all user identities identified as candidates for the social activist psychographic profile, then the application may determine that the user identity belongs to the social activist psychographic profile.

Various different techniques may be employed to determine if a user identity belongs to the sports lovers psychographic profile. One particular example is described below. The sports lovers psychographic profile may be defined as corresponding to "pages" categorized within the electronic social networking platform as athlete, professional sports team, sports league, sports/recreation/activities, recreation/sports, amateur sports team, school sports team, sport, and sports. If a user identity has endorsed any "page" within the electronic social networking platform categorized as belonging to any one of these categories, the application may consider the user identity to be a candidate for the sports lovers psychographic profile and calculate a psychographic profile page score for the user identity. If the psychographic profile page score for the user identity is within a predefined top percentile (e.g., the top 20%) of psychographic profile page scores for all user identities identified as candidates for the sports lovers psychographic profile, then the application may determine that the user identity belongs to the sports lovers psychographic profile. Even if the application determines that the user identity's "page" endorsements do not qualify the user identity for membership in the sport lovers psychographic profile, the application still may determine that the user identity belongs to the sport lovers psychographic profile based on the user identity's "check-in" activity. For example, the application may determine that the user identity belongs to the sport lovers psychographic profile if the user identity has "checked-in" to locations classified by the electronic social networking platform and/or the application as sporting venues more than six times within the previous six months.

Various different techniques may be employed to determine if a user identity belongs to the food lovers psychographic profile. One particular example is described below. The food lovers psychographic profile may be defined as corresponding to "pages" categorized within the electronic social networking platform as restaurant/cafe and food. If a user identity has endorsed any "page" within the electronic social networking platform categorized as belonging to any one of these categories, the application may consider the user identity to be a candidate for the food lovers psychographic profile and calculate a psychographic profile page score for the user identity. If the psychographic profile page score for the user identity is within a predefined top percentile (e.g., the top 20%) of psychographic profile page scores for all user identities identified as candidates for the food lovers psychographic profile, then the application may determine that the user identity belongs to the food lovers psychographic profile. Even if the application determines that the user identity's "page" endorsements do not qualify the user identity for membership in the food lovers psychographic profile, the application still may determine that the user identity belongs to the food lovers psychographic profile based on the user identity's "check-in" activity. For example, the application may determine that the user identity belongs to the food lovers psychographic profile if the user identity has "checked-in" to locations classified by the electronic social networking platform and/or the application as restaurants at least once a week for the previous six months.

Various different techniques may be employed to determine if a user identity belongs to the book lovers psychographic profile. One particular example is described below. The book lovers psychographic profile may be defined as corresponding to "pages" categorized within the electronic social networking platform as book genre, book, author, and library. If a user identity has endorsed any "page" within the electronic social networking platform categorized as belonging to any one of these categories, the application may consider the user identity to be a candidate for the book lovers psychographic profile and calculate a psychographic profile page score for the user identity. If the psychographic profile page score for the user identity is within a predefined top percentile (e.g., the top 20%) of psychographic profile page scores for all user identities identified as candidates for the book lovers psychographic profile, then the application may determine that the user identity belongs to the book lovers psychographic profile.

Various different techniques may be employed to determine if a user identity belongs to the travel lovers psychographic profile. One particular example is described below. The travel lovers psychographic profile may be defined as corresponding to "pages" categorized within the electronic social networking platform as hotel, travel/leisure, bags/luggage, transportation, and transport/freight. If a user identity has endorsed any "page" within the electronic social networking platform categorized as belonging to any one of these categories, the application may consider the user identity to be a candidate for the travel lovers psychographic profile and calculate a psychographic profile page score for the user identity. If the psychographic profile page score for the user identity is within a predefined top percentile (e.g., the top 20%) of psychographic profile page scores for all user identities identified as candidates for the travel lovers psychographic profile, then the application may determine that the user identity belongs to the travel lovers psychographic profile.

Various different techniques may be employed to determine if a user identity belongs to the art connoisseurs psychographic profile. One particular example is described below. The art connoisseurs psychographic profile may be defined as corresponding to "pages" categorized within the electronic social networking platform as museum/art gallery, arts/humanities, and artist. If a user identity has endorsed any "page" within the electronic social networking platform categorized as belonging to any one of these categories, the application may consider the user identity to be a candidate for the art connoisseurs psychographic profile and calculate a psychographic profile page score for the user identity. If the psychographic profile page score for the user identity is within a predefined top percentile (e.g., the top 20%) of psychographic profile page scores for all user identities identified as candidates for the art connoisseurs psychographic profile, then the application may determine that the user identity belongs to the art connoisseurs psychographic profile. Even if the application determines that the user identity's "page" endorsements do not qualify the user identity for membership in the art connoisseurs psychographic profile, the application still may determine that the user identity belongs to the art connoisseurs psychographic profile based on the user identity's "check-in" activity. For example, the application may determine that the user identity belongs to the art connoisseurs psychographic profile if the user identity has "checked-in" to locations classified by the electronic social networking platform and/or the application as museums or art galleries on average once a month for the previous six months.

Various different techniques may be employed to determine if a user identity belongs to the health and beauty conscious psychographic profile. One particular example is described below. The health and beauty conscious psychographic profile may be defined as corresponding to "pages" categorized within the electronic social networking platform as health/wellness, vitamins/supplements, health/beauty, lifestyle, and spas/beauty/personal care or "pages" that include the keyword "fashion" in their descriptions. If a user identity has endorsed any "page" within the electronic social networking platform categorized belonging to one of these categories or that includes the keyword "fashion" in its description, the application may consider the user identity to be a candidate for the health and beauty conscious psychographic profile and calculate a psychographic profile page score for the user identity. If the psychographic profile page score for the user identity is within a predefined top percentile (e.g., the top 20%) of psychographic profile page scores for all user identities identified as candidates for the health and beauty conscious psychographic profile, then the application may determine that the user identity belongs to the health and beauty conscious psychographic profile. Even if the application determines that the user identity's "page" endorsements do not qualify the user identity for membership in the health and beauty conscious psychographic profile, the application still may determine that the user identity belongs to the health and beauty conscious psychographic profile based on the user identity's "check-in" activity. For example, the application may determine that the user identity belongs to the health and beauty conscious psychographic profile if the user identity has "checked-in" to locations classified by the electronic social networking platform and/or the application as fitness centers, or exercise, cosmetics, fashion, health and beauty, beauty products, fashion show, health and fitness, health and hygiene, or hair care locations at least once a week for the previous six months.

Various different techniques may be employed to determine if a user identity belongs to the game lovers psychographic profile. One particular example is described below. The game lovers psychographic profile may be defined as corresponding to "pages" categorized within the electronic social networking platform as games and games/toys. If a user identity has endorsed any "page" within the electronic social networking platform categorized as belonging to any one of these categories, the application may consider the user identity to be a candidate for the game lovers psychographic profile and calculate a psychographic profile page score for the user identity. If the psychographic profile page score for the user identity is within a predefined top percentile (e.g., the top 20%) of psychographic profile page scores for all user identities identified as candidates for the game lovers psychographic profile, then the application may determine that the user identity belongs to the game lovers psychographic profile.

Various different techniques may be employed to determine if a user identity belongs to the techies psychographic profile. One particular example is described below. The techies psychographic profile may be defined as corresponding to "pages" categorized within the electronic social networking platform as appliance, computers/Internet, computers/technology, Internet/software, software, and computers. If a user identity has endorsed any "page" within the electronic social networking platform categorized as belonging to any one of these categories, the application may consider the user identity to be a candidate for the techies psychographic profile and calculate a psychographic profile page score for the user identity. If the psychographic profile page score for the user identity is within a predefined top percentile (e.g., the top 20%) of psychographic profile page scores for all user identities identified as candidates for the techies psychographic profile, then the application may determine that the user identity belongs to the techies psychographic profile.

Various different techniques may be employed to determine if a user identity belongs to the comedy lovers psychographic profile. One particular example is described below. The comedy lovers psychographic profile may be defined as corresponding to "pages" categorized within the electronic social networking platform as comedians, comedy, or humor. If a user identity has endorsed any "page" within the electronic social networking platform categorized as belonging to any one of these categories, the application may consider the user identity to be a candidate for the comedy lovers psychographic profile and calculate a psychographic profile page score for the user identity. If the psychographic profile page score for the user identity is within a predefined top percentile (e.g., the top 20%) of psychographic profile page scores for all user identities identified as candidates for the comedy lovers psychographic profile, then the application may determine that the user identity belongs to the comedy lovers psychographic profile. Even if the application determines that the user identity's "page" endorsements do not qualify the user identity for membership in the comedy lovers psychographic profile, the application still may determine that the user identity belongs to the comedy lovers psychographic profile based on the user identity's "check-in" activity. For example, the application may determine that the user identity belongs to the comedy lovers psychographic profile if the user identity has "checked-in" to locations classified by the electronic social networking platform and/or the application as comedy clubs more than three times within the previous six months.

Various different techniques may be employed to determine if a user identity belongs to the car lovers psychographic profile. One particular example is described below. The car lovers psychographic profile may be defined as corresponding to "pages" categorized within the electronic social networking platform as automotive, cars, and automobiles and parts. If a user identity has endorsed any "page" within the electronic social networking platform categorized as belonging to any one of these categories, the application may consider the user identity to be a candidate for the car lovers psychographic profile and calculate a psychographic profile page score for the user identity. If the psychographic profile page score for the user identity is within a predefined top percentile (e.g., the top 20%) of psychographic profile page scores for all user identities identified as candidates for the car lovers psychographic profile, then the application may determine that the user identity belongs to the car lovers psychographic profile.

Various different techniques may be employed to determine if a user identity belongs to the brand conscious psychographic profile. One particular example is described below. The brand conscious psychographic profile may be defined as corresponding to "pages" categorized within the electronic social networking platform as jewelry/watches and clothing as well as the following specific "pages": Givenchy, Lord & Taylor, Calvin Klein Underwear, Donna Karan New York, GUESS by Marciano, UNITED COLORS OF BENETTON, DKNY, Lucky Brand, Nine West, Kenneth Cole, A|X Armani Exchange, Diesel, HUGO BOSS, BCBG—BCBGMAXAZRIA, GUESS? Inc., Juicy Couture, ARMANI, Barneys New York, INTERMIX, ALEXANDER WANG, bebe, Saks Fifth Avenue, Marc Jacobs Intl, Michael Kors—The Official Page, Neiman Marcus, Dolce & Gabbana, Tory Burch, Gucci, Burberry, ZARA, Victoria's Secret Pink, and Victoria's Secret. If a user identity has endorsed any "page" within the electronic social networking platform categorized as belonging the categories jewelry/watches or clothing or any of the other specific "pages," the application may consider the user identity to be a candidate for the brand conscious psychographic profile and calculate a psychographic profile page score for the user identity. If the psychographic profile page score for the user identity is within a predefined top percentile (e.g., the top 20%) of psychographic profile page scores for all user identities identified as candidates for the brand conscious psychographic profile, then the application may determine that the user identity belongs to the brand conscious psychographic profile.

Various different techniques may be employed to determine if a user identity belongs to the religious people psychographic profile. One particular example is described below. The religious people psychographic profile may be defined as corresponding to "pages" categorized within the electronic social networking platform as church/religious organization and religion. If a user identity has endorsed any "page" within the electronic social networking platform categorized as belonging to any one of these categories, the application may consider the user identity to be a candidate for the religious people psychographic profile and calculate a psychographic profile page score for the user identity. If the psychographic profile page score for the user identity is within a predefined top percentile (e.g., the top 20%) of psychographic profile page scores for all user identities identified as candidates for the religious people psychographic profile, then the application may determine that the user identity belongs to the religious people psychographic profile. Even if the application determines that the user identity's "page" endorsements do not qualify the user identity for membership in the religious people psychographic profile, the application still may determine that the user identity belongs to the religious people psychographic profile based on the user identity's "check-in" activity. For example, the application may determine that the user identity belongs to the religious people psychographic profile if the user identity has "checked-in" to locations classified by the electronic social networking platform and/or the application as churches, synagogues or places of worship at least six times within the previous six months.

Various different techniques may be employed to determine if a user identity belongs to the outdoor enthusiasts psychographic profile. One particular example is described below. The outdoor enthusiasts psychographic profile may be defined as corresponding to "pages" categorized within the electronic social networking platform as sports/recreation, outdoor gear, attractions/things to do, tours, and landmark. If a user identity has endorsed any "page" within the electronic social networking platform categorized as belonging to any one of these categories, the application may consider the user identity to be a candidate for the outdoor enthusiasts psychographic profile and calculate a psychographic profile page score for the user identity. If the psychographic profile page score for the user identity is within a predefined top percentile (e.g., the top 20%) of psychographic profile page scores for all user identities identified as candidates for the outdoor enthusiasts psychographic profile, then the application may determine that the user identity belongs to the outdoor enthusiasts psychographic profile.

Various different techniques may be employed to determine if a user identity belongs to the frequent travelers psychographic profile. One particular example is described below. The application may determine that the user identity belongs to the frequent travelers psychographic profile if the user identity has "checked-in" to locations classified by the electronic social networking platform and/or the application as airports or hotels or to locations that are more than 100 miles away from his/her current residence city at least once a week for the previous six months.

Various different techniques may be employed to determine if a user identity belongs to the do-it-yourselfers psychographic profile. One particular example is described below. The do-it-yourselfers psychographic profile may be defined as corresponding to "pages" categorized within the electronic social networking platform as home/garden, farming/agriculture, household supplies, home improvement, and tools/equipment as well as the following specific "pages": IKEA, Lowe's Home Improvement, and The Home Depot. If a user identity has endorsed any "page" within the electronic social networking platform categorized as belonging to the categories home/garden, farming/agriculture, household supplies, home improvement, and tools/equipment or any of the other specific "pages," the application may consider the user identity to be a candidate for the do-it-yourselfers psychographic profile and calculate a psychographic profile page score for the user identity. If the psychographic profile page score for the user identity is within a predefined top percentile (e.g., the top 20%) of psychographic profile page scores for all user identities identified as candidates for the do-it-yourselfers psychographic profile, then the application may determine that the user identity belongs to the do-it-yourselfers psychographic profile.

Various different techniques may be employed to determine if a user identity belongs to the party-goers psychographic profile. One particular example is described below. To be considered as a potential member of the party-goer psychographic profile, the user identity may need to be within a defined age range (e.g., between 18 years old and 45 years old). Furthermore, the party-goers psychographic profile may be defined as corresponding to "pages" categorized within the electronic social networking platform as arts/entertainment/nightlife, bar, and club. If a user identity is within the defined age range and has endorsed any "page" within the electronic social networking platform categorized as belonging to any one of these categories, the application may consider the user identity to be a candidate for the party-goers psychographic profile and calculate a psychographic profile page score for the user identity. If the psychographic profile page score for the user identity is within a predefined top percentile (e.g., the top 20%) of psychographic profile page scores for all user identities identified as candidates for the party-goers psychographic profile, then the application may determine that the user identity belongs to the party-goers psychographic profile. Even if the application determines that the user identity's "page" endorsements do not qualify the user identity for membership in the party-goers psychographic profile, the application still may determine that the user identity belongs to the party-goers psychographic profile based on the user identity's "check-in" activity. For example, the application may determine that the user identity belongs to the party-goers psychographic profile if the user identity is within the defined age range and has "checked-in" to locations classified by the electronic social networking platform and/or the application as bars, nightclubs, or adult entertainment at least once a week over the previous six months.

Various different techniques may be employed to determine if a user identity belongs to the politics—Democrats psychographic profile. One particular example is described below. The politics—Democrats psychographic profile may be defined as corresponding to "pages" within the electronic social networking platform that represent politicians who are Democrats. If a user identity has endorsed at least some predefined number (e.g., 3) of "pages" that represent politicians who are Democrats, the application may determine that the user identity belongs to the politics—Democrats psychographic profile. Additionally or alternatively, the application may identify the user identity as belonging to the politics—Democrats psychographic profile if the user identity's profile indicates that the user identity is a Democrat or liberal leaning.

Various different techniques may be employed to determine if a user identity belongs to the pet lovers psychographic profile. One particular example is described below. The pet lovers psychographic profile may be defined as corresponding to "pages" categorized within the electronic social networking platform as pet supplies, animal, and animal breed. If a user identity has endorsed any "page" within the electronic social networking platform categorized as belonging to any one of these categories, the application may consider the user identity to be a candidate for the pet lovers psychographic profile and calculate a psychographic profile page score for the user identity. If the psychographic profile page score for the user identity is within a predefined top percentile (e.g., the top 20%) of psychographic profile page scores for all user identities identified as candidates for the pet lovers psychographic profile, then the application may determine that the user identity belongs to the pet lovers psychographic profile.

Various different techniques may be employed to determine if a user identity belongs to the brides-to-be psychographic profile. One particular example is described below. The application may determine that the user identity belongs to the brides-to-be psychographic profile if the user identity's profile indicates that the user identity's gender is female and that the user identity's relationship status is engaged. To be considered as a potential member of the brides-to-be psychographic profile if the user identity's profile does not indicate that the user identity is female and engaged, the user identity may need to be female, unmarried, and within a defined age range (e.g., between 17 years old and 58 years old). Furthermore, the brides-to-be psychographic profile may be defined as corresponding to "pages" that include one or more of the keywords "wedding," "bride," and "bridal" in their descriptions as well as the following specific pages: Kleinfeld Bridal (Official Page), 'DulhanExpo' Bridal Shows, BRIDES, and Washingtonian Bride & Groom. If a user identity is female, unmarried, and within the defined age range and has endorsed at least some threshold number (e.g., 3) of "pages" from among the specifically-identified pages or that include one or more of the keywords "wedding," "bride," and "bridal," then the application may determine that the user identity belongs to the brides-to-be psychographic profile.

Various different techniques may be employed to determine if a user identity belongs to the budget shoppers psychographic profile. One particular example is described below. The budget shoppers psychographic profile may be defined as corresponding to the following specific "pages": Half Price Books, Nasty Pig, Artbeads.com, Beyond the Rack, Belk, Soap.com, Kmart, Dollar General, QVC, Costco, Sears, Marshalls, Wal-Mart, Kohl's, and Target. If a user identity has endorsed any one of these specific "pages" within the electronic social networking platform, the application may consider the user identity to be a candidate for the budget shoppers psychographic profile and calculate a psychographic profile page score for the user identity. If the psychographic profile page score for the user identity is within a predefined top percentile (e.g., the top 20%) of psychographic profile page scores for all user identities identified as candidates for the budget shoppers psychographic profile, then the application may determine that the user identity belongs to the budget shoppers psychographic profile.

Various different techniques may be employed to determine if a user identity belongs to the deal hunters psychographic profile. One particular example is described below. The deal hunters psychographic profile may be defined as corresponding to any "page" that includes at least one of the keywords "bargains," "coupon," "groupon," "deals," "discount" and "thrifty" in its description. If a user identity has endorsed any "page" including at least one of these keywords in its description, the application may consider the user identity to be a candidate for the deal hunters psychographic profile and calculate a psychographic profile page score for the user identity. If the psychographic profile page score for the user identity is within a predefined top percentile (e.g., the top 20%) of psychographic profile page scores for all user identities identified as candidates for the deal hunters psychographic profile, then the application may determine that the user identity belongs to the deal hunters psychographic profile.

Various different techniques may be employed to determine if a user identity belongs to the politics—Republicans psychographic profile. One particular example is described below. The politics—Republicans psychographic profile may be defined as corresponding to "pages" within the electronic social networking platform that represent politicians who are Republicans. If a user identity has endorsed at least some predefined number (e.g., 3) of "pages" that represent politicians who are Republicans, the application may determine that the user identity belongs to the politics—Republicans psychographic profile. Additionally or alternatively, the application may identify the user identity as belonging to the politics—Republicans psychographic profile if the user identity's profile indicates that the user identity is a Republican or conservative leaning.

Various different techniques may be employed to determine if a user identity belongs to the parents of young kids psychographic profile. One particular example is described below. To be considered as a potential member of the parents of young kids psychographic profile, the user identity may need to be within a defined age range (e.g., between 17 years old and 45 years old) and have a relationship status specified as married or in a relationship. Furthermore, the parents of young kids psychographic profile may be defined as corresponding to "pages" categorized within the electronic social networking platform as baby goods/kids goods and games/toys as well as the following specific "pages": Gymboree, Toys "R" Us, Diapers.com, drugstore.com, Amazon.com, and eBay. If a user identity is within the defined age range, has a relationship status specified as married or in a relationship, and has endorsed any "page" within the electronic social networking platform categorized as baby goods/kids goods and games/toys or any one of the specifically identified pages, the application may consider the user identity to be a candidate for the parents of young kids psychographic profile and calculate a psychographic profile page score for the user identity. If the psychographic profile page score for the user identity is within a predefined top percentile (e.g., the top 20%) of psychographic profile page scores for all user identities identified as candidates for the parents of young kids psychographic profile, then the application may determine that the user identity belongs to the parents of young kids psychographic profile.

Various different techniques may be employed to determine if a user identity belongs to the environmentally aware psychographic profile. One particular example is described below. The environmentally aware psychographic profile may be defined as corresponding to the following specific "pages": Greenpeace Portugal, Greenpeace Mexico, National Wildlife Federation, National Park Foundation, Save The Waves, Greenpeace India, Keep Virginia Beautiful, Piedmont Environmental Council, Water.org, Solar on the White House, Greenpeace Akdeniz—Turkiye, Greenpeace USA, Oceana, Conservation International, Environmental Defense Fund, and Greenpeace International. If a user identity has endorsed any one of these specific "pages" within the electronic social networking platform, the application may consider the user identity to be a candidate for the environmentally aware psychographic profile and calculate a psychographic profile page score for the user identity. If the psychographic profile page score for the user identity is within a predefined top percentile (e.g., the top 25%) of psychographic profile page scores for all user identities identified as candidates for the environmentally aware psychographic profile, then the application may determine that the user identity belongs to the environmentally aware psychographic profile.

Various different techniques may be employed to determine if a user identity belongs to the charity minded psychographic profile. One particular example is described below. The charity minded psychographic profile may be defined as corresponding to "pages" categorized within the electronic social networking platform as cause, non-profit organizations, and non-governmental organization (NGO). If a user identity has endorsed any "page" within the electronic social networking platform categorized as belonging to any one of these categories, the application may consider the user identity to be a candidate for the charity minded psychographic profile and calculate a psychographic profile page score for the user identity. If the psychographic profile page score for the user identity is within a predefined top percentile (e.g., the top 20%) of psychographic profile page scores for all user identities identified as candidates for the charity minded psychographic profile, then the application may determine that the user identity belongs to the charity minded psychographic profile.

Various different techniques may be employed to determine if a user identity belongs to the shopping lovers psychographic profile. One particular example is described below. The shopping lovers psychographic profile may be defined as corresponding to "pages" categorized within the electronic social networking platform as clothing. If a user identity has endorsed any "page" within the electronic social networking platform categorized as belonging to the clothing category, the application may consider the user identity to be a candidate for the shopping lovers psychographic profile and calculate a psychographic profile page score for the user identity. If the psychographic profile page score for the user identity is within a predefined top percentile (e.g., the top 20%) of psychographic profile page scores for all user identities identified as candidates for the shopping lovers psychographic profile, then the application may determine that the user identity belongs to the shopping lovers psychographic profile.

Various different techniques may be employed to determine if a user identity belongs to the beverage lovers psychographic profile. One particular example is described below. The beverage lovers psychographic profile may be defined as corresponding to "pages" categorized within the electronic social networking platform as wine/spirits and drink. If a user identity has endorsed any "page" within the electronic social networking platform categorized as belonging to any one of these categories, the application may consider the user identity to be a candidate for the beverage lovers psychographic profile and calculate a psychographic profile page score for the user identity. If the psychographic profile page score for the user identity is within a predefined top percentile (e.g., the top 20%) of psychographic profile page scores for all user identities identified as candidates for the beverage lovers psychographic profile, then the application may determine that the user identity belongs to the beverage lovers psychographic profile.

Various different techniques may be employed to determine if a user identity belongs to the on-line shoppers psychographic profile. One particular example is described below. The on-line shoppers psychographic profile may be defined as corresponding to the following specific "pages": drugstore.com, Amazon.com, and eBay. If a user identity has endorsed any one of these specific "pages" within the electronic social networking platform, the application may consider the user identity to be a candidate for the on-line shoppers psychographic profile and calculate a psychographic profile page score for the user identity. If the psychographic profile page score for the user identity is within a predefined top percentile (e.g., the top 20%) of psychographic profile page scores for all user identities identified as candidates for the on-line shoppers psychographic profile, then the application may determine that the user identity belongs to the on-line shoppers psychographic profile.

In addition to enabling analysis of the various different characteristics of the users for whom the application extracted data from the electronic social networking platform as illustrated and described above in connection with FIGS. 5A-5H, the application also enables a representative of the application to define particular segments of the user identities for whom the application extracted data from the electronic social networking platform by applying various different filters to the set of user identities for whom the application extracted data from the electronic social networking platform. Thereafter, the application may enable the representative of the application to target the defined segments with content perceived as relevant, attractive, and/or appealing to the defined segments. Additionally or alternatively, the application may enable the representative of the application to perform analyses of different characteristics of the user identities belonging to the defined segments that are the same as or that are similar to the analyses illustrated and described above in connection with FIGS. 5A-5H.

Referring again to FIG. 5A, GUI 500 includes a selectable filter button 586. Responsive to actuation of selectable filter button 586 by a user, GUI 500 may cause a display of a menu of filter options to enable the user to specify filters to be applied to the user identities to define a segment of user identities for whom the application extracted data from the electronic social networking platform who satisfy one or more characteristics defined by the filters specified by the user.

Figures 6A, 6B:
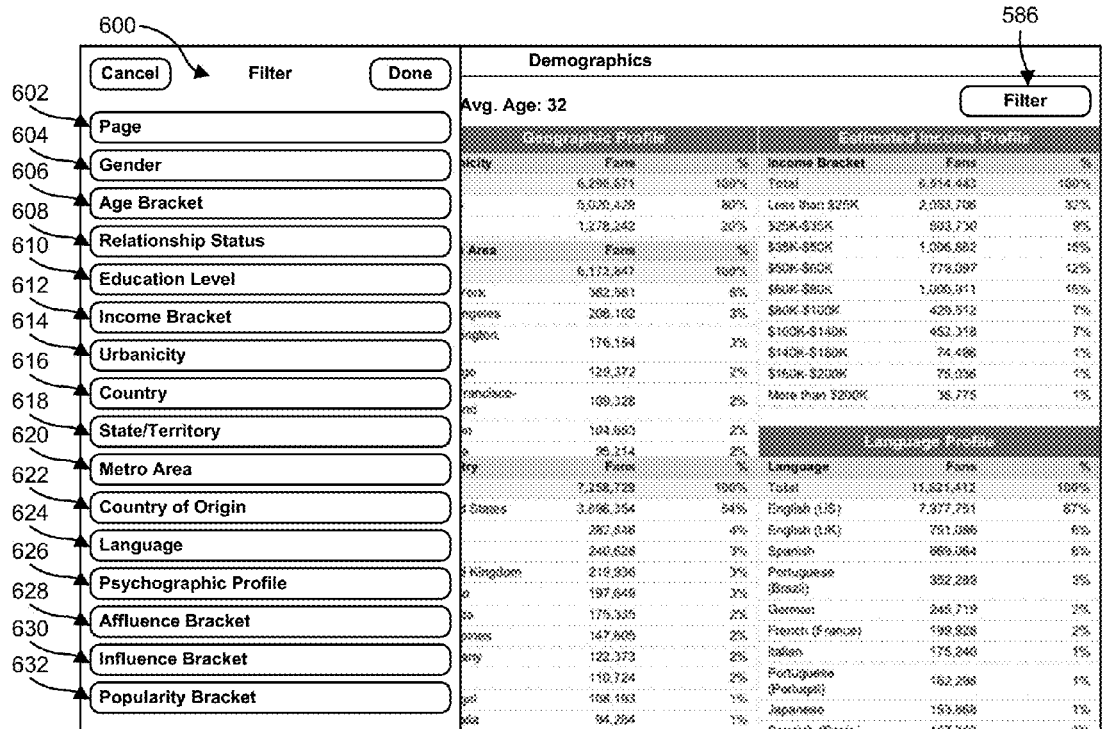

For example, referring now to FIG. 6A, responsive to actuation of selectable filter button 586 by a user, GUI 500 causes a display of a menu 600 of filter options. As illustrated in FIG. 6A, the menu 600 of filter options includes a selectable "page" filter option 602, a selectable gender filter option 604, a selectable age filter option 606, a selectable relationship status filter option 608, a selectable education level filter option 610, a selectable income bracket filter option 612, a selectable urbanicity filter option 614, a selectable country filter option 616, a selectable state/territory filter option 618, a selectable metro area filter option 620, a selectable country of origin filter option 622, a selectable language filter option 624, a selectable psychographic profile filter option 626, a selectable affluence filter option 628, a selectable influence filter option 630, and a selectable popularity filter option 632. In response to user actuation of any of these selectable filter options 602, 604, 606, 608, 610, 612, 614, 616, 618, 620, 622, 624, 626, 628, 630, and 632, GUI 500 may display controls that enable a user identity to specify corresponding filters.

For example, referring now to FIG. 6B, responsive to user actuation of selectable "page" filter option 602, GUI 500 expands "page" filter option 602 to display a "page" specification field 634. "Page" specification field 634 enables a user to specify one or more "pages" hosted by the electronic social networking platform that user identities must have endorsed in order for the application to include the user identities in the defined segment.

Similarly, responsive to user actuation of selectable gender filter option 604, GUI 500 expands gender filter option 604 to display options (e.g., male, female, undeclared) for filtering the user identities by gender. In response to selection of any one or more of the options for filtering the user identities by gender, the application will include only those user identities who satisfy the selected gender options in the defined segment.

Responsive to actuation of selectable age filter option 606, GUI 500 expands age filter option 606 to display different age brackets for filtering the user identities by age. In response to selection of any one or more of the age brackets, the application will include only those user identities who fall into the selected age brackets in the defined segment. It will be appreciated that the age brackets illustrated in FIG. 6B are examples and that, in other implementations, other age brackets may be provided as filtering options for defining segments of the user identities for whom data was extracted from the electronic social networking platform.

Responsive to user actuation of selectable relationship status filter option 608, GUI 500 expands relationship status filter option to display options (e.g., engaged, in a relationship, married, single, undeclared) for filtering the user identities by relationship status. In response to selection of any one or more of the options for filtering the user identities by gender, the application will include only those user identities who satisfy the selected relationship status options in the defined segment.

Figures 6C, 6D:
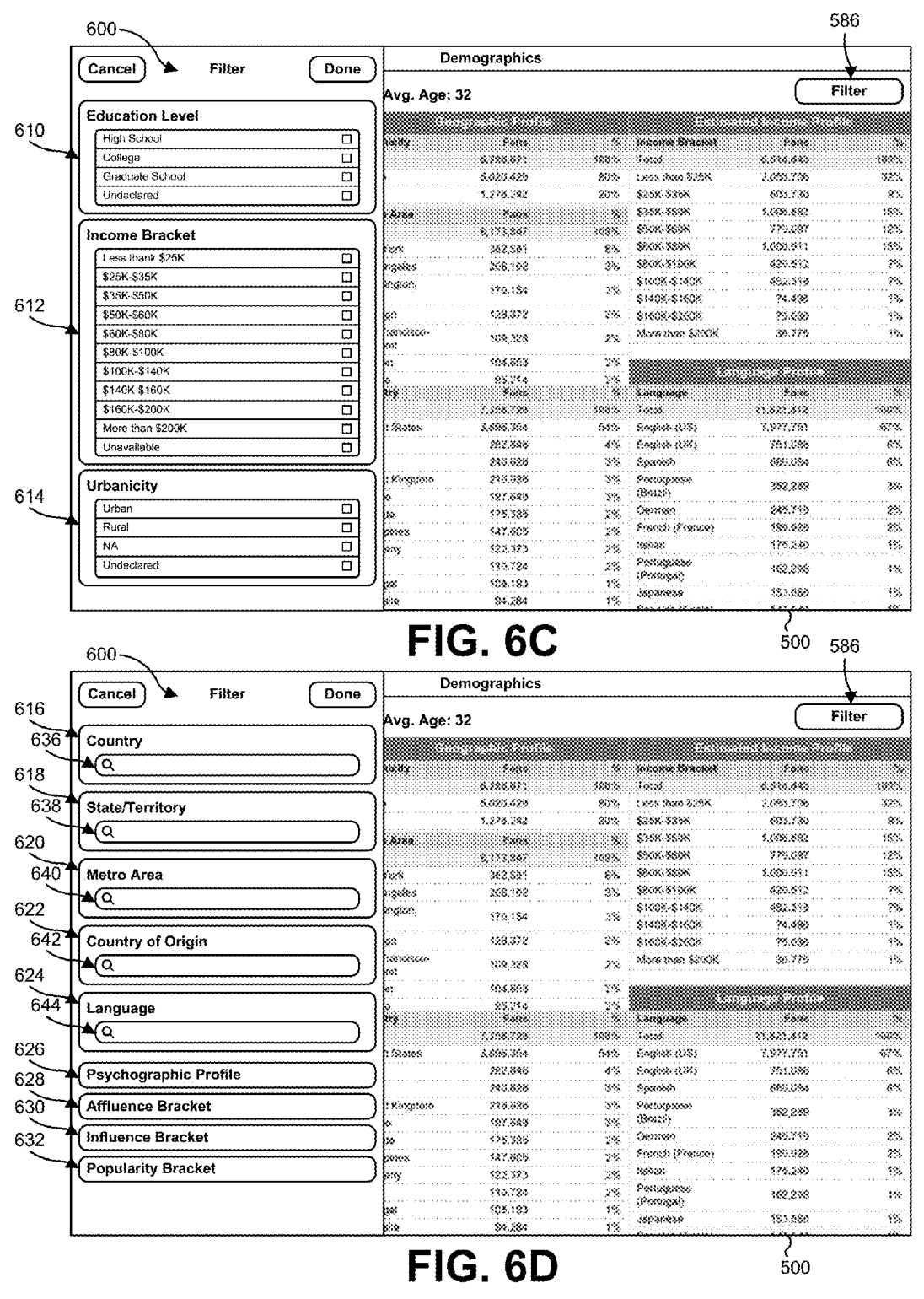

Referring now to FIG. 6C, responsive to user actuation of selectable education level filter option, GUI 500 expands education level filter option to display options (e.g., high school, college, graduate school, undeclared) for filtering the user identities by education level. In response to selection of any one of the filter options for filtering the user identities by education level, the application will include those user identities whose highest level of education corresponds to the selected filter options in the defined segment. For example, in response to selection of high school as an education level filter, the application will include those user identities whose highest level of education is high school in the defined segment. Similarly, in response to selection of graduate school as an education level filter, the application will include those user identities whose highest level of education is graduate school in the defined segment.

Responsive to user actuation of selectable income bracket filter option 612, GUI 500 expands income bracket filter option 612 to display different income brackets for filtering the user identities by income. In response to selection of any one or more of the income brackets, the application will include only those user identities whose estimated incomes (e.g., calculated based on data extracted from the electronic social networking platform as described above) fall into the selected income brackets in the defined segment. It will be appreciated that the income brackets illustrated in FIG. 6C are examples and that, in other implementations, other income brackets may be provided as filtering options for defining segments of the user identities for whom data was extracted from the electronic social networking platform.

Responsive to user actuation of selectable urbanicity filter option 614, GUI 500 expands urbanicity bracket filter option 614 to display different options (e.g., urban, rural, NA, undeclared) for filtering the user identities based on whether the application has determined their current residences to be in urban or rural areas (e.g., using the techniques described above). In response to selection of any one or more of the urbanicity filter options, the application will include only those user identities whose current residences satisfy the selected urbanicity filter options in the defined segment.

Referring now to FIG. 6D, responsive to user actuation of selectable country filter option 616, GUI 500 expands country filter option 616 to display a country specification field 636. Country specification field 636 enables a user to specify one or more countries where user identities' current residences must be located in order for the application to include the user identities in the defined segment.

Responsive to user actuation of selectable state/territory filter option 618, GUI 500 expands state/territory filter option 618 to display a state/territory specification field 638. State/territory specification field 638 enables a user to specify one or more states or territories where user identities' current residences must be located in order for the application to include the user identities in the defined segment.

Responsive to user actuation of selectable metro area filter option 620, GUI 500 expands metro area filter option 620 to display a metro area specification field 640. Metro area specification field 640 enables a user to specify one or more metro areas where the application must have determined user identities' current residences to be located in order for the application to include the user identities in the defined segment.

Responsive to user actuation of selectable country of origin filter option 622, GUI 500 expands country of origin filter option 622 to display a country of origin specification field 642. Country of origin specification field 642 enables a user to specify one or more countries that user identities must have specified as their countries of origin in order for the application to include the user identities in the defined segment.

Responsive to user actuation of selectable language filter option 624, GUI 500 expands language filter option 624 to display a language specification field 644. Language specification field 644 enables a user to specify one or more languages that user identities must have specified as their primary languages in order for the application to include the user identities in the defined segment.

Figure 6E:
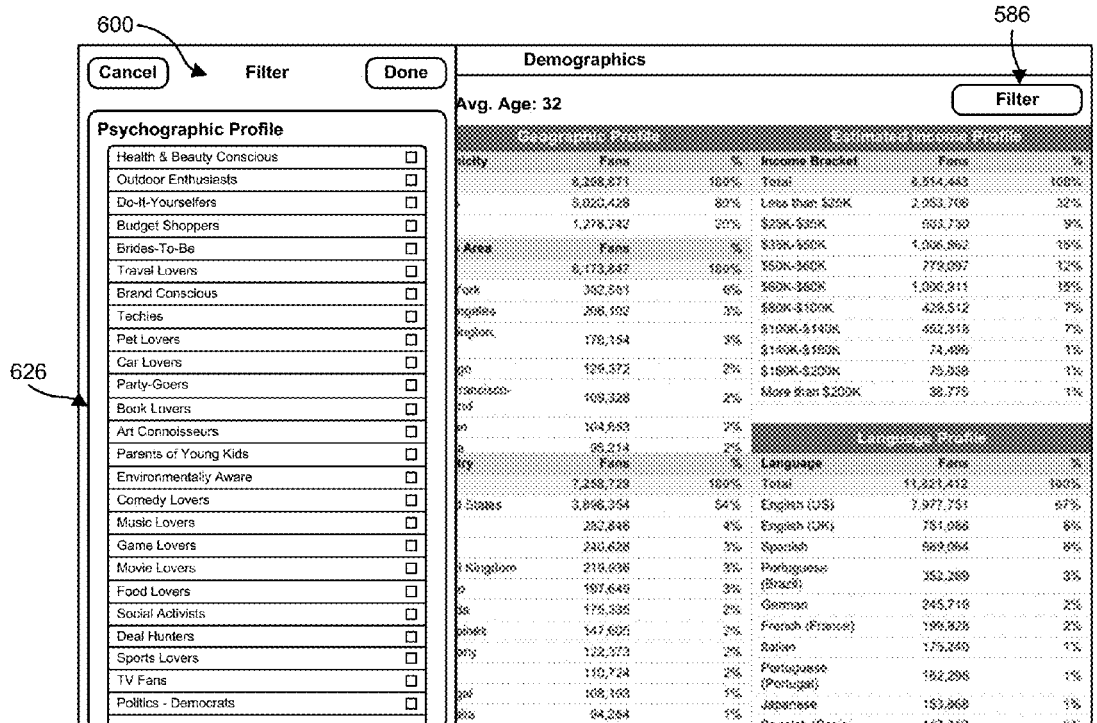

Referring now to FIG. 6E, responsive to user actuation of selectable psychographic profile filter option 626, GUI 500 expands psychographic profile filter option 626 to display different options for filtering the user identities by psychographic profile. As illustrated in FIG. 6E, psychographic profile filter option 626 provides options for filtering user identities according to the following psychographic profiles: health and beauty conscious, outdoor enthusiasts, do-it-yourselfers, budget shoppers, brides-to-be, travel lovers, brand conscious, techies, pet lovers, car lovers, party-goers, book lovers, art connoisseurs, parents of young kids, environmentally aware, comedy lovers, music lovers, game lovers, movie lovers, food lovers, social activists, deal hunters, sports lovers, TV fans, and politics—Democrats. In addition, GUI 500 is configured to enable a user to scroll the view of psychographic profile filter option 626 to access additional options for filtering by psychographic profile including politics—Republicans, religious people, frequent travelers, charity minded, shopping lovers, beverage lovers, on-line shoppers, and unassigned. In response to selection of any one or more of the psychographic profile options, the application will include those user identities whom the application identified as belonging to the selected psychographic profile(s) (e.g., using the techniques described above) in the defined segment. It will be appreciated that the psychographic profiles illustrated in FIG. 6E are examples and that, in other implementations, other psychographic profiles may be provided as filtering options for defining segments of the user identities for whom data was extracted from the electronic social networking platform.

Figure 6F:
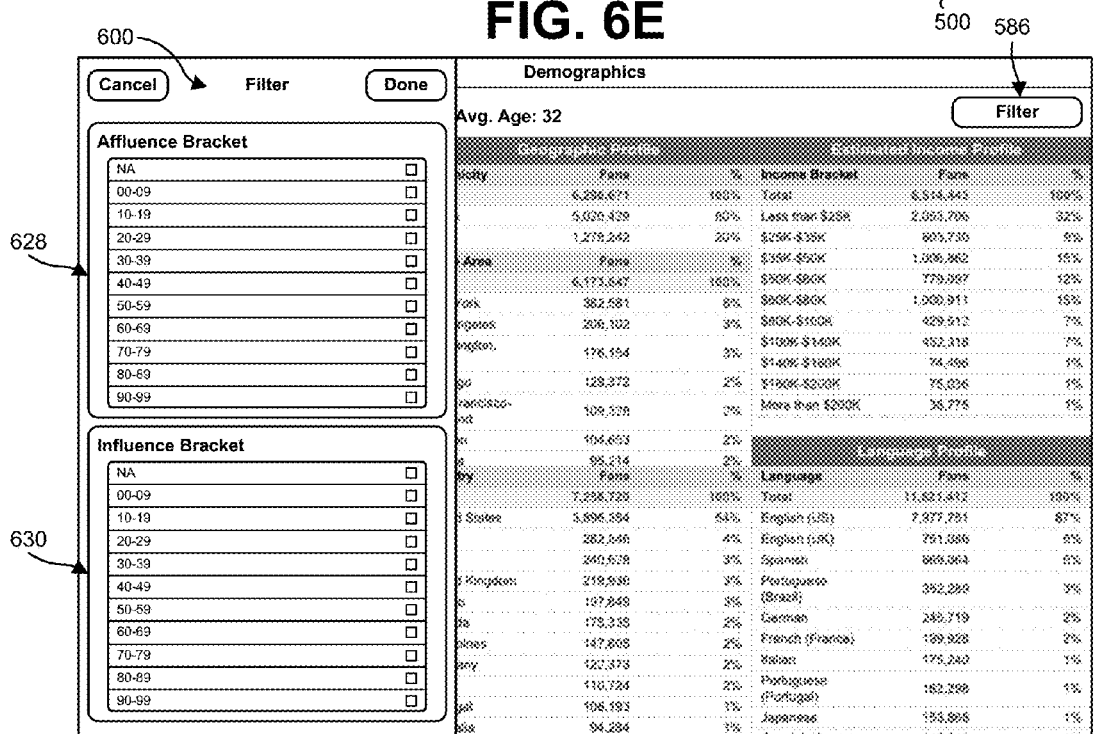

Referring now to FIG. 6F, responsive to user actuation of selectable affluence bracket filter option 628, GUI 500 expands affluence bracket filter option 628 to display different affluence brackets for filtering the user identities by affluence. In response to selection of any one or more of the affluence brackets, the application will include only those user identities whose estimated affluence (e.g., calculated based on data extracted from the electronic social networking platform as described above) falls into the selected affluence brackets in the defined segment. It will be appreciated that the affluence brackets illustrated in FIG. 6F are examples and that, in other implementations, other affluence brackets may be provided as filtering options for defining segments of the user identities for whom data was extracted from the electronic social networking platform.

Responsive to user actuation of selectable influence bracket filter option 630, GUI 500 expands influence bracket filter option 630 to display different influence brackets for filtering the user identities by influence. In response to selection of any one or more of the influence brackets, the application will include those user identities whose estimated influence (e.g., calculated based on data extracted from the electronic social networking platform as described above) falls into the selected influence brackets in the defined segment. It will be appreciated that the influence brackets illustrated in FIG. 6F are examples and that, in other implementations, other influence brackets may be provided as filtering options for defining segments of the user identities for whom data was extracted from the electronic social networking platform.

Figure 6G:
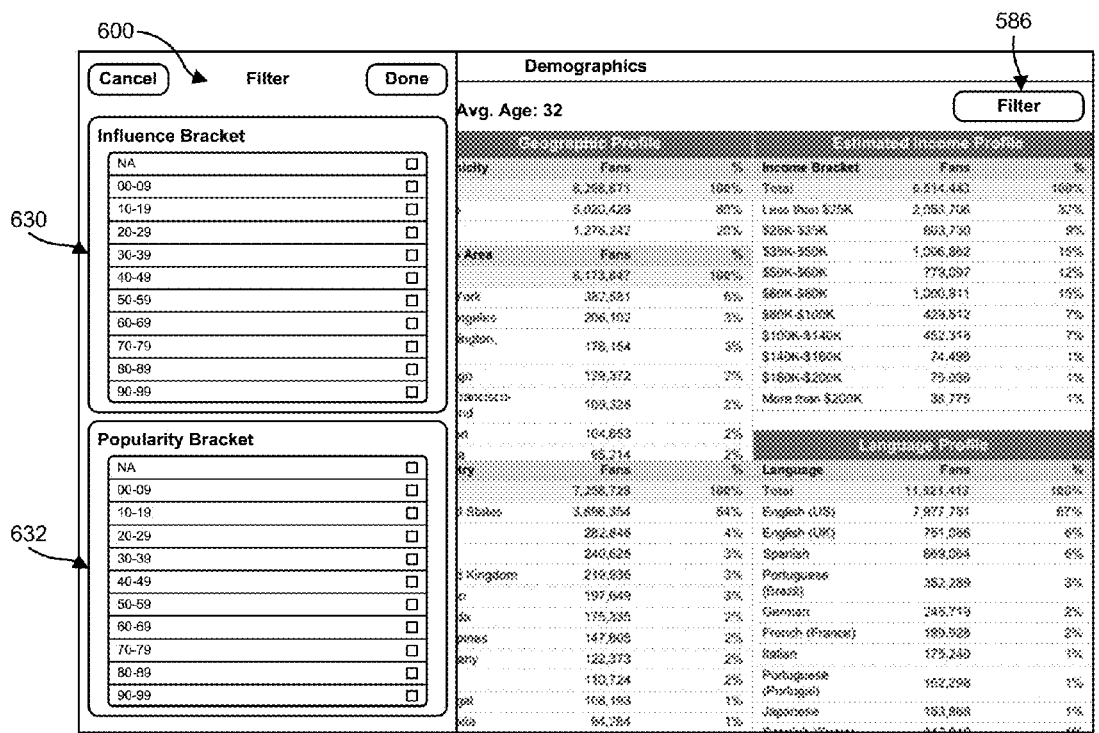

Referring now to FIG. 6G, responsive to user actuation of selectable popularity bracket filter option 632, GUI 500 expands popularity bracket filter option 632 to display different popularity brackets for filtering the user identities by popularity. In response to selection of any one or more of the popularity brackets, the application will include only those user identities whose estimated popularity (e.g., calculated based on data extracted from the electronic social networking platform as described above) falls into the selected popularity brackets in the defined segment. It will be appreciated that the popularity brackets illustrated in FIG. 6G are examples and that, in other implementations, other popularity brackets may be provided as filtering options for defining segments of the user identities for whom data was extracted from the electronic social networking platform.

A variety of different options for filtering user identities to define a segment of the user identities for whom the application extracted data from the electronic social networking platform have been described and illustrated above in connection with FIGS. 6A-6G. Any of these options may be used individually or in combination with any other option to filter the user identities to define a segment of the user identities for whom the application extracted data from the electronic social networking platform. After a segment of the user identities has been defined, indications of the user identities identified as belong to the segment may be saved, and the application may enable analysis of different characteristics of the user identities who belong to the defined segment. Additionally or alternatively, the application may enable targeted content perceived as being relevant, attractive, and/or appealing to user identities within the defined segment to be directed to the user identities within the defined segment. The application also may reveal the identities of the user identities identified as belonging to the defined segment, for example, by providing a representative of the application with a list of the user identities identified as belonging to the identified segment. Furthermore, the application may enable a representative of the application to access any or all of the data extracted from the electronic social networking platform for any individual user identity identified as belonging to the defined segment, for example, to enable the representative of the application to glean more detailed intelligence about the individual user identity.

Consider as an example the scenario where a user of the application uses the filtering options to define a segment of the user identities for whom the application extracted data from the electronic social networking platform who fall into the age brackets 22-28, 29-35, or 36-45, who have a relationship status of engaged or married, who have an education level of college or graduate school, who have estimated incomes of $50,000-$60,000, $60,000-$80,000, $80,000-$100,000, or $100,000-$140,000, and who have popularity scores calculated by the application that fall into the popularity brackets 50-59, 60-69, 70-79, 80-89, and 90-99.

As illustrated in FIGS. 7A-7H, responsive to user definition of a segment of user identities who satisfy these criteria, the application identifies the user identities for whom the application extracted data from the electronic social networking platform who satisfy these criteria and updates GUIs 500, 524, 534, 552, 568, 574, 578, and 582 to enable analysis of different characteristics of the user identities identified as belonging to the defined segment.

Figures 7A, 7B:
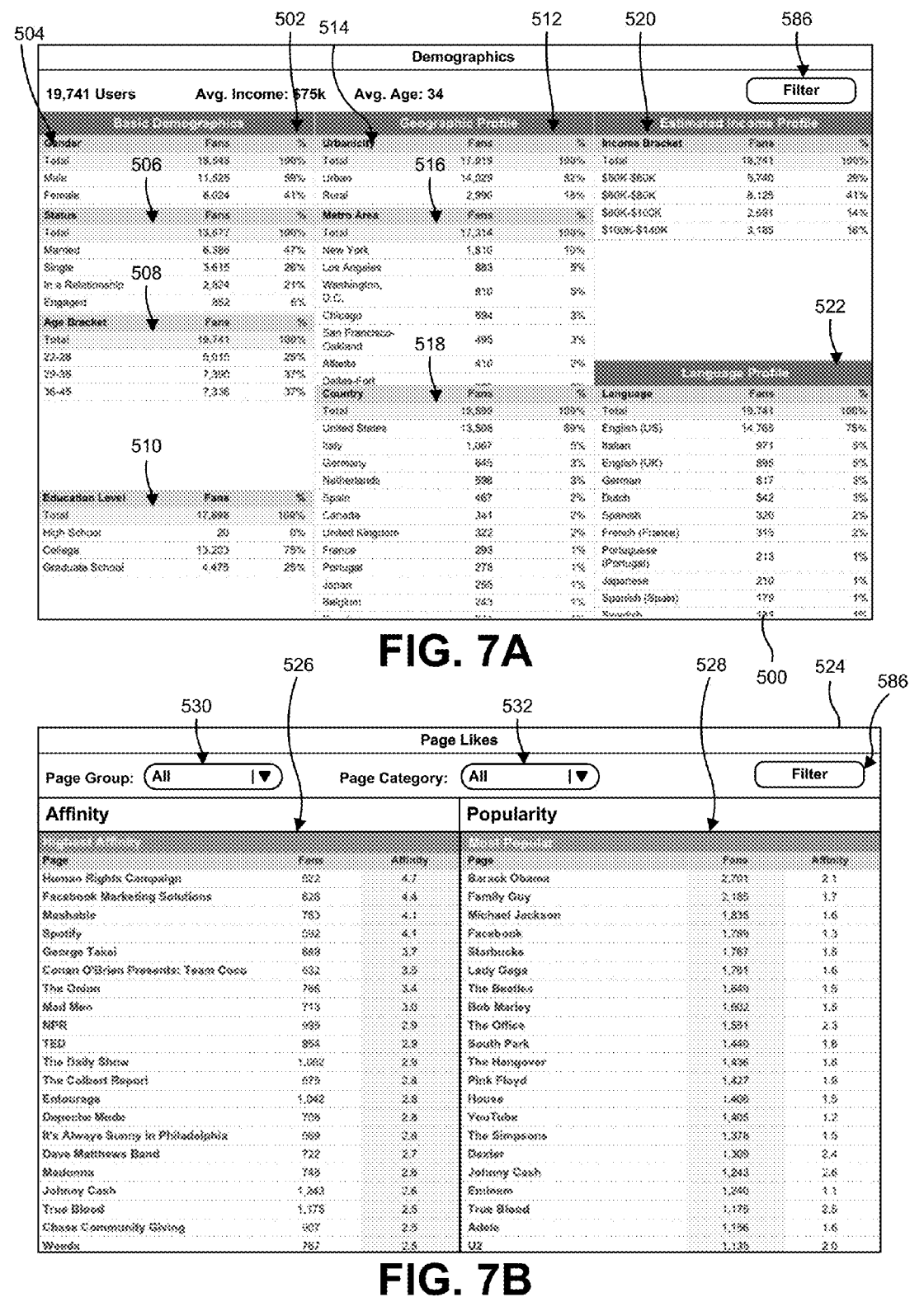

In particular, referring first to FIG. 7A, the application has updated GUI 500 to reflect that the segment of user identities who fall into the age brackets 22-28, 29-35, or 36-45, who have a relationship status of engaged or married, who have an education level of college or graduate school, who have estimated incomes of $50,000-$60,000, $60,000-$80,000, $80,000-$100,000, or $100,000-$140,000, and who have popularity scores calculated by the application that fall into the popularity brackets 50-59, 60-69, 70-79, 80-89, and 90-99 includes 19,741 of the 11,825,335 user identities for whom the application extracted data from the electronic social networking platform. In addition, the application has updated GUI 500 to reflect that the average estimated income of the user identities within the segment is $75,000 and that the average age of user identities in the segment is 34. The application also has updated the aggregated statistics about the various different demographic characteristics presented in "Basic Demographics" panel 502, the "Geographic Profile" panel 512, the "Estimated Income Profile" panel 520, and the "Language Profile" panel of GUI 500 to reflect the demographic characteristics of the 19,741 user identities that the application identified as belonging to the segment.

Presenting the aggregated statistics about the various different demographic characteristics of the user identities identified as belonging to the segment, for example, as illustrated in FIG. 7A, may enable a representative of the application to assess whether the segment actually includes the types of user identities that the representative desires to target or whether additional or alternative filtering may aid in better defining a segment of user identities the representative desires to target.

Referring now to FIG. 7B, the application also has updated the aggregated interest statistics presented in "Affinity" panel 526 and "Popularity" panel 528 of GUI 524 to reflect interests that the 19,741 user identities that the application identified as belonging to the segment have recorded with the electronic social networking platform, for example, by endorsing interest objects manifested as "pages" within the electronic social networking platform. As discussed above, "Popularity" panel 528 presents a list of the interests determined to be most popular among the user identities that the application identified as belonging to the segment. "Affinity" panel 526, meanwhile, presents a list of interests that user identities that the application identified as belonging to the segment have demonstrated stronger interest in than the overall population of 11,825,335 user identities for whom the application extracted data from the electronic social networking platform.

Identifying interests of the user identities who belong to the segment, for example, as illustrated in FIG. 7B, may facilitate the identification of content that may be relevant, attractive, or appealing to the user identities who belong to the segment. As such, identifying interests of the user identities who belong to the segment may assist the application in selecting relevant, attractive, or appealing content to deliver to user identities identified as belonging to the segment in an automated fashion. For example, in response to recognizing that the television show "Mad Men" is significantly more popular among user identities who belong to the defined segment than it is among the overall population of user identities for whom the application extracted data from the electronic social networking platform, the application may identify content accessible to the application that has been tagged as being related to the television show "Mad Men" and deliver the so-identified content to user identities identified as belonging to the defined segment in an automated fashion (e.g., by transmitting the content to user devices associated with the user identities identified as belonging to the defined segment over a network). Additionally or alternatively, presenting interests of the user identities who belong to the segment, for example, as illustrated in FIG. 7B, may assist a representative of the application in creating content to be targeted to user identities who belong to the segment. For example, if the representative of the application is interested in conducting a marketing campaign that targets user identities who belong to the segment, the representative may decide to incorporate a "Mad Men" theme within the marketing campaign in an effort to appeal to the user identities identified as belonging to the segment.

Figure 7C:
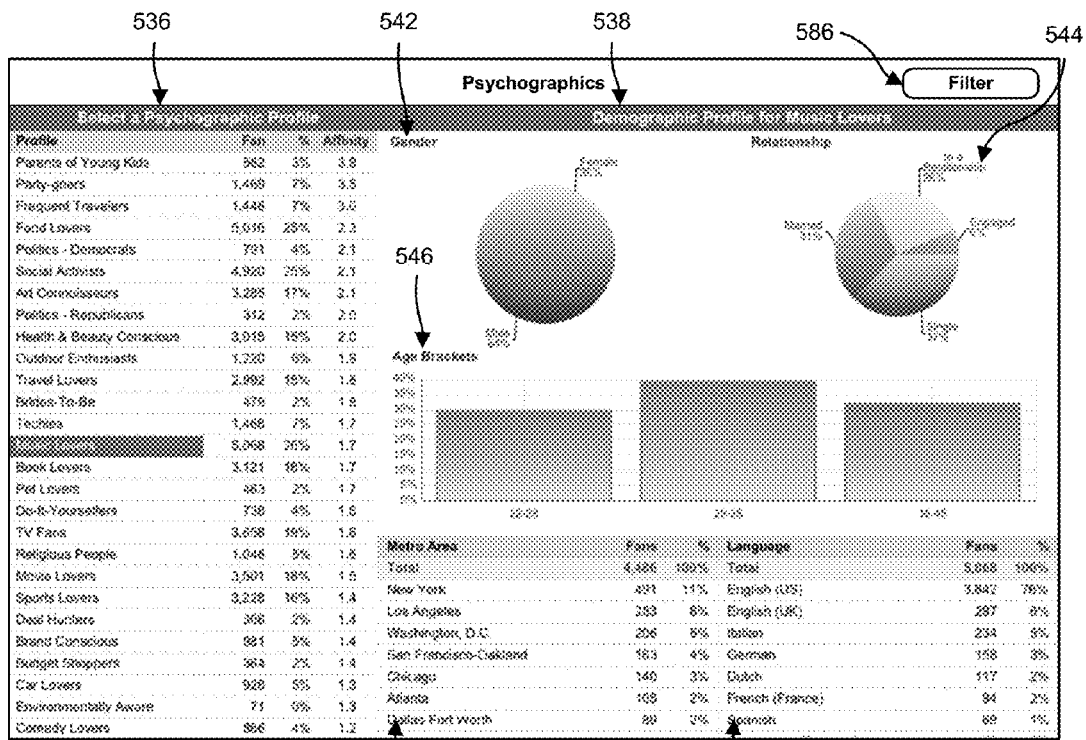

Referring now to FIG. 7C, the application has updated the membership of the different psychographic profiles represented in GUI 534 to include only user identities that the application identified as belonging to the segment. In addition, the application has updated the aggregated statistics presented about each of the different psychographic profiles in GUI 534 to reflect the characteristics of the user identities that belong to the segment that the application identified as belonging to the different psychographic profiles.

Information about the psychographic profiles of the user identities who belong to the segment may facilitate the identification of content that may be relevant, attractive, or appealing to the user identities who belong to the segment. As such, uncovering information about the psychographic profiles of the user identities who belong to the segment may assist the application in selecting relevant, attractive, or appealing content to deliver to user identities identified as belonging to the segment in an automated fashion. Additionally or alternatively, presenting information about the psychographic profiles of the user identities who belong to the segment, for example, as illustrated in FIG. 7C, may assist a representative of the application in creating content to be targeted to user identities who belong to the segment.

Figure 7D:
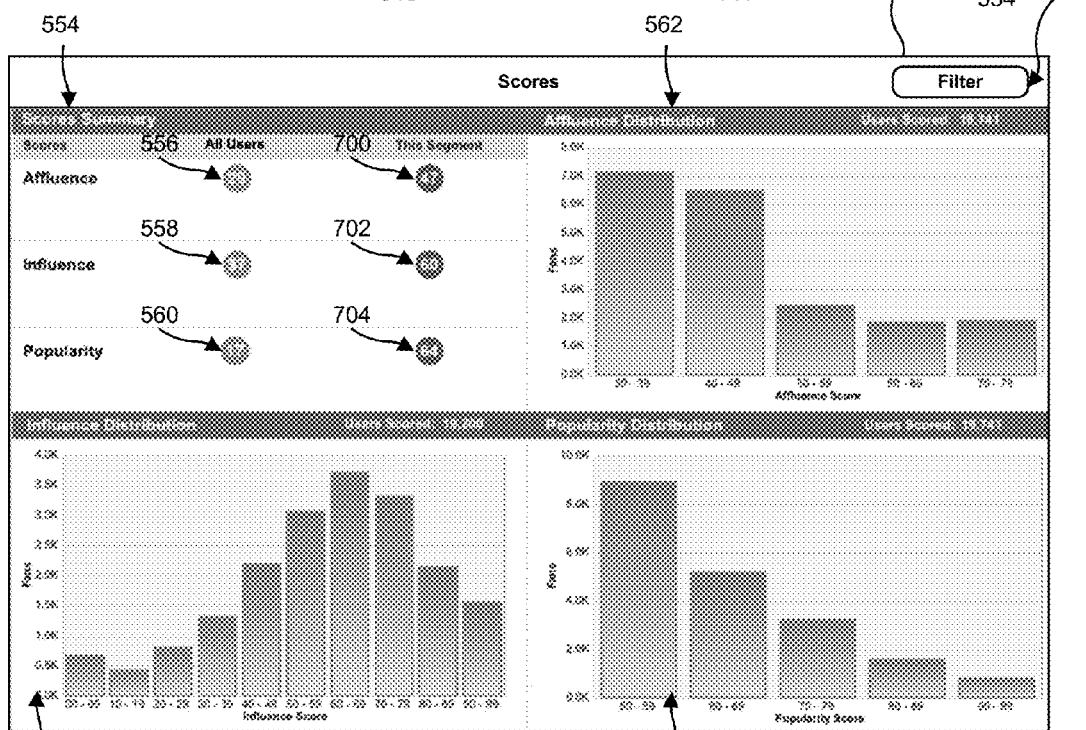

Referring now to FIG. 7D, the application has updated "Scores Summary" Panel 554 to present an average affluence score 700 of the user identities within the segment for whom the application was able to calculate affluence scores, an average influence score 702 of the user identities within the segment for whom the application was able to calculate influence scores, and an average popularity score 704 of the user identities within the segment for whom the application was able to calculate popularity scores.

Presenting statistics about the affluence, influence, and/or popularity of the user identities identified as belonging to the segment, for example, as illustrated in FIG. 7D, may enable a representative of the application to assess whether the segment actually includes the types of user identities that the representative desires to target or whether additional or alternative filtering may aid in better defining a segment of user identities the representative desires to target.

Figure 7E:
Figure 7F:
Figure 7G:
Figure 7H:

Referring now to FIG. 7E, the application has updated the bubble chart 570 of GUI 568 to plot the number of user identities within the segment who currently reside at various different geographic locations. Similarly, referring now to FIG. 7F, the application has updated the bubble chart 576 of GUI 574 to plot the average affluence of user identities within the segment for whom the application was able to calculate measures of affluence as a function of the geographic location of the user identities' current residence. Likewise, referring now to FIG. 7G, the application has updated the bubble chart 580 of GUI 578 to plot the average influence of user identities within the segment for whom the application was able to calculate measures of influence as a function of the geographic location of the user identities' current residence. Finally, referring now to FIG. 7H, the application has updated the bubble chart 584 of GUI 582 to plot the average popularity of user identities within the segment for whom the application was able to calculate measures of popularity as a function of the geographic location of the user identities' current residence.

Plotting various different characteristics of the user identities identified as belonging to the defined segment as a function of the geographic location of their current residences, for example, as illustrated in FIGS. 7E-7H, may facilitate the identification of geographic locations around which user identities identified as belonging to the segment (and/or user identities identified as belonging to the segment who possess certain other characteristics) are concentrated. This information may be useful in selecting geographic regions within which to focus outreach efforts directed at user identities identified as belonging to the segment or other individuals who may share characteristics in common with the user identities identified as belonging to the segment.

In addition to or as an alternative to enabling analysis of different characteristics of user identities identified as belonging to a segment after the segment of user identities has been defined, for example, as illustrated and described above in connection with FIGS. 7A-7H, the application also may enable targeted content to be directed to the user identities identified as belonging to the defined segment.

Figure 8:
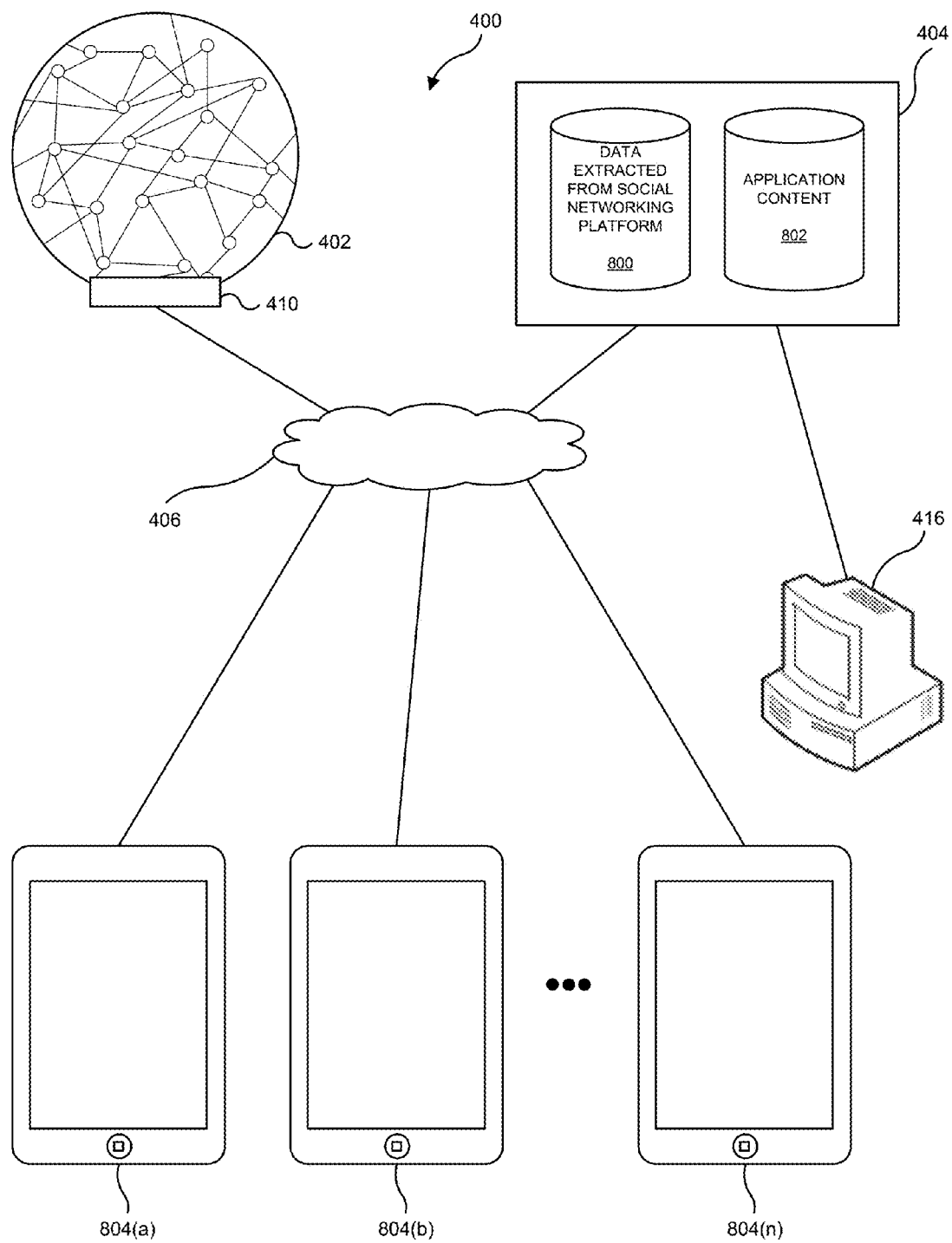
FIG. 8 is a block diagram of an example of a network computing environment.

Referring now to FIG. 8, examples of techniques and systems for targeting content to segments of user identities identified by the application hosted by computing system 404 are now described.

As illustrated in FIG. 8, computing system 404 may maintain one or more data stores 800, for example, in the internal or external storage components accessible to computing system 404, that store data extracted from electronic social networking platform 402. In addition, computing system 404 also may maintain one or more data stores 802, for example, in the internal or external storage components accessible to computing system 404, that store content that is to be delivered to users of the application hosted by computing system 404. For illustrative purposes, data store(s) 800 and data store(s) 802 are represented as separate entities. However, data store(s) 800 and data store(s) 802 may be integrated or otherwise implemented as a single data store, either on a single computing device or distributed across several computing devices.

In some implementations, a representative of the application hosted by computing system 404 may define content to be delivered to users of the application, for example, using computing device 416. The application hosted by computing system 404 may store this content in data store 802, from which the application may deliver the content to one or more users of the application, for example, by transmitting the content to computing devices 804 associated with users of the application over network 406.

Computing devices 804 may be any of a number of different types of computing devices including, for example, tablet computers as illustrated in FIG. 8, or mobile phones, smartphones, personal digital assistants, laptop or netbook computers, or desktop computers. Furthermore, computing devices 804 typically may have internal or external storage components for storing data and programs such as an operating system and one or more application programs. In particular, the internal or external storage components for computing devices 804 may store client applications for interfacing with electronic social networking platform 402 and/or client applications for interfacing with computing system 404. Additionally or alternatively, computing devices 804 may be configured to interface with electronic social networking platform 402 or computing system 404 without specific client applications, using, for example, web browsers. As such, user identities of electronic social networking platform 402 may be able to use computing devices 804 to access electronic social networking platform 402. Similarly, users of the application hosted by computing system 404 may be able to use computing devices 804 to access the application hosted by computing system 404.

The application hosted by computing system 404 may enable a representative of the application to specify that certain content stored in data store 802 is to be delivered to all users of the application while other content stored in data store 802 is only to be delivered to specific segments of users of the application defined, for example, according to techniques described above.

For example, the application hosted by computing system 404 may maintain one or more "content item" tables (e.g., in data store 802) that record, among other things, indications of content items to be delivered by the application to users of the application as well as indications of the users to whom each content item is to be delivered. The indications of content items recorded in the "content item" table(s) may serve as pointers to specific content items, for example, stored in data store 802. Meanwhile, in some implementations, the indications of the users to whom content items are to be delivered may be recorded in the "content item" table(s) as indications of defined segments of users. For example, each defined segment of users may be associated with a segment ID, and the indications of the segments of users to whom content items are to be delivered may be recorded in the "content item" table(s) as the segment IDs that correspond to the segments of users to whom the content items are to be delivered. The segment ID recorded in the "content item" table(s) for a content item that is to be delivered to all users of the application may correspond to a segment that includes all users of the application. (Alternatively, another value may be recorded in the "content item" table(s) in place of a segment ID for a content item that is to be delivered to all users of the application to reflect that the content item is to be delivered to all users of the application.) Meanwhile, the segment ID recorded in the "content item" table(s) for a content item that is to be delivered to a particular segment of users may correspond to the specific segment of users to whom the content item is targeted.

In addition to the one or more "content item" tables, the application hosted by computing system 404 may maintain one or more "user segment" tables that record, among other things, the users who belong to each segment. When a new segment of users is defined (e.g., according to the techniques described above), the application may identify the users who belong to the new segment and store indications of the users (e.g., user IDs) who belong to the new segment in the "user segment" table(s). In some implementations, the "user segment" table(s) may include a segment column and a user column such that each row in the "user segment" table(s) identifies a particular segment (e.g., by segment ID) in the segment column and specifies a particular user (e.g., by user ID) in the user column who previously was identified as belonging to the particular segment. In such implementations, a user who belongs to multiple different segments may be represented in multiple rows within the "user segment" table(s) (e.g., one row for each segment to which the user belongs). The application hosted by computing system 404 may determine to which users to deliver a particular content item stored in data store 802 by identifying the segment to which the particular content item is to be delivered from the "content item" table(s) and by identifying which users belong to the identified segment from the "user segment" table(s).

In addition to recording indications of the segments to which content items are to be delivered, the "content item" table(s) also may record other attributes of the content items. For example, in some implementations, the "content item" table(s) may record a content available start time and/or a content available end time for a content item. In such implementations, the content available start time may specify a starting time at which the content item should be made available to the users to whom it is targeted. Similarly, the content available end time may specify an ending time after which the content item no longer should be made available to the users to whom it is targeted.

When a particular user is logged into the application hosted by computing system 404 from a computing device 804, the application may identify the particular user identity (e.g., based on user identifying information like a user ID transmitted to the application by the computing device 804) and then identify content stored in data store 802 to deliver to the user identity. In some implementations, the application may identify and deliver content stored in data store 802 to the user identity in response to a request from the computing device 804 from which the user is logged into the application. For example, the user may be logged into the application via a client application or web browser on the computing device 804, and the client application or web browser on the computing device 804 may generate and transmit a request for content to the application, for example, in response to user interaction with the client application or web browser on the computing device 804. In other implementations, the application may identify and deliver content stored in data store 802 in response to one or more other triggering conditions. For example, the application may identify and push content stored in data store 802 to the computing device 804 without necessarily having received an explicit request for content from computing device 804.

To identify content to deliver to the computing device 804 from which a particular user is logged into the application hosted by computing system 404, the application may query or otherwise access the "user segment" table(s) to identify user segments to which the particular user belongs. In addition, the application may query or otherwise access the "content item" table(s) to identify content items that have been tagged for delivery to any segment(s) to which the particular user belongs. The particular user may belong to multiple different segments. Consequently, the application may determine that different content items that have been tagged for delivery to different segments of users are to be delivered to the computing device 804 from which the particular user is logged into the application. In addition, certain content items stored in data store 802 may be tagged in the "content item" table(s) as content items that are to be delivered to all users of the application. Consequently, in addition to (or as an alternative to) identifying for delivery to the particular user content items that have been tagged for delivery to specific segments to which the particular user belongs, the application also may identify for delivery to the particular user content items that have been tagged for delivery to all users of the application.

As described above, in some implementations, the "content item" table(s) may record a content available start time and/or a content available end time for different content items. In such implementations, as part of identifying content to deliver to the computing device 804 from which the particular user is logged into the application hosted by computing system 404, the application may compare the current time to any content available start times and/or content available end times recorded in connection with content items tagged for delivery to segments to which the particular user belongs before determining to deliver the content items to the computing device 804 from which the particular user identity is logged into the application. If the content available start time for a content item tagged for delivery to a segment to which the particular user belongs has not yet occurred, the application may determine not to identify the content item as a content item to be delivered to the computing device 804 from which the particular user is logged into the application. Likewise, if the content available end time for a content item tagged for delivery to a segment to which the particular user belongs already has passed, the application may determine not to identify the content item as a content item to be delivered to the computing device 804 from which the particular user is logged into the application.

After identifying content items to deliver to the computing device 804 from which the user is logged into the application, the application may access one or more of the identified content items from data store 802 and transmit the accessed content item(s) to the user device 804 from which the user is logged into the application (e.g., via network 406). As a result of identifying content items that are specifically targeted to segments to which the particular user belongs for delivery to the computing device 804 from which the particular user is logged into the application, the application may deliver content to the computing device 804 from which the particular user is logged into the application that is particularly relevant, attractive, or appealing to the particular user.

Furthermore, the content delivered by the application to different users logged into the application from different computing devices 804 may be different (e.g., even if the users are logged into the application at substantially the same time). For example, the content delivered by the application to a first user logged into the application from computing device 804(*a*) may be different from the content delivered by the application to a second user logged into the application from computing device 804(*b*), and the content delivered to the first and second users may be different from the content delivered by the application to a third user logged into the application from computing device 804(*n*). In particular, content delivered by the application to the first user logged into the application from computing device 804(*a*) may include content items specifically targeted to segments to which the first user belongs, while content delivered by the application to the second user logged into the application from computing device 804(*b*) may include content items specifically targeted to segments to which the second user belongs and content delivered by the application to the third user logged into the application from computing device 804(*n*) may include content items specifically targeted to segments to which the third user belongs.

Referring again to FIG. 10, a specific example is illustrated of how content delivered by the application to different users logged into the application from different computing devices may be different even if the users are logged into the application at substantially the same time. As discussed above, the user identity James logged into the application from mobile device 1000 currently resides in New York City, speaks English as his primary language, and is interested in business intelligence software, while the user identity Jacques logged into the application from mobile device 1002 currently resides in Montreal, speaks French as his primary language, and is interested in business intelligence software. Consequently, content delivered by the application to the user identity James at mobile device 1000, including, for example, invitation 1004, may be targeted to a segment of users that is defined as including users who live in the New York City metro area, who speak English as their primary language, and who are interested in business intelligence software and that, thus, includes James. Meanwhile, content delivered by the application to the user identity Jacques at mobile device 1002, including, for example, invitation 1006, may be targeted to a segment of users that is defined as including users who live in the Montreal metro area, who speak French as their primary language, and who are interested in business intelligence software and that, thus, includes Jacques.

Figure 9A:
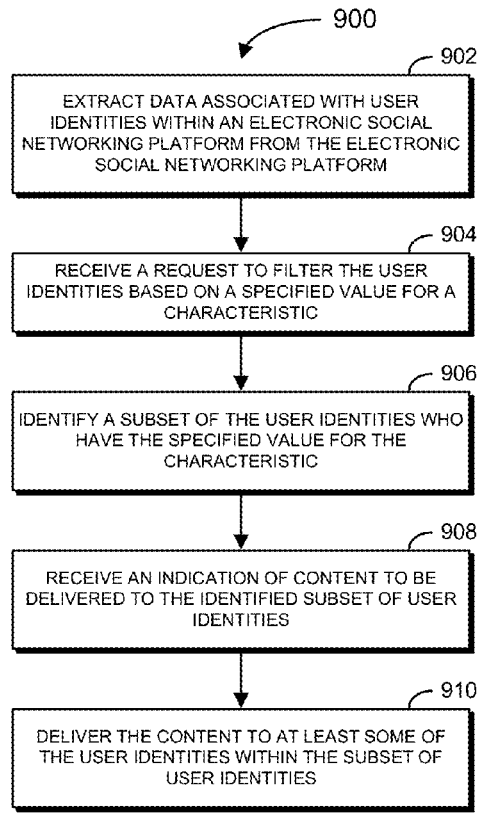
FIGS. 9A-9B are flow charts that illustrate examples of processes.

FIG. 9A is a flow chart 900 that illustrates an example of a process for identifying a subset of user identities of an electronic social networking platform to whom to deliver content. The process illustrated in the flow chart 900 of FIG. 9A may be performed by a computing system hosting an application, such as, for example, computing system 404 of FIGS. 4A-4C and FIG. 8.

The computing system extracts data associated with user identities within an electronic social networking platform from the electronic social networking platform (902). For example, for each user identity within a set of user identities, the computing system may extract (or attempt to extract) from the electronic social networking platform some or all of the following types of data: name; gender; birthday (and/or age); current city; hometown; relationship status; sexual orientation; primary language; employment history; education history; contact information (e.g., mailing address(es), e-mail address(es), phone number(s), etc.); interests recorded with the electronic social networking platform (e.g., by endorsing interest objects manifested as "pages"); "check-ins" registered with the electronic social networking platform; event information for events to which the user identity has been invited within the context of the electronic social networking platform; "status posts" published by the user identity to other user identities who are members of the user identity's social network and any related responsive comments and/or endorsements; and "wall posts" or "timeline posts" received by the user identity. After extracting the data from the electronic social networking platform, the computing system may store the extracted data in a computer-readable storage device.

The computing system receives a request to filter the user identities for whom data was extracted from the electronic social networking platform based on a specified value for a characteristic (904). The computing system may receive the request to filter the user identities from a computing device associated with a representative of the application hosted by the computing system. For example, the computing system may receive the request to filter the user identities from computing device 416 of FIG. 4C and FIG. 8. The computing system may provide a variety of different options for filtering the user identities for whom data was extracted from the electronic social networking platform. For example, the computing system may enable filtering of the user identities for whom data was extracted based on interests recorded with the electronic social networking platform; age; relationship status; education level; income; urbanicity of current residence; country of current residence; state/territory of current residence; metro area of current residence; country of origin; primary language; psychographic profile membership; affluence; influence; and/or popularity. The request to filter the user identities based on a specified value may include a request to filter the user identities based on one or more specified values for any one or more of the different characteristics for which the computing system enables filtering of the user identities for whom data was extracted from the electronic social networking platform.

In response to receiving the request to filter the user identities for whom data was extracted from the electronic social networking platform, the computing system identifies a subset of the user identities who have the value for the characteristic specified in the request (906). In the event that the request includes a request to filter the user identities based on more than one specified value for a characteristic and/or one or more values for multiple different characteristics, the computing system may identify a subset of user identities who satisfy the different filter parameters specified in the request.

The computing system receives an indication of content to be delivered to the identified subset of user identities (908). The computing system may receive the indication of content to be delivered to the identified subset of user identities from a computing device associated with a representative of the application hosted by the computing system. For example, the computing system may receive the indication of content to be delivered to the identified subset of user identities from computing device 416 of FIG. 4C and FIG. 8. The indication of content to be delivered to the identified subset of user identities may include the actual content to be delivered. Alternatively, the indication of content to be delivered may include a pointer or other form of a link to the content to be delivered.

Thereafter, the computing system delivers the content to at least some of the user identities within the subset of user identities (910). For example, the computing system may deliver the content to a user identity within the subset of user identities according to the process illustrated and described below in connection with FIG. 9B. Although not illustrated in FIG. 9A, at some later time, the computing system also may receive one or more indications of additional content to be delivered to the identified subset of user identities, and, in response, the computing system may deliver this additional content to at least some of the user identities within the subset of user identities.

The process illustrated in the flowchart 900 of FIG. 9A may be repeated to define multiple different subsets of user identities of the social networking platform who share one or more characteristics and to target content for delivery to each of the different subsets of user identities. The user identities who belong to individual ones of these subsets may overlap. Likewise, the user identities who belong to individual ones of these subsets may be disjoint.

Figure 9B:
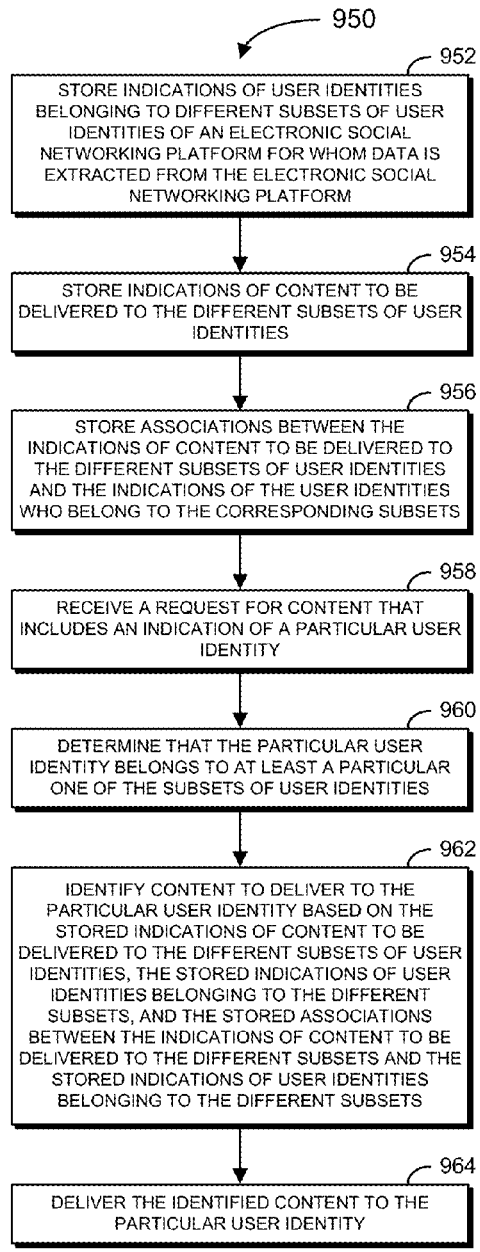

FIG. 9B is a flow chart 950 that illustrates an example of a process for delivering content to a user identity. The process illustrated in the flow chart 950 of FIG. 9B may be performed by a computing system hosting an application, such as, for example, computing system 404 of FIGS. 4A-4C and FIG. 8.

The computing system stores indications of user identities who belong to different subsets of user identities of an electronic social networking platform for whom data is extracted from the electronic social networking platform (952). For example, the user identities of the electronic social networking platform for whom data is extracted from the electronic social networking platform may be users of an application hosted by the computing system, and the different subsets of the user identities for whom data is extracted from the electronic social networking platform may be defined according to techniques described above. In some implementations, the computing system may store the indications of the user identities who belong to the different subsets in one or more tables that record the individual user identities who belong to each subset.

The computing system also stores indications of content to be delivered to the different subsets of user identities (954). The computing system may have received the stored indications of content to be delivered to the different subsets of user identities from one or more computing devices associated with one or more representatives of the application hosted by the computing system. For example, the computing system may have received the stored indications of content to be delivered to the different subsets of user identities from computing device 416 of FIG. 4C and FIG. 8. The stored indications of the content to be delivered to the different subsets may include pointers or other forms of links to the content to be delivered to the different subsets, or the stored indications of the content to be delivered to the different subsets may include the actual content itself.

In addition, the computing system stores associations between the indications of content to be delivered to the different subsets of user identities and the indications of the user identities who belong to the corresponding subsets to which the content is to be delivered (956). For example, in some implementations, the computing system may store indications of content items to be delivered to the different subsets of user identities in one or more tables, and the one or more tables may record the subsets of user identities to which each content item is to be delivered.

The computing system receives a request for content that includes an indication of a particular user identity (958). For example, the computing system may receive a request for content from a computing device, such as, for example, one of computing device 408 of FIGS. 4A-4C and computing devices 804(a)-804(n) of FIG. 8. The request for content may include an indication of a particular user identity on behalf of whom the request is being made. For example, the request may include an indication of a user identity (e.g., a user ID) who is logged into the application hosted by the computing system from the computing device from which the request was received. Furthermore, the request may actually be a request by the computing device to establish a communication session that is associated with the particular user identity with the computing system, and the request may include identifying information for the particular user identity, including, for example, a user ID and/or additional authentication information such as a password or other access control mechanism. Additionally or alternatively, the request may be received within an established communication session that is associated with the particular user identity.

The computing system determines that the particular user identity belongs to at least a particular one of the subsets of user identities (960). For example, the computing system may determine that the particular user identity belongs to a particular one of the subsets by querying or otherwise accessing the stored indications of the user identities who belong to the different subsets of user identities. It will be appreciated that the particular user identity may belong to any number of different subsets of user identities.

In addition, the computing system identifies content to deliver to the particular user identity based on the stored indications of content to be delivered to the different subsets of user identities, the stored indications of the user identities who belong to the different subsets, and the stored associations between the indications of the content to be delivered to the different subsets of user identities and the stored indications of the user identities who belong to the different subsets (962). For example, the computing system may identify content to be delivered to at least the particular one of the subsets of user identities as content to deliver to the particular user identity. Furthermore, if the computing system determines that the particular user identity belongs to multiple different subsets of user identities, the computing system may identify content associated with multiple different subsets of user identities as content to deliver to the particular user identity.

After identifying the content to be delivered to the particular user identity, the computing system delivers the content to the particular user identity (964). For example, the computing system may deliver the content to the particular user identity by transmitting the content to a computing device from which the particular user identity is logged into the application hosted by the computing system.

The process illustrated in the flowchart 950 of FIG. 9B may be repeated at different times for the same user identity to identify and deliver potentially different content to the user identity. Furthermore, the process illustrated in the flowchart 950 of FIG. 9B may be repeated to identify and deliver content to multiple different user identities who are users of the application hosted by the computing system. Each user identity for whom the process is performed may belong to different subsets of user identities and, thus, the content delivered to each user identity for whom the process is performed may be different.

A number of methods, techniques, systems, and apparatuses have been described. Nevertheless, various modifications may be made without departing from the scope of this disclosure. For example, although various disclosed techniques generally are described herein as being performed externally to an electronic social networking platform using data extracted from the electronic social networking platform, in some implementations, the techniques disclosed herein may be performed internally within an electronic social networking platform using data stored by the electronic social networking platform. In addition, although one mechanism by which a user identity may record an interest with an electronic social networking platform that is described herein is to endorse a "page" hosted by the electronic social networking platform, there are other ways in which a user identity may record an interest with an electronic social networking platform. Furthermore, in some cases, a user identity may record an interest with an electronic social networking platform by endorsing a "page" that is not hosted by the electronic social networking platform. For example, in some cases, a user identity may record an interest with an electronic social networking platform by endorsing a web page or website that is external to the electronic social networking platform.

Moreover, although various disclosed techniques by which an application may deliver targeted content to users are described generally in the context of delivering content to users within the context of the application itself, in some implementations, the application may deliver targeted content to users utilizing channels that are external to the application. For example, in some implementations, the application may transmit targeted content to a particular user identity by transmitting a message to the user identity within the electronic social networking platform (e.g., by posting the targeted content to the user identity's "wall" or "timeline" within the electronic social networking platform). Additionally or alternatively, in some implementations, the application may extract various different types of contact information for the particular user identity from the electronic social networking platform, including, for example, one or more e-mail addresses for the particular user identity and/or one or more telephone numbers for the particular user identity. In such implementations, the application may transmit targeted content to the particular user identity by sending the targeted content to the e-mail address(es) extracted from the electronic social networking platform for the particular user identity and/or by sending the targeted content to the telephone number(s) for the particular user identity, for example, as text (e.g., short message service (SMS)) and/or multimedia (e.g., multimedia messaging service (MMS)) messages.

Content distributed to users may include any data that can be provided over an electronic communications network. Examples may include electronic messages; electronic documents; electronic offers including, for example, coupons or vouchers; electronic tickets; electronic credentials; links to remote content; interactive user experiences and other interactive functionality; different forms of electronic media including one or more photographs, one or more videos, and/or one or more audio files; etc.

The methods, techniques, systems, and apparatuses described herein may be implemented in digital electronic circuitry or computer hardware, for example, by executing instructions stored in tangible computer-readable storage media.

Apparatuses implementing these techniques may include appropriate input and output devices, a computer processor, and/or tangible computer-readable storage media storing instructions for execution by a processor.

A process implementing techniques disclosed herein may be performed by a processor executing instructions stored on a tangible computer-readable storage medium for performing desired functions by operating on input data and generating appropriate output. Suitable processors include, by way of example, both general and special purpose microprocessors. Suitable computer-readable storage devices for storing executable instructions include all forms of non-volatile memory, including, by way of example, semiconductor memory devices, such as Erasable Programmable Read-Only Memory (EPROM), Electrically Erasable Programmable Read-Only Memory (EEPROM), and flash memory devices; magnetic disks such as fixed, floppy, and removable disks; other magnetic media including tape; and optical media such as Compact Discs (CDs) or Digital Video Disks (DVDs). Any of the foregoing may be supplemented by, or incorporated in, specially designed application-specific integrated circuits (ASICs).

Although the operations of the disclosed techniques may be described herein as being performed in a certain order and/or in certain combinations, in some implementations, individual operations may be rearranged in a different order, combined with other operations described herein, and/or eliminated, and desired results still may be achieved. Similarly, components in the disclosed systems may be combined in a different manner and/or replaced or supplemented by other components and desired results still may be achieved.

What is claimed is:

1. A computer-implemented method comprising:
for each user identity within a set of multiple user identities of an electronic identity platform, extracting, from the electronic identity platform, data associated with the user identity within the electronic identity platform;
receiving a request to filter the set of user identities based on a first value for a characteristic and a second value for the characteristic;
based on the data associated with individual user identities extracted from the electronic identity platform, identifying a first subset of the user identities who have the first value for the characteristic and a second subset of the user identities who have the second value for the characteristic;
receiving an indication of content to be delivered to the identified first subset of user identities who have the first value for the characteristic and to the identified second subset of user identities who have the second value for the characteristic;
modifying the content based on the second value of the characteristic; and
as a consequence of receiving the indication of content to be delivered to the identified first subset of user identities who have the first value for the characteristic and to the identified second subset of user identities who have the second value for the characteristic, delivering the content to at least some of the user identities within the identified first subset of user identities who have the first value for the characteristic and delivering the modified content to at least some of the user identities within the identified second subset of user identities who have the second value for the characteristic.

2. The method of claim 1 further comprising:

storing, in computer-readable storage, first indications of the user identities identified as belonging to the first subset of user identities and second indications of the user identities identified as belonging to the second subset of user identities;

storing, in computer-readable storage, the indication of the content to be delivered to the identified first subset of user identities and to the identified second subset of user identities; and creating an association between (i) the stored first indications of the user identities identified as belonging to the identified first subset of user identities and the stored second indications of the user identities identified as belonging to the second subset of user identities and (ii) the stored indication of the content to be delivered to the identified first subset of user identities and to the identified second subset of user identities, wherein:

delivering the content to at least some of the user identities within the first identified subset of user identities and delivering the modified content to at least some of the user identities within the identified second subset of user identities includes:

receiving a request for content from a computing device, the request including an indication of a particular user identity, comparing the indication of the particular user identity to one or more of the stored first indications of the user identities identified as belonging to the subset of user identities and the stored second indications of the user identities identified as belonging to the second subset of user identities, as a consequence of comparing the indication of the particular user identity to the one or more stored first indications of the user identities identified as belonging to the subset of user identities and the stored second indications of the user identities identified as belonging to the second subset of user identities, determining that the particular user identity belongs to the identified second subset of user identities, based on having determined that the particular user identity belongs to the identified second subset of user identities and based on the association between (i) the stored first indications of the user identities identified as belonging to the identified first subset of user identities and the stored second indications of the user identities identified as belonging to the second subset of user identities and (ii) the stored indication of the content to be delivered to the identified first subset of user identities and to the identified second subset of user identities, identifying the modified content as content to be delivered to the particular user identity, and as a consequence of identifying the modified content as content to be delivered to the particular user identity, transmitting the modified content to the computing device in response to the received request for content from the computing device.

3. The method of claim 1 further comprising:

receiving an additional request to filter the set of user identities based on a different criterion;

based on the data associated with individual user identities extracted from the electronic identity platform, identifying an additional subset of the user identities who satisfy the different criterion;

receiving an indication of different content to be delivered to the additional subset of user identities; and as a consequence of receiving the indication of the different content to be delivered to the additional subset of user identities, delivering the different content to at least some of the user identities within the additional subset of user identities.

4. The method of claim 3 further comprising:

storing, in computer-readable storage, first indications of the user identities identified as belonging to the first subset of user identities and second indications of the user identities identified as belonging to the second subset of user identities;

storing, in computer-readable storage, the indication of the content to be delivered to the identified first subset of user identities and to the identified second subset of user identities;

creating an association between (i) the stored first indications of the user identities identified as belonging to the identified first subset of user identities and the stored second indications of the user identities identified as belonging to the second subset of user identities and (ii) the stored indication of the content to be delivered to the identified first subset of user identities and to the identified second subset of user identities;

storing, in computer-readable storage, indications of the user identities identified as belonging to the additional subset of user identities;

storing, in computer-readable storage, the indication of the different content to be delivered to the additional subset of user identities; and creating an association between the stored indications of the user identities identified as belonging to the additional subset of user identities and the stored indication of the different content to be delivered to the additional subset of user identities, wherein:

delivering the content to at least some of the user identities within the first identified subset of user identities and delivering the modified content to at least some of the user identities within the identified second subset of user identities includes:

receiving a first request for content from a first computing device, the first request including an indication of a first user identity, comparing the indication of the first user identity to one or more of the stored first indications of the user identities identified as belonging to the subset of user identities and the stored second indications of the user identities identified as belonging to the second subset of user identities, as a consequence of comparing the indication of the first user identity to the one or more stored first indications of the user identities identified as belonging to the subset of user identities and the stored second indications of the user identities identified as belonging to the second subset of user identities, determining that the first user identity belongs to the second subset of user identities, based on having determined that the first user identity belongs to the second subset of user identities and based on the association between (i) the stored first indications of the user identities identified as belonging to the identified first subset of user identities and the stored second indications of the user identities identified as belonging to the second subset of user identities and (ii) the stored indication of the content to be delivered to the identified first subset of user identities and to the identified second subset of user identities, identifying the modified content as content to be delivered to the first user identity, and as a consequence of identifying the modified content as content to be delivered to the first user identity, transmitting the modified content to the first computing device in response to the received request for content from the first computing device; and delivering the different content to at least some of the user identities within the additional subset of user identities includes:

receiving a second request for content from a second computing device, the second request including an indication of a second user identity, comparing the indication of the second user identity to one or more of the stored indications of the user identities identified as belonging to the additional subset of user identities, as a consequence of comparing the indication of the second user identity to the one or more stored indications of the user identities identified as belonging to the additional subset of user identities, determining that the second user identity belongs to the additional subset of user identities, based on having determined that the second user identity belongs to the additional subset of user identities and based on the association between the stored indications of the user identities identified as belonging to the additional subset of user identities and the stored indication of the different content to be delivered to the additional subset of user identities, identifying the different content as content to be delivered to the second user identity, and as a consequence of identifying the different content as content to be delivered to the second user identity, transmitting the different content to the second computing device in response to the received request for content from the second computing device.

5. The method of claim 3 further comprising:

storing, in computer-readable storage, first indications of the user identities identified as belonging to the first subset of user identities and second indications of the user identities identified as belonging to the second subset of user identities;

storing, in computer-readable storage, the indication of the content to be delivered to the identified first subset of user identities and to the identified second subset of user identities;

creating an association between (i) the stored first indications of the user identities identified as belonging to the identified first subset of user identities and the stored second indications of the user identities identified as belonging to the second subset of user identities and (ii) the stored indication of the content to be delivered to the identified first subset of user identities and to the identified second subset of user identities;

storing, in computer-readable storage, indications of the user identities identified as belonging to the additional subset of user identities;

storing, in computer-readable storage, the indication of the different content to be delivered to the additional subset of user identities;

creating an association between the stored indications of the user identities identified as belonging to the additional subset of user identities and the stored indication of the different content to be delivered to the additional subset of user identities;

receiving a request for content from a computing device, the request including an indication of a particular user identity;

comparing the indication of the particular user identity to one or more of the stored first indications of the user identities identified as belonging to the subset of user identities and the stored second indications of the user identities identified as belonging to the second subset of user identities;

as a consequence of comparing the indication of the particular user identity to the one or more stored first indications of the user identities identified as belonging to the subset of user identities and the stored second indications of the user identities identified as belonging to the second subset of user identities, determining that the particular user identity belongs to the identified second subset of user identities;

based on having determined that the particular user identity belongs to the identified second subset of user identities and based on the association between (i) the stored first indications of the user identities identified as belonging to the identified first subset of user identities and the stored second indications of the user identities identified as belonging to the second subset of user identities and (ii) the stored indication of the content to be delivered to the identified first subset of user identities and to the identified second subset of user identities, identifying the modified content as content to be delivered to the particular user identity;

comparing the indication of the particular user identity to one or more of the stored indications of the user identities identified as belonging to the additional subset of user identities; and as a consequence of comparing the indication of the particular user identity to the one or more stored indications of the user identities identified as belonging to the additional subset of user identities, determining that the particular user identity belongs to the additional subset of user identities; and based on having determined that the particular user identity belongs to the additional subset of user identities and based on the association between the stored indications of the user identities identified as belonging to the additional subset of user identities and the stored indication of the different content to be delivered to the additional subset of user identities, identifying the different content as content to be delivered to the particular user identity, wherein:

delivering the content to at least some of the user identities within the first identified subset of user identities and delivering the modified content to at least some of the user identities within the identified second subset of user identities includes transmitting the modified content to the computing device in response to the received request for content from the computing device as a consequence of identifying the modified content as content to be delivered to the particular user identity; and delivering the different content to at least some of the user identities within the additional subset of user identities includes transmitting the different content to the computing device in response to the received request for content from the computing device as a consequence of identifying the different content as content to be delivered to the particular user identity.

6. The method of claim 3 wherein identifying an additional subset of the user identities who satisfy the different criterion includes identifying an additional subset of the user identities that has at least one user identity in common with the identified first subset of user identities who have the first value for the characteristic or with the identified second subset of user identities who have the second value for the characteristic.

7. The method of claim 3 wherein identifying an additional subset of the user identities who satisfy the different criterion includes identifying an additional subset of the user identities that is disjoint from the identified first subset of user identities who have the first value for the characteristic and with the identified second subset of user identities who have the second value for the characteristic.

8. The method of claim 1 further comprising:
receiving an indication of a time period within which the content is to be delivered to the identified first subset of user identities;
receiving a request for content from a computing device, the request including an indication of a particular user identity;
determining that the particular user identity belongs to the identified first subset of user identities;
determining a time at which the request for content was received from the computing device;
determining that the time at which the request for content was received from the computing device is within the time period within which the content is to be delivered to the identified first subset of user identities;
as a consequence of having determined that the particular user identity belongs to the identified first subset of user identities and that the time at which the request for content was received from the computing device is within the time period within which the content is to be delivered to the identified first subset of user identities, transmitting the content to the computing device in response to the received request for content from the computing device.

9. The method of claim 1 further comprising:
receiving an indication of different content to be delivered to the set of multiple user identities; and
as a consequence of receiving the indication of the different content to be delivered to the set of multiple user identities, delivering the different content to at least some of the user identities within the set of multiple user identities.

10. The method of claim 9 further comprising:
establishing a communications session with a computing device;
receiving an indication from the computing device that the communications sessions is associated with a particular user identity; and
determining that the particular user identity belongs to the identified first subset of user identities, wherein:
delivering the content to at least some of the user identities within the identified first subset of user identities who have the first value for the characteristic and delivering the modified content to at least some of the user identities within the identified second subset of user identities who have the second value for the characteristic includes transmitting the content to the computing device as a consequence of determining that the particular user identity belongs to the identified first subset of user identities, and
delivering the different content to at least some of the user identities within the set of multiple user identities includes transmitting the content to the computing device.

11. The method of claim 1 further comprising:
establishing a communications session with a computing device;
receiving an indication from the computing device that the communications sessions is associated with a particular user identity; and
determining that the particular user identity belongs to the identified first subset of user identities, wherein:
delivering the content to at least some of the user identities within the identified first subset of user identities who have the first value for the characteristic and delivering the modified content to at least some of the user identities within the identified second subset of user identities who have the second value for the characteristic includes transmitting the content to the computing device as a consequence of determining that the particular user identity belongs to the identified first subset of user identities.

12. The method of claim 11 wherein transmitting the content to the computing device as a consequence of determining that the particular user identity belongs to the identified first subset of user identities includes pushing the content to the computing device.

13. The method of claim 1 wherein:
extracting, for each user identity within the set of multiple user identities, data associated with the user identity within the electronic identity platform includes extracting gender data, relationship status data, age data, education history data, current residence data, and primary language data for user identities within the set of multiple user identities; and
receiving a request to filter the set of user identities based on a first value for a characteristic and a second value for the characteristic includes receiving a request to filter the set of user identities based on a values for at least one of gender, relationship status, age, education history, current residence, and primary language.

14. The method of claim 1 further comprising estimating, for each of at least some of the user identities in the set of user identities, the user identity's income based on data associated with the user identity extracted from the electronic identity platform, wherein:
receiving a request to filter the set of user identities based on a first value for a characteristic and a second value for the characteristic includes receiving a request to filter the set of user identities to include user identities having specified income levels; and
identifying a first subset of the user identities who have the first value for the characteristic and a second subset of the user identities who have the second value for the characteristic includes identifying subsets of the user identities whose estimated incomes satisfy the specified income levels.

15. The method of claim 1 further comprising estimating, for each of at least some of the user identities in the set of user identities, the user identity's influence within the electronic identity platform based on data associated with the user identity extracted from the electronic identity platform, wherein:
receiving a request to filter the set of user identities based on a first value for a characteristic and a second value for the characteristic includes receiving a request to filter the set of user identities to include user identities having specified influence levels; and identifying a first subset of the user identities who have the first value for the characteristic and a second subset of the user identities who have the second value for the characteristic includes identifying subsets of the user identities whose estimated influence within the electronic identity platform satisfies the specified influence levels.

16. The method of claim 1 further comprising estimating, for each of at least some of the user identities in the set of user identities, the user identity's popularity within the electronic identity platform based on data associated with the user identity extracted from the electronic identity platform, wherein:
receiving a request to filter the set of user identities based on a first value for a characteristic and a second value for the characteristic includes receiving a request to filter the set of user identities to include user identities having specified popularity levels; and
identifying a first subset of the user identities who have the first value for the characteristic and a second subset of the user identities who have the second value for the characteristic includes identifying subsets of the user identities whose estimated popularity within the electronic identity platform satisfies the specified popularity levels.

17. The method of claim 1 wherein:
extracting, for each user identity within the set of multiple user identities, data associated with the user identity within the electronic identity platform includes extracting interests recorded with the electronic identity platform by user identities within the set of multiple user identities;
receiving a request to filter the set of user identities based on a first value for a characteristic and a second value for the characteristic includes receiving a request to filter the set of user identities based on specified interests; and
identifying a first subset of the user identities who have the first value for the characteristic and a second subset of the user identities who have the second value for the characteristic includes identifying subsets of the user identities who recorded the specified interests with the electronic identity platform.

18. The method of claim 1 wherein identifying a first subset of the user identities who have the first value for the characteristic and a second subset of the user identities who have the second value for the characteristic includes identifying subsets of less than all of the set of multiple user identities.

19. A system comprising:
one or more processing elements; and
computer-readable storage storing instructions that, when executed by the one or more processing elements, cause the system to:
extract, from an electronic identity platform for each user identity within a set of multiple user identities of the electronic identity platform, data associated with the user identity within the electronic identity platform;
process a request to filter the set of user identities based on a first value for a characteristic and a second value for the characteristic;
based on the data associated with individual user identities extracted from the electronic identity platform, identify a first subset of the user identities who have the first value for the characteristic and a second subset of the user identities who have the second value for the characteristic;
store, in the computer-readable storage, first indications of the user identities identified as belonging to the first subset of user identities and second indications of the user identities identified as belonging to the second subset of user identities;
receive a first indication of content to be delivered to the identified first subset of user identities and to the second subset of user identities;
modify the content based on the second value of the characteristic;
store, in the computer-readable storage, the first indication of the content to be delivered to the identified first subset of user identities and a second indication of the modified content to be delivered to the identified second subset of user identities;
create an association between the stored first indications of the user identities identified as belonging to the identified first subset of user identities and the stored first indication of the content to be delivered to the identified first subset of user identities;
create an association between the stored second indications of the user identities identified as belonging to the identified second subset of user identities and the stored second indication of the modified content to be delivered to the identified second subset of user identities;
process a request for content received from a computing device, the request including an indication of a particular user identity;
compare the indication of the particular user identity to one or more of the stored first indications of the user identities identified as belonging to the first subset of user identities and to one or more of the stored second indications of the user identities identified as belonging to the second subset of user identities;
determine that the particular user identity belongs to the identified second subset of user identities as a consequence of having compared the indication of the particular user identity to the one or more stored first indications of the user identities identified as belonging to the first subset of user identities and to the one or more of the stored second indications of the user identities identified as belonging to the second subset of user identities;
identify the modified content as content to be delivered to the particular user identity based on having determined that the particular user identity belongs to the identified second subset of user identities and based on the association between the stored second indications of the user identities identified as belonging to the identified second subset of user identities and the stored indication of the modified content to be delivered to the identified second subset of user identities; and
transmit the modified content to the computing device in response to the received request for content from the computing device as a consequence of identifying the modified content as content to be delivered to the particular user identity.

20. Non-transitory, computer-readable storage media storing instructions that, when executed, cause a computing system to:
extract, from an electronic identity platform for each user identity within a set of multiple user identities of the electronic identity platform, data associated with the user identity within the electronic identity platform;
process a request to filter the set of user identities based on a first value for a characteristic and a second value for the characteristic;

based on the data associated with individual user identities extracted from the electronic identity platform, identify a first subset of the user identities who have the first value for the characteristic and a second subset of the user identities who have the second value for the characteristic;

receive an indication of content to be delivered to the identified first subset of user identities who have the first value for the characteristic and to the identified second subset of user identities who have the second value for the characteristic;

modify the content based on the second value of the characteristic; and deliver the content to at least some of the user identities within the identified first subset of user identities who have the first value for the characteristic and deliver the modified content to at least some of the user identities within the identified second subset of user identities who have the second value for the characteristic as a consequence of receiving the indication of content to be delivered to the identified subset of user identities who have the first value for the characteristic and to the identified second subset of user identities who have the second value for the characteristic.

* * * * *